United States Patent
Maiocchi

(10) Patent No.: US 7,659,678 B2
(45) Date of Patent: Feb. 9, 2010

(54) SYSTEM FOR OPERATING DC MOTORS AND POWER CONVERTERS

(76) Inventor: Sergio A. Maiocchi, 4 Lyndhurst Court, Wattlegrove, NSW (AU) 2173

( * ) Notice: Subject to any disclaimer, the term of this patent is extended or adjusted under 35 U.S.C. 154(b) by 210 days.

(21) Appl. No.: 10/565,345

(22) PCT Filed: Jul. 22, 2004

(86) PCT No.: PCT/AU2004/000982

§ 371 (c)(1), (2), (4) Date: Dec. 27, 2006

(87) PCT Pub. No.: WO2005/008878

PCT Pub. Date: Jan. 27, 2005

(65) Prior Publication Data

US 2007/0247091 A1    Oct. 25, 2007

(30) Foreign Application Priority Data

Jul. 22, 2003    (AU) .............................. 2003903787

(51) Int. Cl.
*H02P 6/10* (2006.01)

(52) U.S. Cl. .................... 318/400.22; 318/400.23; 318/400.3

(58) Field of Classification Search ............... 318/245, 318/400.22, 400.23, 400.26, 400.27, 400.28, 318/400.3, 400.42, 722; 363/15, 16, 34–38, 363/123, 125–128

See application file for complete search history.

(56) References Cited

U.S. PATENT DOCUMENTS

| | | | |
|---|---|---|---|
| 3,818,306 A * | 6/1974 | Marini | 363/15 |
| 3,872,364 A * | 3/1975 | Hubner | 363/37 |
| 4,005,351 A * | 1/1977 | Blum | 363/21.12 |
| 4,472,666 A | 9/1984 | Akeda et al. | |
| 4,473,781 A | 9/1984 | Nielsen | |
| 4,527,102 A * | 7/1985 | Gotou | 318/400.01 |
| 4,581,692 A * | 4/1986 | Nayberg et al. | 363/27 |
| 4,649,464 A * | 3/1987 | Shono | 363/21.15 |
| 4,673,851 A | 6/1987 | Disser | |

(Continued)

FOREIGN PATENT DOCUMENTS

EP    0478808 B1    4/1992

(Continued)

*Primary Examiner*—Bentsu Ro
(74) *Attorney, Agent, or Firm*—Townsend and Townsend and Crew, LLP

(57) ABSTRACT

A system is disclosed for driving a DC motor (15) under conditions of a controlled average current. An inductive element may be arranged for connection in series with the DC motor. A switch (14) is preferably coupled to the inductive element for connecting and disconnecting a terminal of the inductive element from the voltage source. A diode may be arranged for connection in parallel with a combination of the inductive element and the DC motor arranged in series, with the appropriate polarity so that current circulating through the inductive element circulates through the diode when the switch disconnects the terminal from the voltage source. A capacitor is arranged for connection in parallel with the motor, for limiting a resulting voltage over the motor or for storing charge depending on the embodiment of the invention. A device for measuring a current through the motor is provided, and a device (13) for controlling operation of the switch dependent upon the measured current in the motor is also provided. An airflow apparatus is also disclosed.

48 Claims, 68 Drawing Sheets

U.S. PATENT DOCUMENTS

| | | | | |
|---|---|---|---|---|
| 4,673,858 A * | 6/1987 | Saito | | 318/805 |
| 4,733,102 A * | 3/1988 | Nakayama et al. | | 307/107 |
| 4,855,652 A * | 8/1989 | Yamashita et al. | | 318/268 |
| 5,291,106 A * | 3/1994 | Murty et al. | | 318/375 |
| 5,367,448 A * | 11/1994 | Carroll | | 363/89 |
| 5,973,942 A | 10/1999 | Nelson et al. | | |
| 6,043,997 A | 3/2000 | He et al. | | |
| 6,091,233 A | 7/2000 | Hwang et al. | | |
| 6,175,218 B1 | 1/2001 | Choi et al. | | |
| 6,178,104 B1 | 1/2001 | Choi | | |
| 6,218,818 B1 | 4/2001 | Kim | | |
| 6,259,613 B1 | 7/2001 | Lee et al. | | |
| 7,112,935 B2 * | 9/2006 | Fujino et al. | | 318/433 |
| 7,138,778 B2 * | 11/2006 | Fujino et al. | | 318/433 |
| 2002/0021100 A1 | 2/2002 | Brown | | |

FOREIGN PATENT DOCUMENTS

| | | |
|---|---|---|
| EP | 0963034 A1 | 12/1999 |
| EP | 1271759 A2 | 1/2003 |
| GB | 2086156 A | 5/1982 |
| JP | 59025589 A | 2/1984 |
| JP | 851736 A | 2/1996 |
| JP | 8126312 A | 5/1996 |
| JP | 10271883 A | 10/1998 |
| JP | 11235087 A | 8/1999 |
| JP | 2000245150 A | 9/2000 |
| JP | 2000350448 A | 12/2000 |
| JP | 2000350462 A | 12/2000 |
| WO | WO 00/26740 A1 | 5/2000 |
| WO | WO 00/33453 A1 | 6/2000 |
| WO | WO 01/71895 A2 | 9/2001 |

* cited by examiner

CURRENT DRIVEN DC MOTOR

1) $V_S = V_{DC} - V_A$

2) $V_L = V_A - V_M$

3) $V_M \cong I_M \cdot R_M + V_{emf}$

4) $V_{emf} = K_v \cdot \omega_M$

5) $I_S = I_L$

6) $I_L = I_C + I_M$

7) $I_L = V_{RS} / R_S$

8) $V_M = V_C + I_C \cdot R_{ESR}$

9) $T = T_{ON} + T_{OFF}$

10) $I_L = I_{AVERAGE} + I_L(t)$

11) $I_{LPK} = I_{AVERAGE} + (\Delta I_L / 2)$

12) $I_{LMIN} = I_{AVERAGE} - (\Delta I_L / 2)$

13) $I_M = I_{AVERAGE}$

14) $I_C = I_L(t)$

15) $I_L(t) = \dfrac{1}{L} \displaystyle\int V_L(t)\, dt$

16) $I_L = \dfrac{V_L}{L} t = \dfrac{V_A - V_M}{L} t$

17) $I_L = \dfrac{V_{DC} - V_S - V_M}{L} t$

FIG. 6C-1

$$18) \quad \Delta I_L = \frac{V_{DC} - V_S - V_M}{L} T_{ON}$$

$$19) \quad |\Delta I_L| = \frac{V_M + V_{FD}}{L} T_{OFF}$$

$$20) \quad T_{ON} \frac{V_{DC} - V_S - V_M}{L} = \frac{V_M + V_{FD}}{L} T_{OFF}$$

$$21) \quad T_{ON}(V_{DC} - V_M) \cong V_M T_{OFF}$$

$$22) \quad V_M \cong V_{DC} \frac{T_{ON}}{T_{ON} + T_{OFF}} = V_{DC} \frac{T_{ON}}{T}$$

$$23) \quad \Delta Q = \frac{1}{2} \frac{T}{2} \frac{\Delta I_L}{2}$$

$$24) \quad \Delta V_{CC} = \frac{\Delta Q}{C} = \frac{\Delta I_L}{f \, 8 \, C}$$

$$25) \quad \Delta V_C = \Delta V_{CC} + \Delta I_L R_{ESR}$$

$$26) \quad \Delta V_C \ll V_M$$

FIG. 6C-2

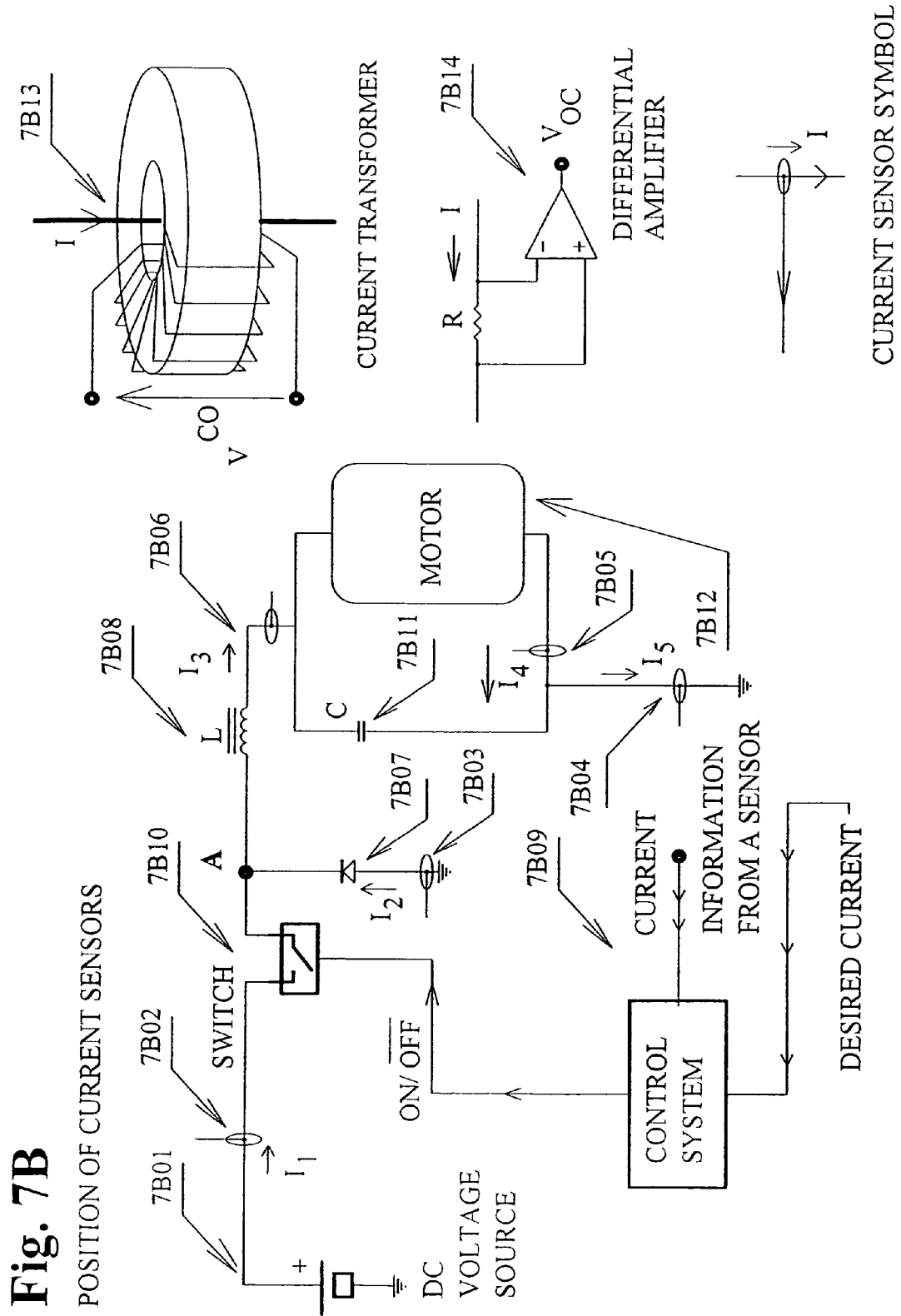
Fig. 7B POSITION OF CURRENT SENSORS

WITH SYNCHRONOUS RECTIFICATION $(1501)\ V_M \cong I_M \cdot R_M + \text{Vemf}$ $(1502)\ \text{Vemf} = K_v \cdot \omega_M$ $(1503)\ V_{SW} + V_{SENSOR} \ll V_L$ $(1504)\ V_D \ll V_M$ $(1505)\ \Delta I_L = \dfrac{V_I}{L_M} T_{ON} = \dfrac{V_M}{L_M} T_{OFF}$ $(1506)\ \dfrac{T_{ON}}{T_{OFF}} = \dfrac{V_M}{V_I}$ (FOR CONTINOUS CONDUCTION MODE)

Fig. 15 (CONT'D)

SYSTEM FOR OPERATING DC MOTORS AND POWER CONVERTERS

FIELD OF THE INVENTION

The present invention relates generally to motors and power supplies and, in particular, systems for operating a direct-current (DC) motor or power converters.

BACKGROUND OF THE INVENTION

In the treatment of sleep apnoea and other respiratory disorders, a positive air pressure is used applied to the patient airway. The equipment used is known as an airflow generator.

A method used to generate air pressure is shown in FIG. 1. A brushless DC motor (16) is used to drive a turbine or blower (15). The turbine (15) generates the air flow for the patient. The brushless DC motor controller (14), in conjunction with the control electronics of the flow generator (13), receive power from a power supply (12) that is connected to the AC main through a filter (11). Sometimes the filter is built into the power supply itself. Control signals are sent from the control electronics (13) to the brushless DC motor controller (14), so the speed of the motor (16) can be controlled.

The pressure and the amount of air delivered depend on the speed of the turbine. In some types of equipment, pressure and flow sensors are used to monitor these variables and change the speed of the motor to achieve the desired effect. Also, in some cases, the speed of the motor is changed, alternating between a high and a low value, either in response to the patient respiration or as part of an automatic cycle. Equipment performing in this way is known as bi-level devices.

In FIG. 1, a single power supply (12) provides power to both, the motor driving circuits (14) and the control electronics (13).

A brushless DC motor, or BLDCM, is a DC motor with an electronic commutator. FIG. 2 shows a block diagram of one type of permanent magnet brushless DC motor along with its electronic commutator.

The driving electronics consist of a logic circuit (22) that controls a set of electronic switches (21) that switch power to the motor windings (23) much as the brushes do in a conventional DC motor. Current through the windings (23) generates forces in the rotating magnets (24), causing the rotor of the motor to spin. The switches (21) can connect the end of its corresponding winding to either the positive or the negative side of the DC voltage source, and also they can leave the winding unconnected.

The logic circuit (22) of the electronic commutator has as an output two control signals per switch, shown in the figure as signal groups SWC1 to SWC3, of two lines each. The motor has hall-effect sensors (25, 26 and 27) that are used by the logic circuit (22) to detect the position of the rotor and to switch the right waveforms to the windings (23). Typically, the industry uses a three phase motor (three windings) that is depicted in Y-configuration, for example, but may also be in a triangle configuration.

As the axis of the motor rotates, the motor windings are driven with three trapezoidal 6-step waveforms. During each step, voltage is applied to two windings only.

There is also a sensor-less mode of operation, in which a special controller monitors the voltage in the winding that has been left open-circuit to read the back-emf generated in the winding as the motor axis rotates.

In a CPAP application, like the one shown in FIG. 1, the BLDCM (16) takes considerable power especially during its acceleration periods. In a typical CPAP application, a motor can take around two amps at 24 volts (or more if a 12 volt motor is used), depending on the pressure and flow generated, and the particular motor chosen. The electronics necessary to perform the control, however, can be designed so the electronics take under 0.1 amps of current at a relatively low voltage. Most of the electronics can work with 5 volts, while only the pressure and flow sensors may need more, depending on the implementation.

The power supply for the motor (16 in FIG. 1) and the switching section of the electronic commutator (21 in FIG. 2) require more relaxed specifications than the power supply for the control electronics (13 in FIG. 1) or the electronic commutator logic (22 in FIG. 2). A motor is a forgiving load for a power supply. As the motor's mechanical characteristics work as a low pass filter, the motor can tolerate a relatively large ripple voltage. In fact, the ripple can be up to 100% without affecting operation. Furthermore, some applications of motors (e.g., driving a fan or turbine) can tolerate the discontinuous torque that comes with a discontinuous supply of current.

A brushless-DC-motor-driven ventilation fan shares most of the building blocks of an airflow generator for medical applications. The main differences are:

The mechanical design of the turbine or fan itself, since a flow generator needs to produce more pressure.

The ventilation fan, normally, does not interface with flow and pressure sensors. Thus, the control electronics of a ventilation fan are simpler and should draw less current.

Regulations like the European Standard EN 60555 and the International Standard IEC 555-2 limit the current harmonic content of mains supplied equipment. This requirement applies to both the medical application of the DC motors and the ventilation fans. Power factor correction must be taken into account for all new designs. Power factor correction can add 20 to 30% to the cost of the power supply of equipment (see Ref. 10 in Appendix C). Hence, there can be a relatively substantial saving in the cost of the equipment if the function of power factor correction is integrated with the DC motor driver for equipment working from the AC mains.

SUMMARY OF THE INVENTION

In accordance with an aspect of the invention, there is provided a system for driving a direct-current (DC) motor under conditions of a controlled average current, the system comprising: an inductive element for connection in series with the DC motor; a first switch coupled to the inductive element for connecting and disconnecting a terminal of the inductive element remote from the DC motor to a voltage source; a second switch connected in parallel with a combination of the inductive element and the DC motor arranged in series, controlled so that a current circulating through the inductive element circulates through the second switch if the first switch disconnects the terminal of the inductive element from the voltage source; a capacitor arranged for connection in parallel with the DC motor to limit a resulting voltage over the DC motor; means for measuring a current through the DC motor; and means for controlling operation of the first and second switches dependent upon the measured current in the DC motor.

In accordance with another aspect of the invention, there is provided a system for driving a direct-current (DC) motor under conditions of controlled average current, the system comprising: a capacitor arranged for connection in parallel with the motor to limit a resulting voltage over the motor, the other terminal of the parallel combination of the capacitor and the motor being connected to a common terminal; an inductive element connected to the common terminal; a first switch coupled to the inductive element for connecting and disconnecting a terminal of the inductive element to a voltage source; a second switch connected in series with the parallel combination of the motor and the capacitor, and connected to the common node between the first switch and the inductive element, controlled so that the current circulating through the inductive element circulates through the second switch if the first switch disconnects the terminal from the voltage source; means for measuring a current through the motor; and means for controlling operation of the first and second switches dependent upon the measured current in the motor.

In accordance with yet another aspect of the invention, there is provided a system for driving a direct-current (DC) motor under conditions of a controlled average current, the system comprising: a capacitor arranged for connection in parallel with the motor to limit a resulting voltage over the motor, a terminal of the capacitor and the motor being connected to a DC voltage source; an inductive element connected to a common node of the DC voltage source, the capacitor and the motor; a first switch coupled to the inductive element for connecting and disconnecting a terminal of the inductive element to the terminal of the voltage source not connected to the parallel combination of the capacitor and the motor; a second switch connected in series with the parallel combination of the motor and the capacitor and connected to the common node between the first switch and the inductive element, controlled so that the current circulating through the inductive element circulates through the second switch if the first switch disconnects the terminal from the voltage source; means for measuring a current through the motor; and means for controlling operation of the first and second switches dependent upon the measured current in the motor.

In accordance with a further aspect of the invention, there is provided a system for driving a direct-current (DC) motor under conditions of a controlled average current, a voltage of a DC power supply having a larger or smaller value than a motor nominal voltage, the system comprising: an inductive element for connection in series with the DC motor; an arrangement including a plurality of switches, diodes and a magnetic system, the arrangement being coupled to the inductive element for connecting and disconnecting a terminal of the inductive element remote from the motor to a voltage source, the arrangement being configured as circuit selected from the group consisting of a forward DC-DC converter, a push-pull DC-DC converter, a half-bridge DC-DC converter, a diagonal-half bridge DC-DC converter, and a full bridge DC-DC converter; a capacitor arranged for connection in parallel with the motor to limit a resulting voltage over the motor; means for measuring a current through the motor; and means for controlling operation of the arrangement dependent upon the measured current in the motor.

In accordance with still another aspect of the invention, there is provided a system for driving a direct-current (DC) motor under conditions of a controlled average current, a voltage of a DC power supply having a larger or smaller value than a motor nominal voltage, the system comprising: a diode; a magnetic transformer connected in series with the diode in a circuit arrangement selected from the group consisting of a flyback DC-DC converter and a ringing choke DC-DC converter, the transformer and the diode for connection in series with the DC motor; a switch coupled to the magnetic transformer and the diode for connecting and disconnecting a terminal of the magnetic transformer and the diode remote from the motor to a voltage source; a capacitor arranged for connection in parallel with the motor to limit a resulting voltage over the motor; means for measuring a current through the motor; and means for controlling operation of the switch dependent upon the measured current in the motor.

In accordance with another aspect of the invention, there is provided a system for driving a direct-current (DC) motor under conditions of a controlled average current, a voltage of a DC power supply having a larger or smaller value than a motor nominal voltage, the system comprising: an electronic synchronous rectification switch; a magnetic transformer connected in series with the synchronous rectification switch in a circuit arrangement selected from the group consisting of a flyback DC-DC converter and a ringing choke DC-DC converter, the transformer and the synchronous rectification switch being for connection in series with the DC motor; a switch coupled to the magnetic transformer and the synchronous rectification switch for connecting and disconnecting a terminal of the magnetic transformer and the synchronous rectification switch remote from the motor to a voltage source; a capacitor arranged for connection in parallel with the motor to limit a resulting voltage over the motor; means for measuring a current through the motor; and means for controlling operation of the switch dependent upon the measured current in the motor.

In accordance with yet another aspect of the invention, there is provided an airflow apparatus, comprising: a brushless DC motor; an electronic circuit for controlling operation of the brushless DC motor; a power supply for the electronic circuit separate from a power supply for the brushless DC motor, the power supply for the electronic circuit being adapted to use a voltage resulting from the brushless DC motor in operation once the resulting voltage reaches a suitable value; and means for reducing power to the electronic circuit from the power supply once the resulting voltage reaches the suitable value.

In accordance with a further aspect of the invention, there is provided a system for powering a microprocessor based system from a DC voltage higher than the voltage required by the system to operate, comprising: a capacitor; means to charge the capacitor from the DC voltage with a current substantially smaller than the current the microprocessor based system needs to operate; a switch coupled to the capacitor so that the switch can connect power to the microprocessor based system from the charge accumulated in the capacitor; means for sensing the voltage in the capacitor and causing the switch to close once the voltage in the capacitor reaches a desired value; and means for keeping the switch closed while the voltage in the capacitor is over a desired value, but less than the value that caused the sensing means to close the switch.

In accordance with another aspect of the invention, there is provided a switching based alternating current (AC) to direct-current (DC) converter, comprising: a rectifier adapted to be connected to an alternating current (AC) mains line; a first capacitor for noise reduction connected in parallel with an output of the rectifier; an inductive element connected to a terminal of the rectifier and the first capacitor; a first switch coupled to the inductive element for connecting and disconnecting a terminal of the inductive element remote from the parallel combination of the rectifier output and the first capacitor; a second switch connected to the connection node between the inductive element and the first switch, controlled so that the current circulating through the inductive element circulates through the second switch when the first switch disconnects the inductive element from the parallel combination of the rectifier output and the first capacitor; a second capacitor for energy storage connected to the terminal of the second switch remote from the inductive element, the second capacitor being connected in parallel with the serial combination of the second switch and the inductive element, the direct-current (DC) output of the alternating current (AC) to direct-current (DC) converter being taken from the terminals of the second capacitor; means for sensing a current through the inductive element; means for sensing the voltage across the first capacitor; means for sensing the voltage across the second capacitor; and a control circuit connected to the first switch to maintain the voltage across the second capacitor between defined limits by operating the first switch in a way that a current through the inductive element tracks the waveform of the alternating current line voltage to cause the AC-to-DC converter to exhibit unity power factor to the alternating current line.

BRIEF DESCRIPTION OF THE DRAWINGS

A small number of embodiments are described with reference to the drawings, in which:

FIGS. 6C-1 and 6C-2 are lists of the equations that describe the behavior of the system shown in FIG. 6;

FIGS. 7A to 7L are block diagrams of further embodiments of the invention relating to the system depicted in FIG. 6;

DESCRIPTION OF THE PREFERRED EMBODIMENTS

Systems for driving a direct-current (DC) motor under conditions of a controlled average current, airflow apparatuses, and systems for powering a microprocessor based system from a DC voltage higher than the voltage required by the system to operate are described. Also described is a typology for power factor correction.

Embodiments of the invention provide a simple, less costly system that is obtained if the motor is made to work as directly as possible from the AC main while powering the control electronics from a smaller, simpler well-regulated power supply. However, the BLDCMs available to the manufacturers of CPAP flow generators do not operate from the voltage available after the rectification of the AC main. Further simplification, integration and versatility can be obtained if the same control electronics can look after the control and mode of operation of the power supply itself, and the implementation of the functionality of the CPAP flow generator.

In other embodiments of the invention, a microprocessor can provide the intelligence necessary for controlling the functionality of the CPAP flow generator, to also control the supply of power to the BLDCM controller, while still providing extra functionality like power factor correction, and modulation of the switching frequencies used in the power supply in order to facilitate meeting the EMI directives.

Figure 3:
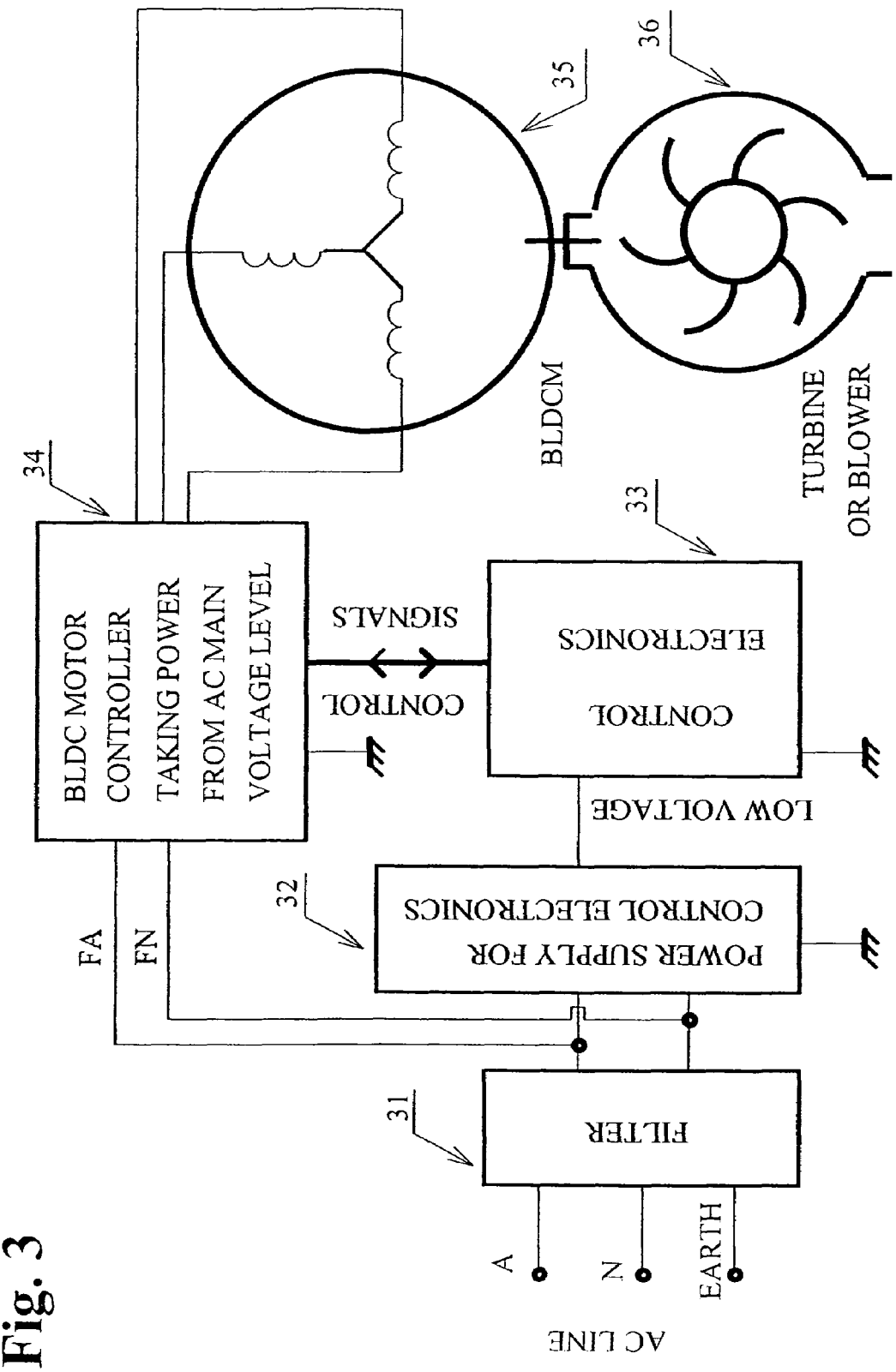
FIG. 3 is a block diagram of an airflow generator with split power supply in accordance with an embodiment of the invention.

The advantage of powering the motor as directly as possible from the AC main brings one design for a portable airflow generator for CPAP treatment that in terms of simplicity uses a BLDCM that is connected directly to a pulsating full wave rectified AC main. The concept is shown in FIG. 3. The control electronics (33) in FIG. 3 are powered from the power supply (32) that takes the power from the AC mains through a filter (31). The brushless DC motor, BLDCM (35) that drives the turbine (36) is controlled or driven from the control electronics (34) that takes power from the AC mains directly through the filter (31). The electronic commutator of the BLDCM is included in (34), while the motor sensors that should connect to (34) are not shown for sake of simplicity.

As all the BLDCMs (35) suitable to build a portable airflow generator for CPAP in the market would not stand the main voltage directly applied to its windings, alternative methods for driving the BLDCM must be used.

Figure 4:
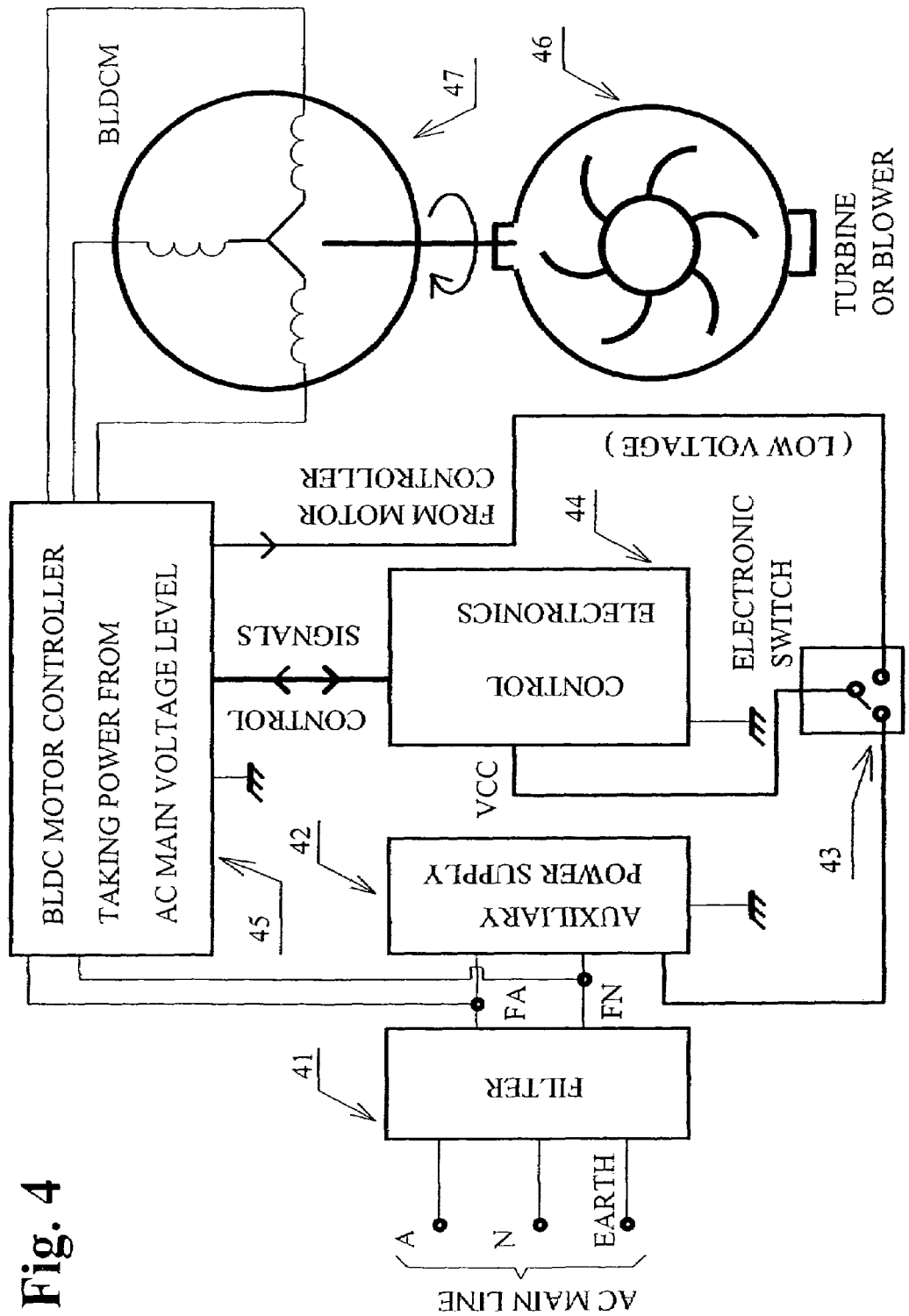
FIG. 4 is a block diagram of an airflow generator with split power supply and the power supply for the control electronics circuit, adapted to use a voltage resulting from the brushless DC motor in operation once the resulting voltage reaches a suitable value.
Figure 6:
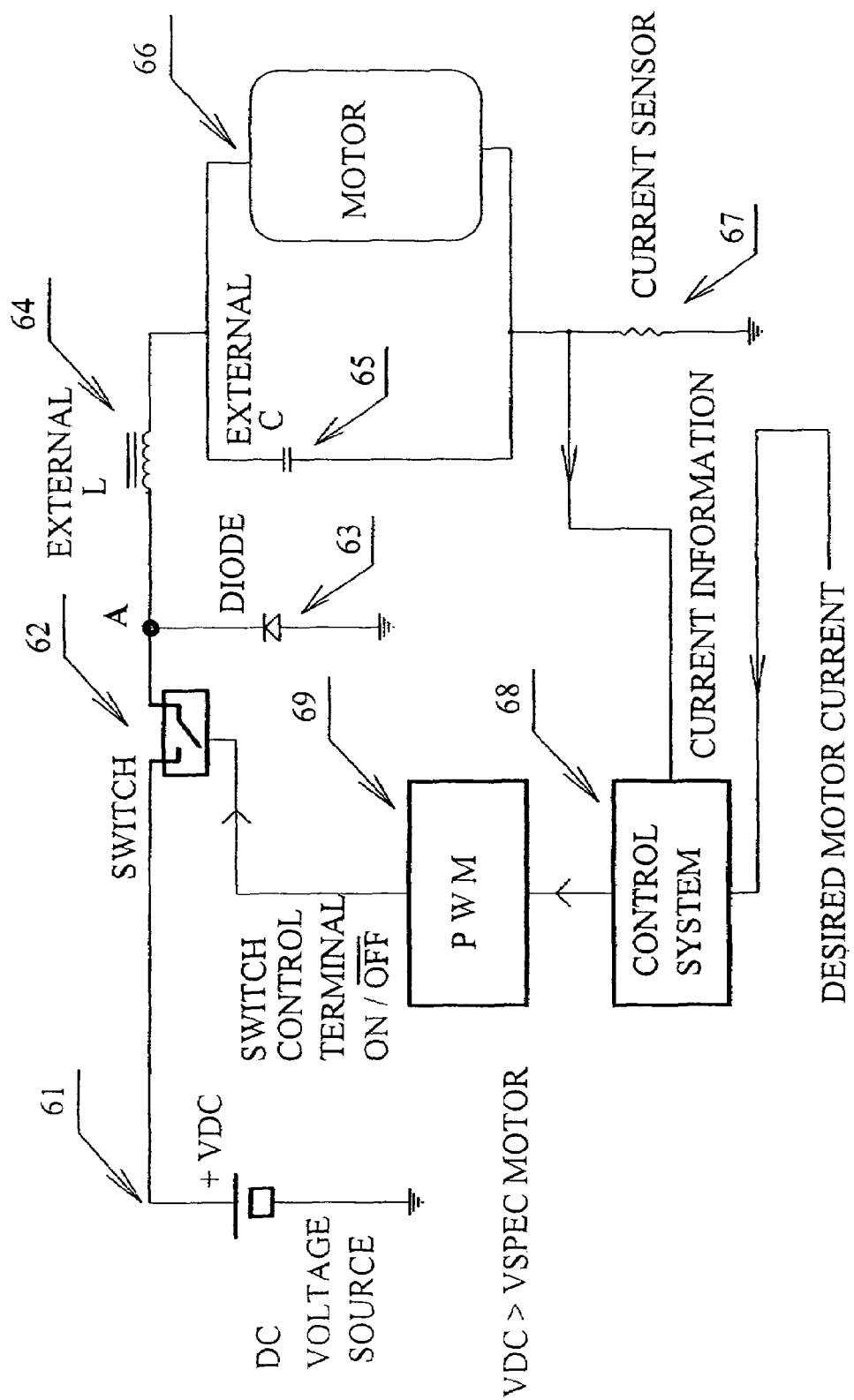
FIG. 6 is a block diagram of a system for driving a direct-current (DC) motor under conditions of controlled average current, from a voltage source larger than a voltage that the DC motor has under operating conditions.

The unavailability of brushless DC motors suitable for use in CPAP flow generators that can work at rectified AC main levels has motivated the embodiments of the invention, which can be seen conceptually in FIGS. 4, 6 and 7.

While the embodiments of the invention are directed to motors in flow generators, it will be appreciated by those skilled in the art that the embodiments of the invention are not limited to such applications. Another application of the invention is BLDCM driven cooling fans, for example.

The power supply that the motor and the electronic commutator require has far more relaxed specifications than the power supply for the control electronics. A motor is a forgiving load for a power supply. The mechanical characteristics of the motor work as a low pass filter, so the motor can tolerate a relatively large ripple voltage. In fact, the ripple can be up to 100% without affecting operation. If the controlled variable is the motor current, and the electronic commutator is not pulse width modulated, the voltage over the motor's electronic commutator is the result of the back-emf (electromotive force) generated in the windings themselves as a result of the motion. This voltage is approximately a linear function of the motor speed and can be used to estimate the speed of the motor.

There are several advantages in controlling the current through a DC motor rather than the voltage over that motor. For instance, it is well known that by controlling the current driving a DC motor, rather than the voltage over the windings, the electrical time constant formed by the resistance and the inductance of the windings is not part of the control loop dynamics, making the system more responsive. Also, the same circuitry that is used to control the current can be used simultaneously to detect malfunctions due to excess current, yielding a simpler, cheaper circuit. Finally, if the current through the DC motor is controlled, conditions of blocked rotor are easier to handle, as there is no excess current taken from the power source.

Figure 5:
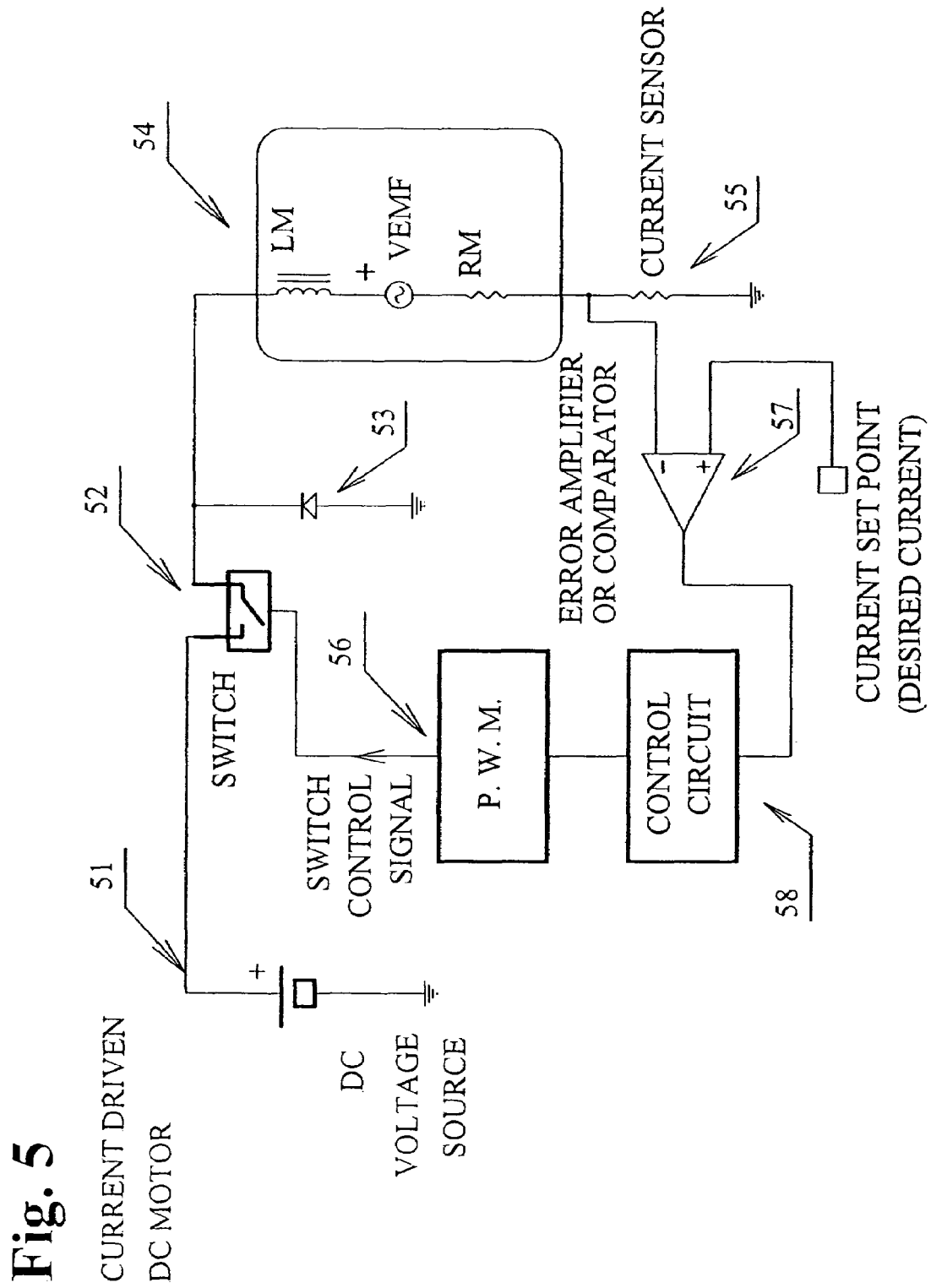
FIG. 5 is a block diagram of a known DC motor driven with controlled constant average current.

FIG. 5 shows a circuit for driving a DC motor (including a BLDCM with its electronic commutator) under conditions of a controlled average current.

The switch (52) closes and opens as commanded by the pulse width modulator (56). When the switch (52) is closed, DC voltage from the source (51) is applied to the motor (54), and a current flows through the inductance (the motor windings) embedded in the motor ($L_M$). When the switch opens, the current flows through the diode (53). The diode (53) is usually called a "freewheeling diode" or a "catch diode". A current sensor (55), typically a resistor of small value, is used to measure the current. Block (57) represents either an error amplifier, or a comparator, depending on the type of control system used. Block (57) compares the measured current with the desired or set current passing the information, as control signal, to a control system (58), which in turn controls the switch (52).

This type of known system and its variations are not only applied to DC motors but to other types of electromechanical devices with an embedded inductance. Examples of these devices are other types of motors, like stepper motors and even solenoids.

The necessary semiconductor circuitry to perform the functions in FIG. 5 can be found in integrated circuits well known to those skilled in the art (e.g., see Refs. 5 and 19).

The details of the implementation of FIG. 5 can be found in:

Reference 1, chapter 7, pages 155-181.
Reference 3, chapter 11, pages 286-308.
Reference 4, FIGS. 7 and 8 (technique used with other inductive devices).
References 5, 6 and 13-19.
Reference 24, pages 3-51 to 3-70 and 5-6 to 5-9.

A limitation of the current state of the art as shown in FIG. 5 is that when the switch (52) closes, the full value of the DC voltage of the source (51) is applied to the motor (54). Hence, the motor (54) must be specified accordingly. A motor designed to be driven from a nominal voltage of 24 volts DC is not, generally, expected to operate from the 337 volts DC that results from rectifying a 240 VAC main.

A method for driving a motor with controlled constant average current through the motor windings, while taking the power from a voltage source larger than the maximum voltage source possible for the motor, is disclosed in FIG. 6.

In the circuit disclosed in FIG. 6, a switch (62) connects the DC voltage from the power source (61) not to the motor (66) directly, but to an inductive element (64) not present in the circuit shown in FIG. 5. A capacitor (65) is added in parallel with the motor (66).

Referring to FIG. 6, the electronics controlling the operation of the circuit (68) command a pulse width modulator (69). The object of the control system (68) is to keep the current though the motor (66) as close as possible to the desired motor current command received from outside the system. The control system (68) receives the information from the current sensor (67) and the desired motor current as commanded from outside the system, and applies control algorithms or signal processing to obtain an output that commands the pulse width modulator (69). The operation of the control system (68) can also be described in terms of a comparison of the current through the sensor (67) with the desired motor current, as commanded from outside the system, and the generation of control signals for the pulse width modulator (69) in accordance with the results of the comparison in order to achieve the object described above.

The pulse width modulator (69) is coupled to the switch (62) and can make the switch open and close. The switch (62) opens and closes repeatedly, as part of a pulse-width modulation scheme generated in the pulse width modulator (69) to obtain the desired current in the motor (66). Every time the switch (62) is closed, the current in the inductive element (64) grows in proportion to the voltage difference applied across the inductive element (64) and the amount of time the switch is closed.

When the switch is open, the inductive element (64) keeps the current flowing through the motor (66) and the capacitor (65), as the circuit closes through the diode (63). The diode (63) is performing a similar function to what is normally referred to as a catch diode or a freewheeling diode. Current sensor (67) senses a current similar to the current in the inductive element (64).

Generally, the capacitor (65) limits the resulting voltage over the motor, if the resulting voltage exceeds specifications for the motor due to a relationship between the impedance of the inductive element and the impedance of the motor. However, even if the voltage across the motor resulting from the inductive divider formed by the inductance of the motor and the inductance (64) is within the specification of the motor, the capacitor (65) is needed to take the current that the inductance (64) is forcing into the motor, during the relatively small period of time in which the electronic commutator of the motor in a brushless DC motor (or, sometimes, the brushes in a conventional DC motor) may be open.

Figure 6A:
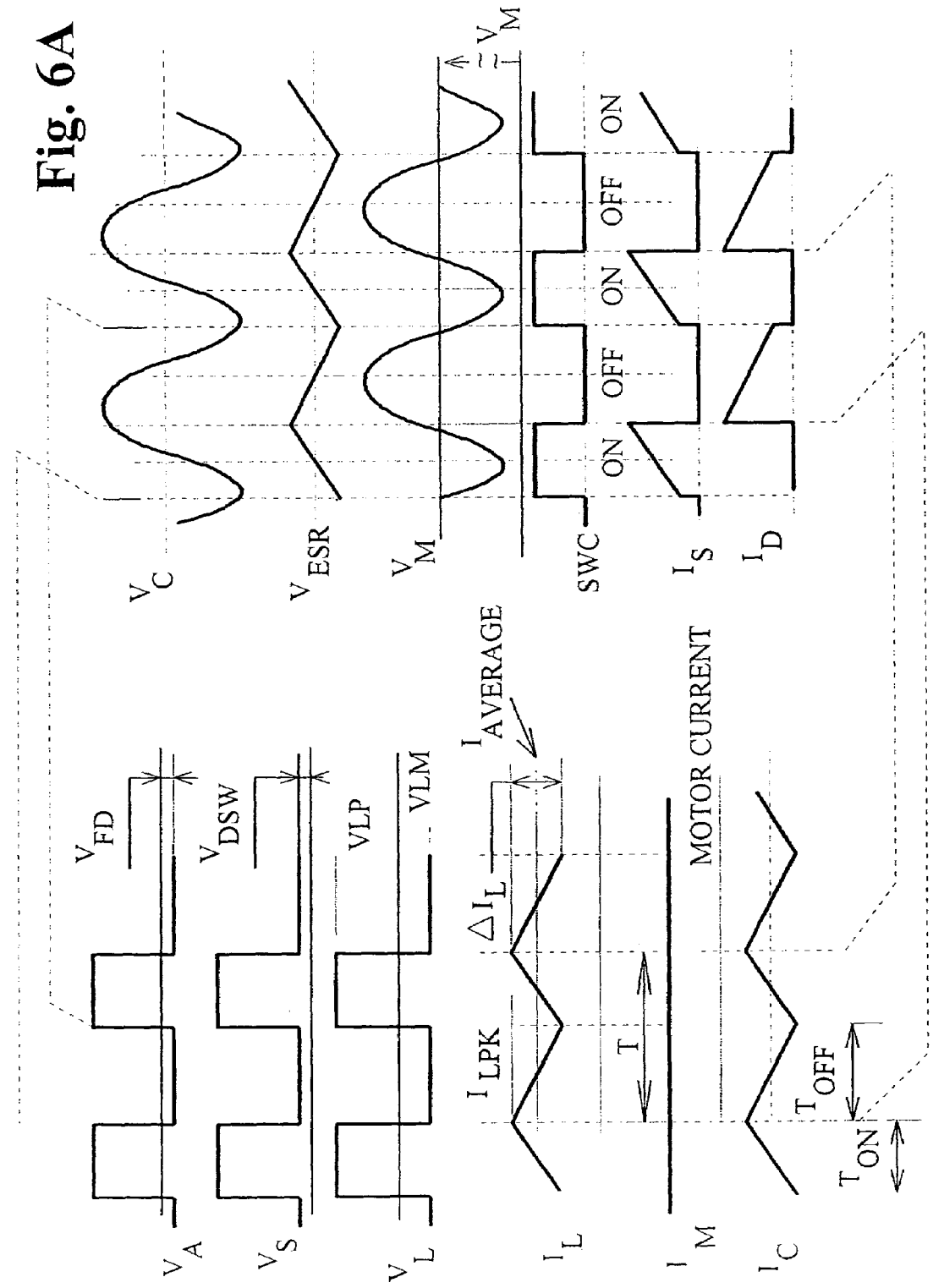
FIG. 6A is a set of timing charts of the waveforms present in FIG. 6.
Figure 6B:
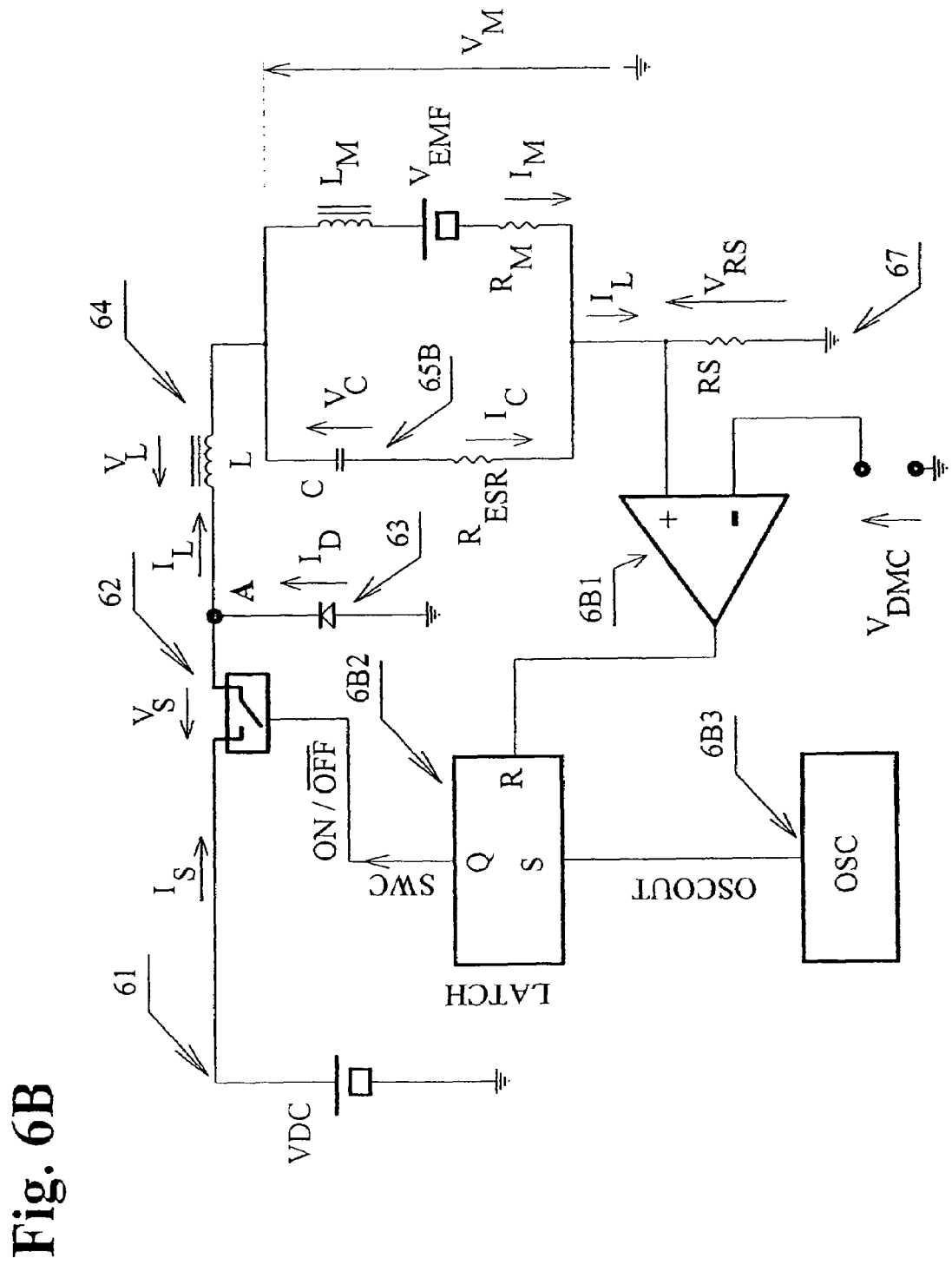
FIG. 6B is a more detailed block diagram of the system disclosed in FIG. 6, including timing of the waveforms of one embodiment of the invention.
Figure 6B:
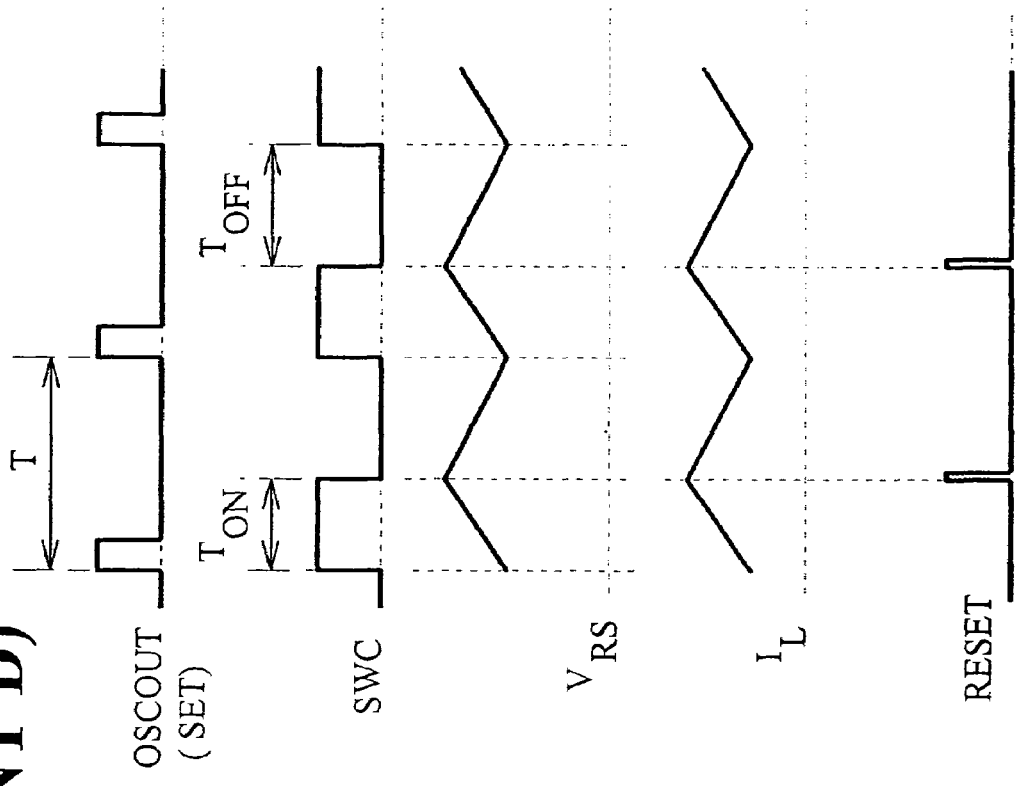

FIG. 6B shows a detailed block diagram of one possible implementation of the control system (68) and the pulse width modulator (69). The control system and the pulse width modulator shown in FIG. 6B are a popular choice with integrated circuits. The motor (66) of FIG. 6 has been replaced graphically by its electrical model, comprising the inductance of the windings ($L_M$), the resistance of the commutator and the winding $R_M$, and the counter electromotive force Vemf, represented as a voltage source in series with $L_M$. All the elements of FIG. 6B, with numbers similar to the numbers used in FIG. 6, have similar functionality.

The capacitor (65) is shown as an ideal capacitor (65B) and its effective series resistance (ESR), shown as a resistor labelled $R_{ESR}$, in series with (65B).

A comparator (6B1) compares the current information in the form of a voltage from the sensing resistor (67), that is, the voltage $V_{RS}$, with the set point, or desired motor current information, the voltage $V_{DMC}$.

The cycle of the pulse width modulator starts periodically, when a pulse from the oscillator (6B3) sets the set-reset latch (6B2), causing the output "Q" to go high. The output "Q" of the set-reset latch (6B2) is connected to the switch (62). The output "Q" is labelled SWC, from switch control. A high in SWC causes the switch (62) to close. Current flows through the inductance (64), the capacitor (65), the motor (66) and the sensing resistor (67). When the current sensed in (67) is larger than the set point value ($V_{DMC}$), the output of the comparator (6B1) is high, and the set-reset latch (6B2) is reset.

With the reset input active, the output "Q" (also labelled $S_{WC}$) changes into low, and the switch (62) opens. The higher the value of the signal $V_{DMC}$, the higher the current is allowed to grow in the inductance (64), and the higher the average current through the motor is. Also, the time the switch is on ($T_{ON}$) grows.

The five-chart timing diagram at the bottom of FIG. 6B shows the timing of some waveforms in the circuit:

| | |
|---|---|
| OSCOUT: | Output of the oscillator (6B3). T is the period of the PWM signal. |
| SWC: | Control input to the switch (62), output "Q" of the S-R latch (6B2). |
| $V_{RS}$: | Voltage as a result of the current flow in the sensing resistor (67). |
| $I_L$: | Current through the inductance (64). |
| RESET: | The output of comparator (6B1), and the reset input of the S-R latch (6B2). |

The type of control system and pulse width modulator shown in FIG. 6B is only one example. The control schemes used with the circuit shown in FIG. 5 can be used in the control system (68) and the pulse width modulator (69) of FIG. 6. In fact, the circuit disclosed in FIG. 6 can be implemented with some of the integrated circuits that are currently used to implement the circuit disclosed in FIG. 5. An example of this is in the Reference 13.

Figure 9A:
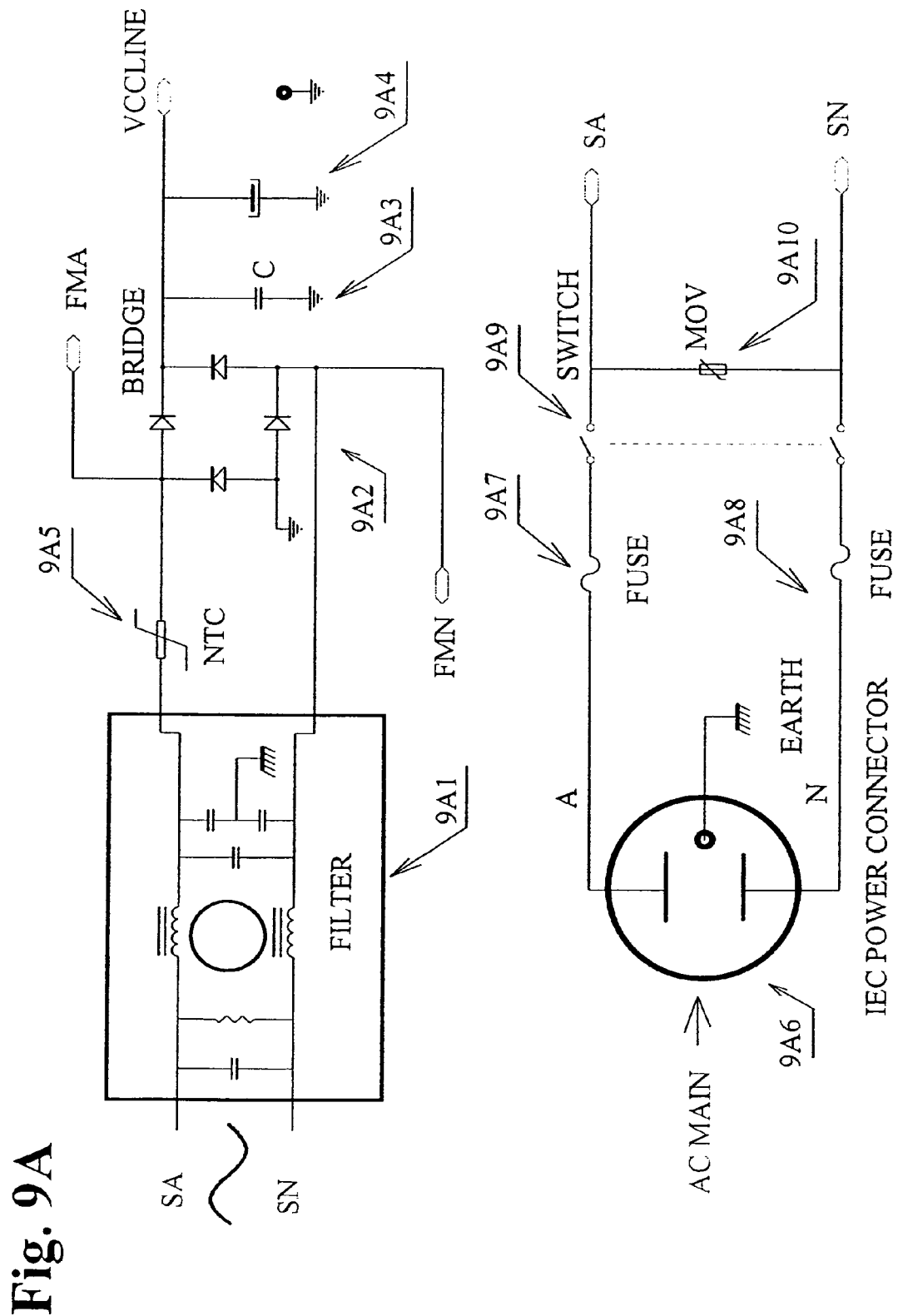
FIGS. 9A to 9L are circuit diagrams for detailed implementations of flow generators in accordance with an embodiment of the invention.
Figure 9B:
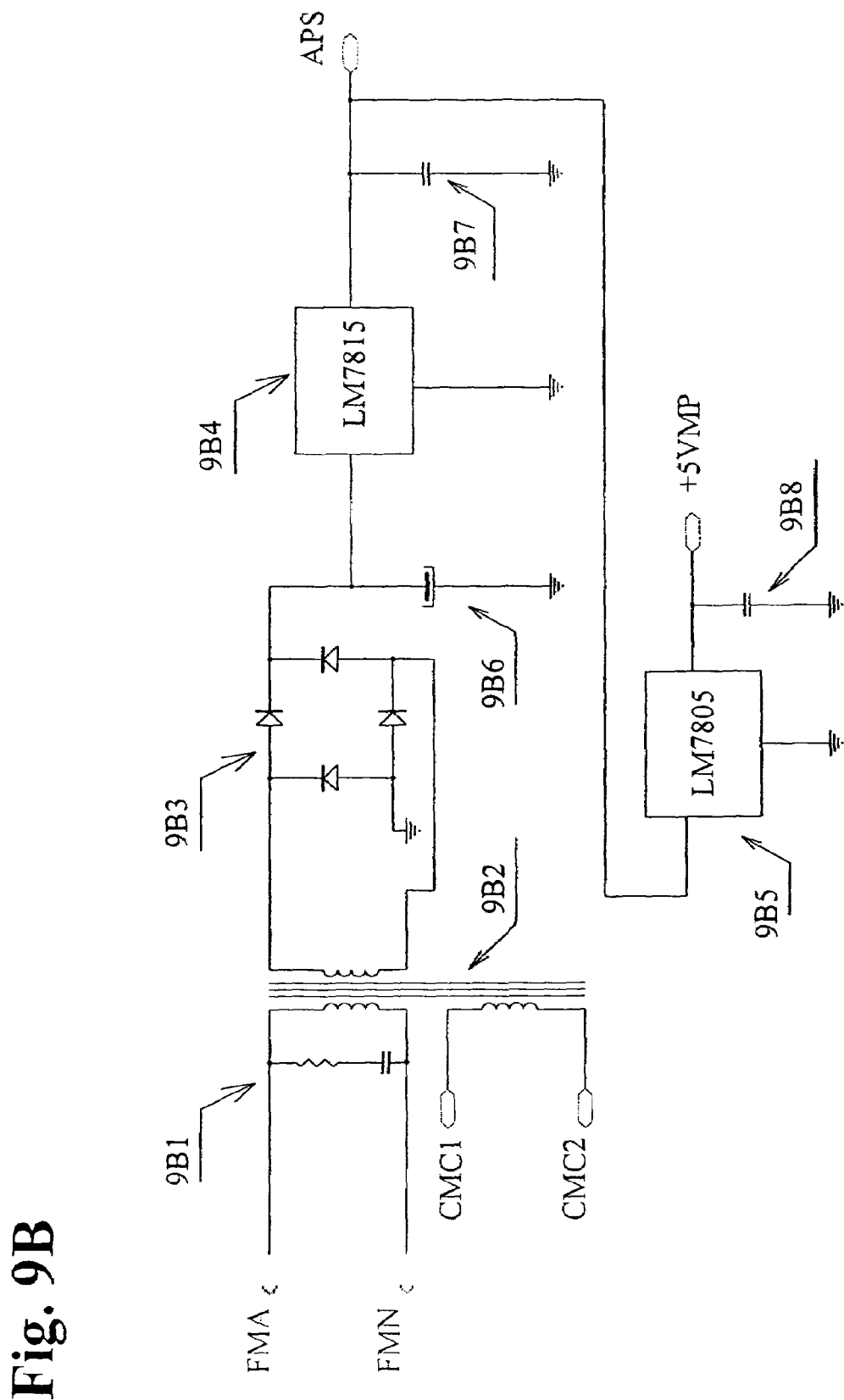
Figure 9C:
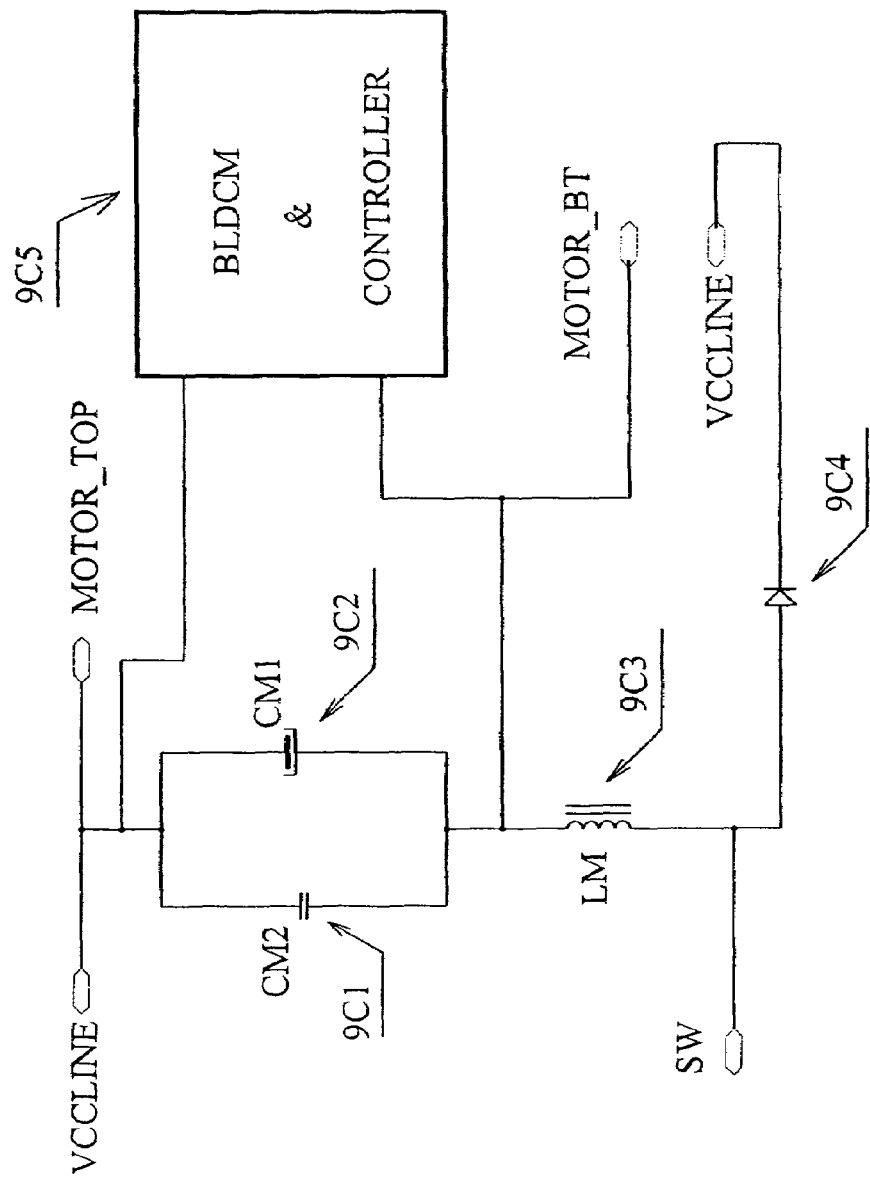
Figure 9D:
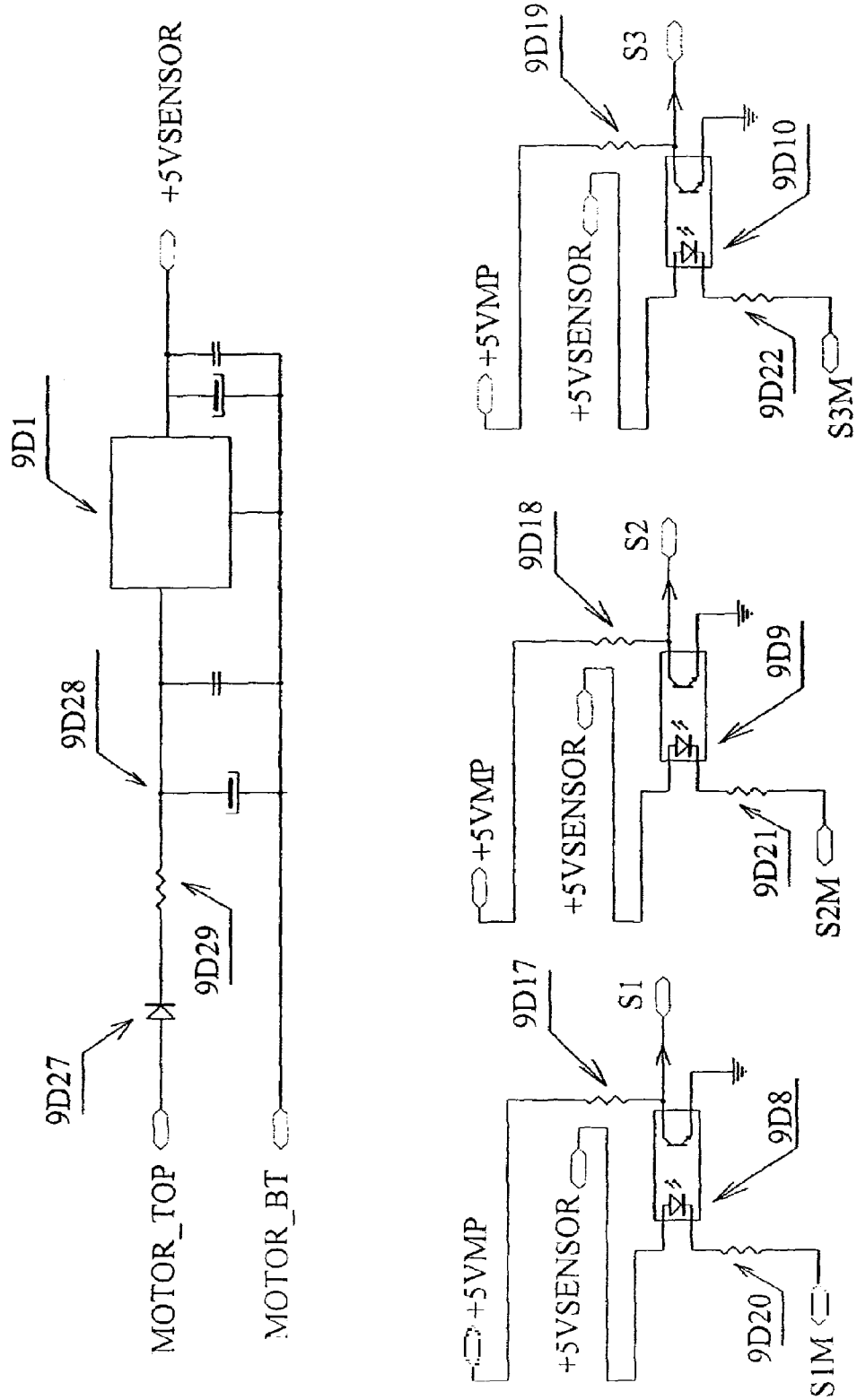
Figure 9D:
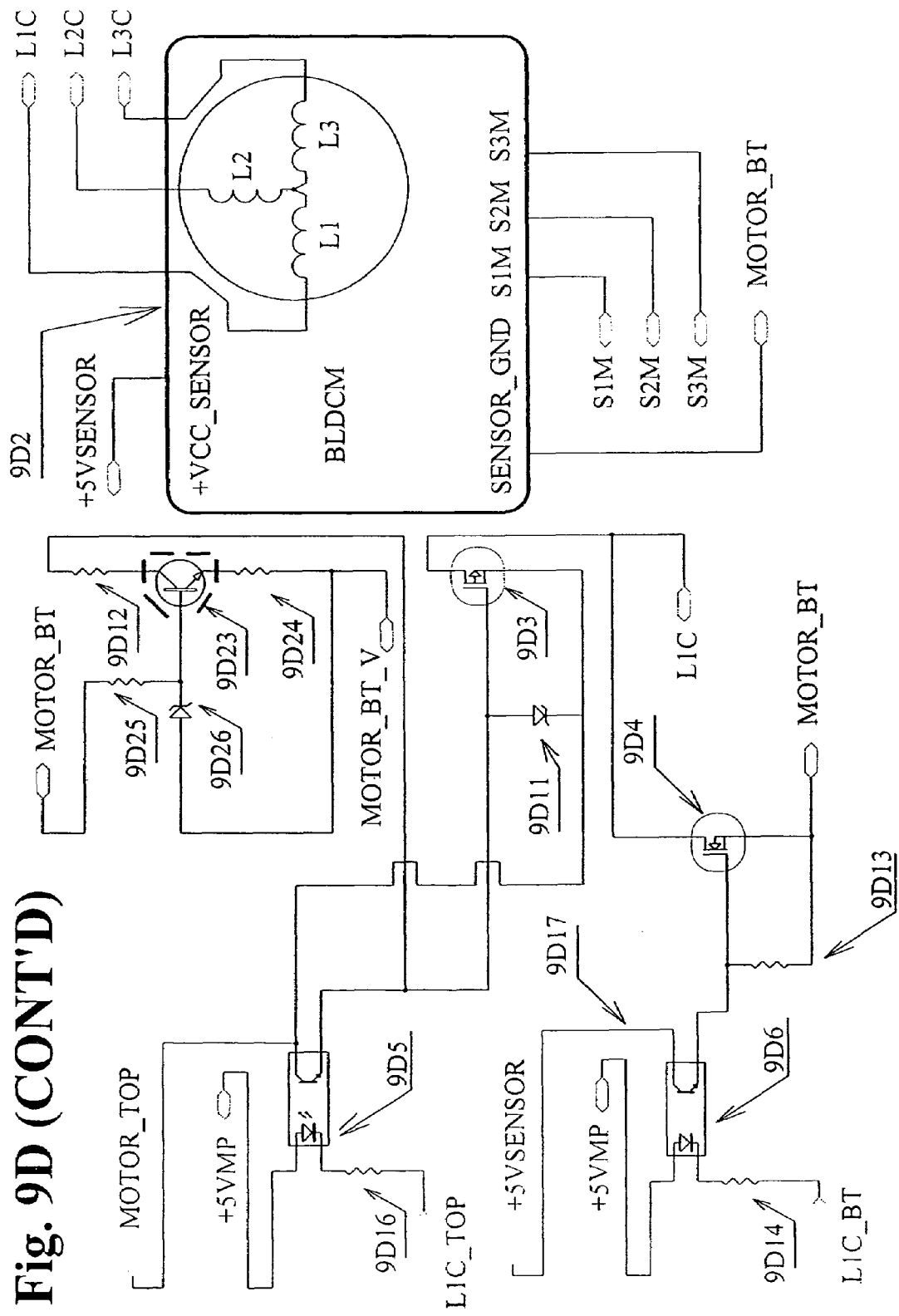
Figure 9E:
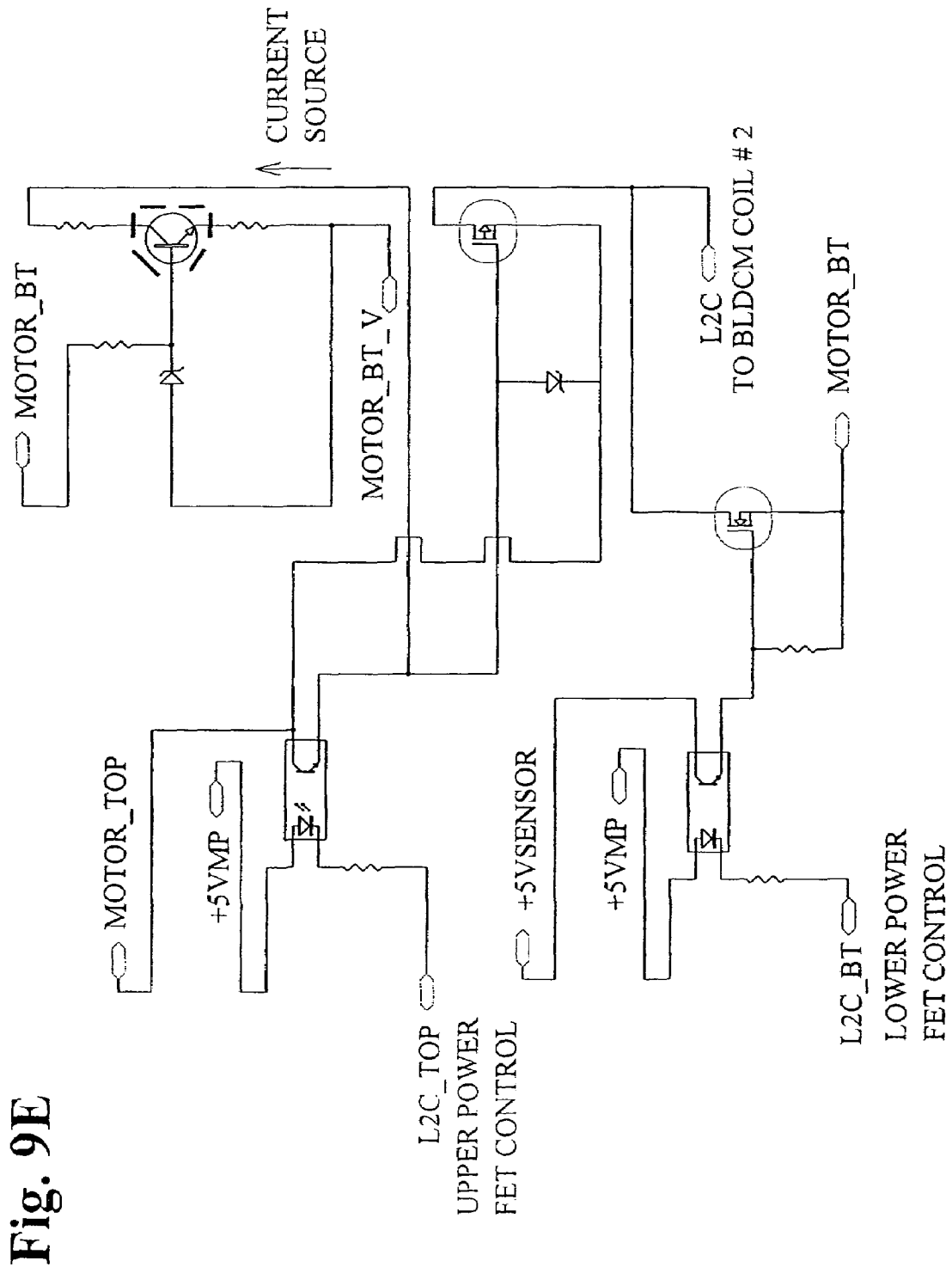
Figure 9F:
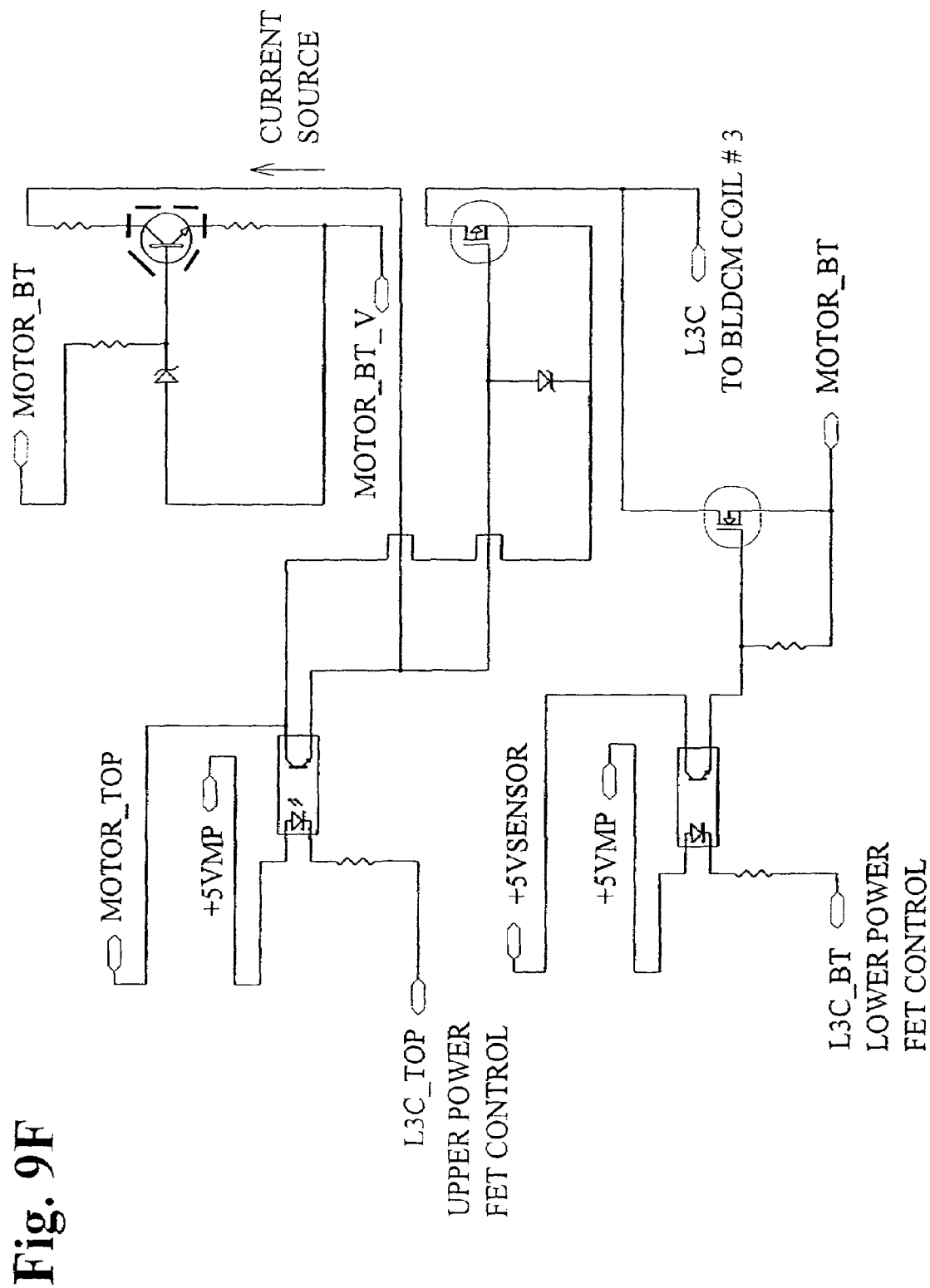
Figure 9G:
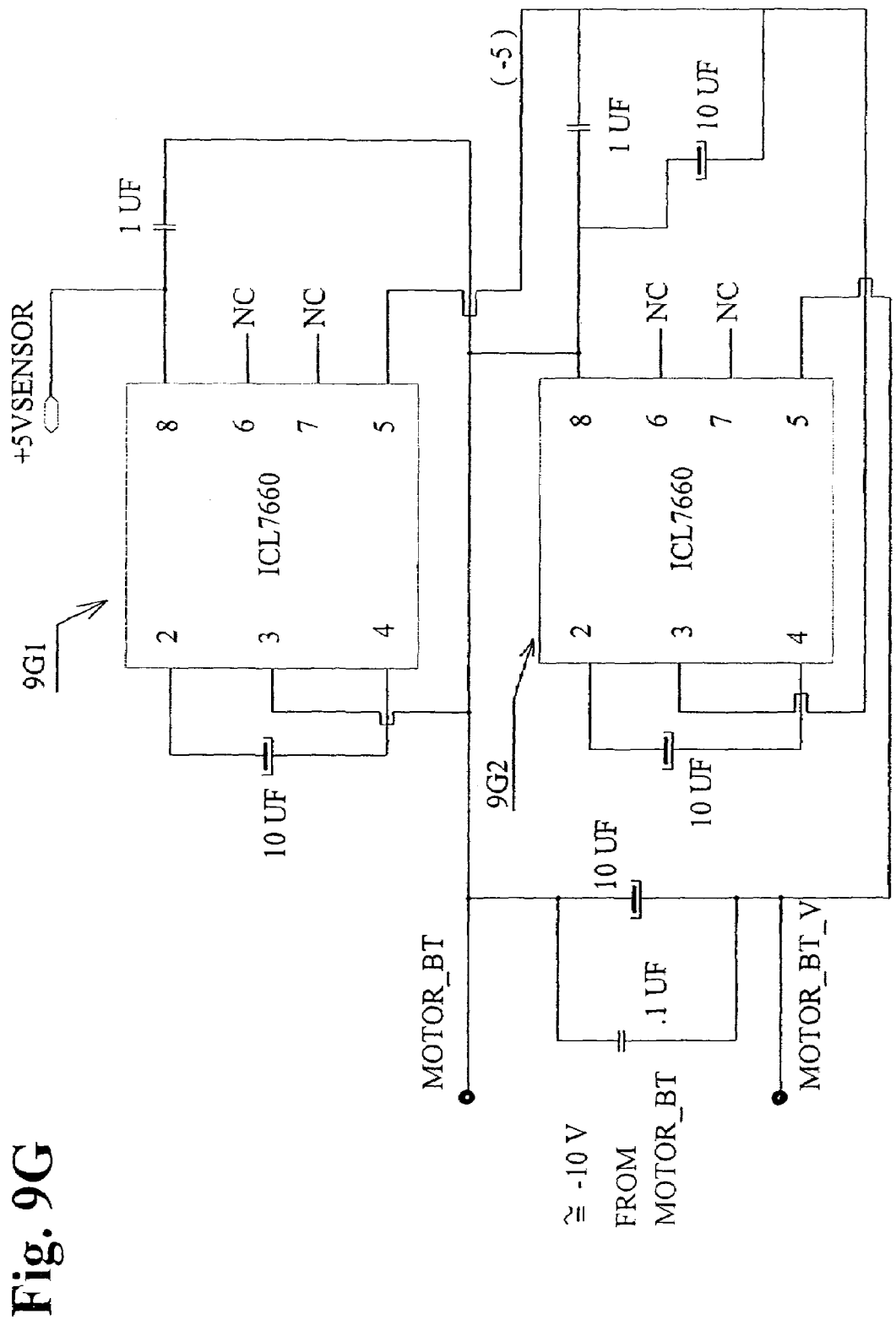
Figure 9H:
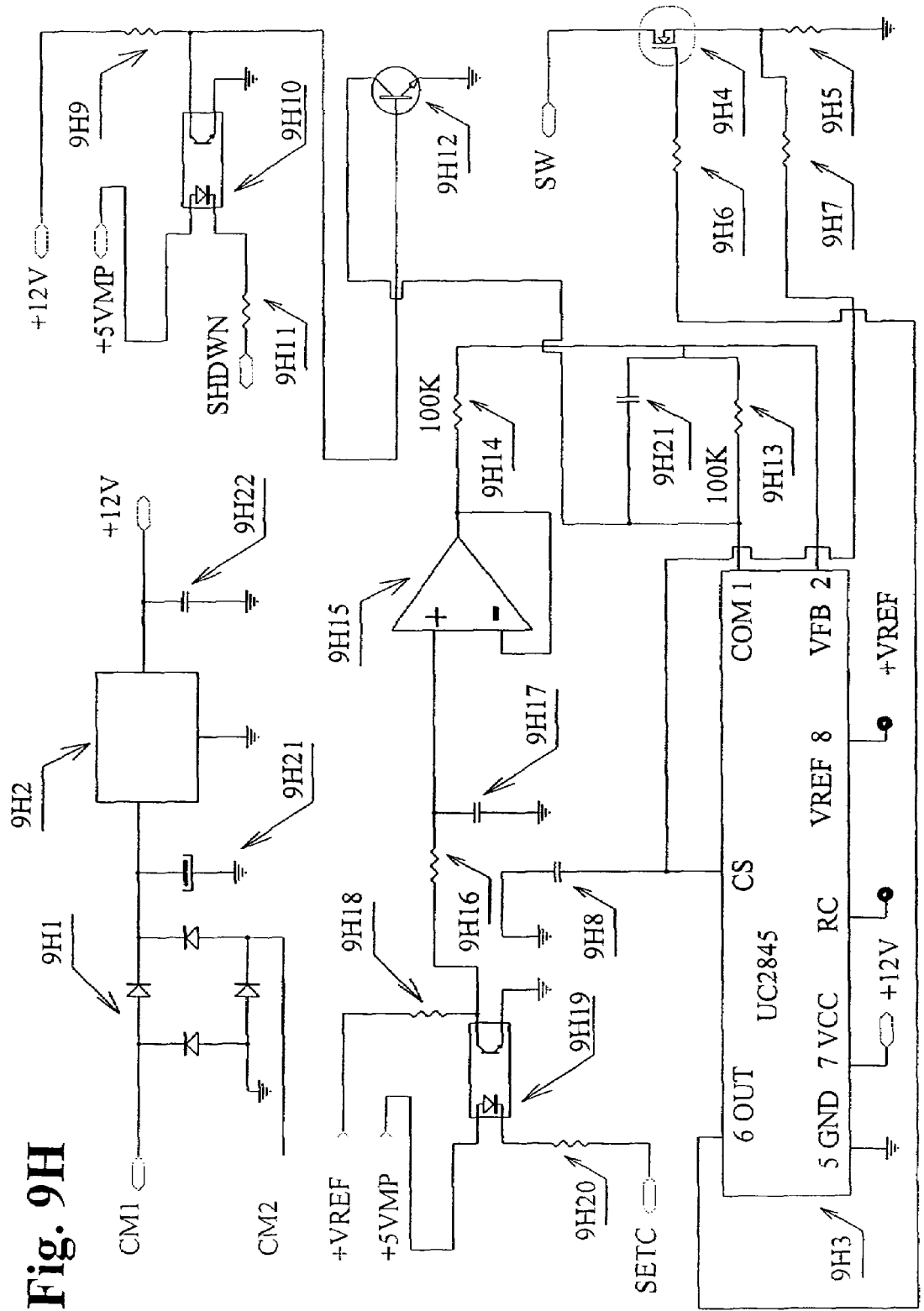

Reference 13 uses an integrated circuit (UC3842) belonging to the same family (similar type of control system and pulse width modulator) as the integrated circuit (UC2845) used in one of the embodiments of the invention depicted in FIG. 9H. Reference 23 is the data sheet for the UC3842.

This means that the pulse-width modulation scheme used can be any of the types currently used to control the current through relay coils of motor windings, when the available voltage is compatible with the maximum operating voltage through the windings. It must be noted, however, that with the circuit shown in FIG. 5, there is no need for a capacitor in parallel with the motor and there is also no need for any inductance externally connected in series with the motor winding.

The chosen value for capacitor (65) is not critical but cannot be too small. If at the frequency of operation of the pulse width modulator (69) the impedance of the capacitor (65) is negligible in comparison with the impedance of the motor (66), the value of the current through the inductive element does not depend on the characteristics of the motor (66).

Capacitor (65) may be chosen large enough to render the system formed by the capacitor (65) coupled with the impedance of the motor and the inductance (64) at least slightly over-damped. However, the resulting capacitor can be big. It is not necessary, if the rate of change of the controlled average current is limited.

Because of the current feedback system used in FIG. 6B to keep the current through the motor (66) constant, independently of the motor voltage, the inductive element (64) does not resonate with capacitor (65). Consequently, any ringing in the voltage between the motor (66) and the common terminal has a frequency ($f_{Mring}$) given by:

$$f_{Mring}=1/(2\pi\sqrt{(L_M*C)})$$

where $L_M$ is the inductance of the windings of the motor (see FIG. 6B).

Also, if $R_{ESR}$ is assumed to be negligible in comparison with $R_M$, the condition to choose the value of capacitor (65), C, for the output circuit in FIG. 6B to be over-damped is:

$$C>L_M*4/R_M^2.$$

Capacitor (65) has to have a low ESR and good pulse characteristics. The type of capacitors used as filters in switched mode power supplies is a suitable choice.

In some of the embodiments of the invention, the capacitor in parallel with the motor is also used to accumulate charge, making it possible to have different current through the inductive element and the motor.

Sometimes, with the known systems (FIG. 5), a small value capacitor, typically a ceramic high frequency capacitor, is used to filter commutation noise in DC motors to improve EMI compliance. This capacitor cannot be confused with capacitor (65).

If the noise filtering capacitor of the current state of the art is removed, the motor continues to operate. However, this only happens with the embodiment of the invention, if the inductance of the motor has a value such that the inductive divider formed with the inductive element (64) yields a resulting voltage compatible with the safe operation of the motor. With the capacitor (65) in the circuit, the impedance of the motor conducts only DC current in steady state, and hence is not part of the dynamic of the system controlling the current. With some systems, it would be an advantage not to have current at the frequency of operation of the PWM (69) travelling through the wires to connect to the motor (66), especially if the frequency is high, to have a physically small inductive element (64).

Some of the pulse-width modulation schemes known that can be used for the circuit disclosed in FIG. 6 are listed below:

1. Hysteresis PWM
   Cycle by cycle current control. A hysteresis band is set around the desired current level. The top of the hysteresis band determines when the switch is turned on and conversely the bottom of the band determines when to turn the switch off. Ripple current is determined by the difference between the levels and the speed of reaction of the circuitry. Must be able to sense the current during the whole cycle. Frequency is determined by the value of the currents, the value of the DC voltage source and the value of the energy (current) storing inductance.

2. Clocked turn-ON, constant frequency PWM
   Cycle by cycle current control. A periodic signal (clock) starts the cycle by turning the switch on. At a desired current level the switch is turned off. The frequency is determined by the frequency of the periodic signal. It is necessary to measure the current while the switch is on, and not during the whole cycle. It is the most commonly used PWM in systems with current mode control. It is the system shown in FIG. 6B, used in the IC chosen for the detailed implementation shown in FIG. 9H (UC2845) and implemented with small scale integrated circuits in FIG. 11B.

3. Clocked turn-OFF, constant frequency PWM

Cycle by cycle current control. Like the type 2 above, but the periodic signal turns the switch off, to be turned on when the current has dropped under a set value. It is not necessary to measure the current during the whole cycle. The frequency is determined by the frequency of the periodic signal.

4. Two current levels PWM (also called triangle PWM)

Cycle by cycle current control. One current level to turn the switch on, another to turn the switch off. Ripple current determined by the difference between the levels and the speed of reaction of the circuitry. Must be able to sense the current during the whole cycle. Frequency is determined by the value of the currents, the DC voltage source and the value of the energy (current) storing inductance.

5. Constant OFF time PWM

Cycle by cycle or average current control. The cycle starts by turning the switch on. When the current reaches a pre-set level, the switch is turned off and stays off for a fixed amount of time, to complete the cycle. At the end of the fixed period of time, the switch is turned on again, starting a new cycle. It is necessary to measure the current while the switch is on, and not during the whole cycle. Frequency is determined by the value of the current, the value of the DC voltage source, the value of the energy (current) storing inductance and the fixed time off of the switch. If the average current over a number of cycles is controlled, the on time is made to vary as a result of the difference between the desired current and the actual current.

6. Constant ON time, average current PWM

The switch is closed for a fixed period of time. At the end of the fixed period, there is a variable delay, and the cycle starts again. The frequency is variable. The average current over a number of cycles is controlled, rather than during each cycle. The off time is made to vary as a result of the difference between the desired current and the actual current.

7. Constant frequency, variable duty cycle PWM

The duty cycle of a square wave is made to vary as a result of the difference between the desired current and the actual current. The average current over a number of cycles is controlled, rather than during each cycle. It is the most widely used choice in voltage control mode switch-mode power supply integrated circuits. It is also available as a peripheral in microcontrollers.

8. All variable (On time, Off time and the Frequency)

This method is described in Reference 7 at page 64.

A more detailed description of the operation of the pulse-width modulation schemes above can be found in:

Reference 1, pages 174-179.
Reference 3, pages 64, 93, 104-145, 249 and 297.
Reference 12, pages 70-75.

FIG. 6A shows the idealized waveforms in the system depicted in FIG. 6. The names in the charts are referencing points in the embodiment of FIG. 6B. However, as only two cycles are shown, any of the above-listed pulse-width modulation schemes give similar waveforms. Obviously, if a large enough number of cycles would be considered, different pulse width modulators show different timing, since for instance some change the frequency of operation. However, there always is a "$T_{ON}$" and a "$T_{OFF}$", the analysis can be made in a similar way, the results will be similar, and with all of them a similar value of average current can be obtained.

In FIG. 6A, the waveform in the charts, are:

| | |
|---|---|
| $V_A$: | Voltage between point A in FIG. 6B and ground. |
| $V_{FD}$: | Forward voltage diode (63). |
| $V_S$: | Voltage across the switch (62). |
| $V_{DSW}$: | Voltage-drop across the switch (62) when the current $I_L$ flows. |
| $V_L$: | Voltage across the inductive element (64). |
| $V_{LP}$: | Peak value of $V_L$. |
| $V_{LM}$: | Minimum value of $V_L$. |
| $I_L$: | Instantaneous current across the inductive element (64). |
| $\Delta_{IL}$: | Difference between the maximum and the minimum values of $I_L$. |
| $I_{LPK}$: | Peak value of $I_L$. |
| $I_{AVERAGE}$: | Average value of $I_L$. Is similar to the current through the motor $I_M$. |
| T: | Period of the pulse width modulator (It can be variable). |
| $I_M$: | Motor current, the variable that is controlled, by changing the PWM. |
| $I_C$: | Current through the capacitor (65). |
| $T_{ON}$: | Period of time the switch (62) is closed, SWC must be high. |
| $T_{OFF}$: | Period of time the switch (62) is open, SWC must be low. |
| $V_C$: | Voltage over (C65B) the capacitive part of the model of the real capacitor (65). |
| $V_{ESR}$: | Voltage over $R_{ESR}$ the resistive part of the model of real capacitor (65). |
| $V_M$: | Voltage as indicated in FIG. (6B). |
| SWC: | Control input to the switch (62). A high value causes the (62) to close. |
| $I_S$: | Current through the switch (62). |
| $I_D$: | Current though the diode (63). |

For all the charts, the independent variable is the time.

Some of the charts in FIG. 6A have the dependent variable not in scale. This was thought to be a better choice than letting the small value of some variables like $V_C$, $V_{DSW}$ and $V_{FD}$ hide their existence in the charts. If the power source (61) in FIG. 6 is rectified AC main voltage, the value of $V_{LP}$, in the chart labelled $V_L$, has to be drawn out of scale, as shown in the chart.

Figure 1:
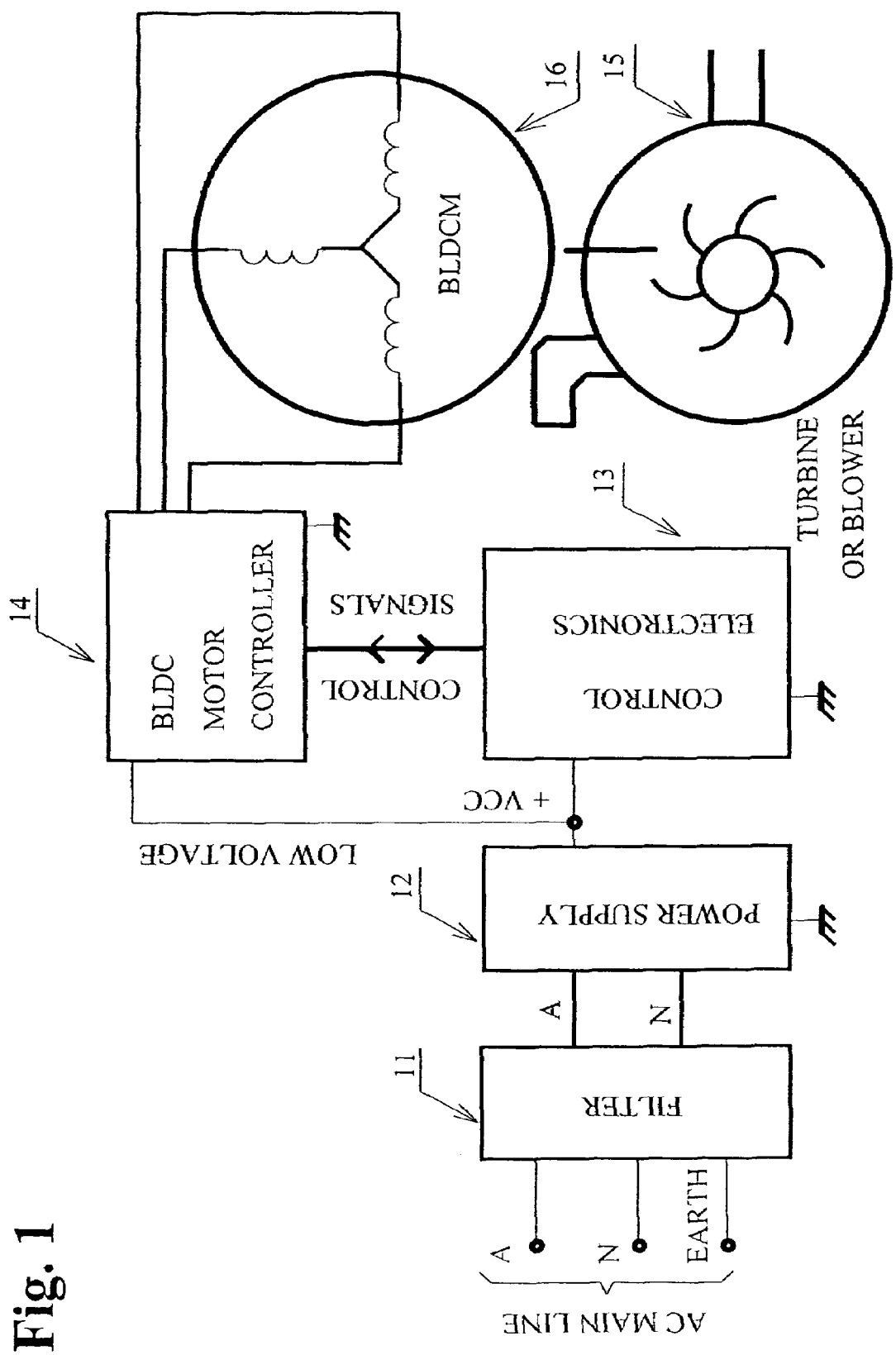
FIG. 1 is a block diagram of an airflow generator with a common power supply for the control electronics and the brushless DC motor driver.
Figure 2:
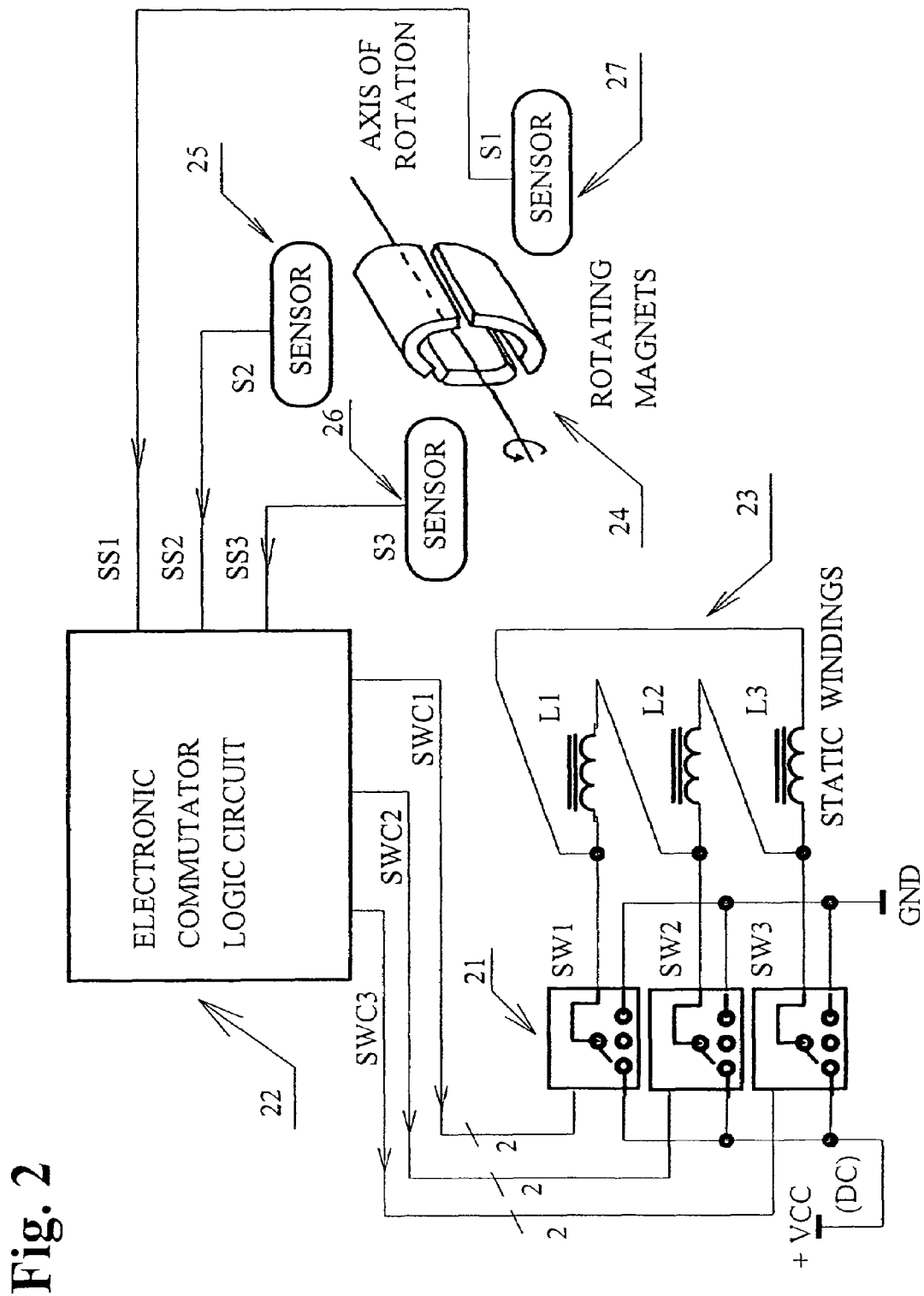
FIG. 2 is a block diagram of a brushless DC motor included for the sake of clarity.
Figures 2, 6C:
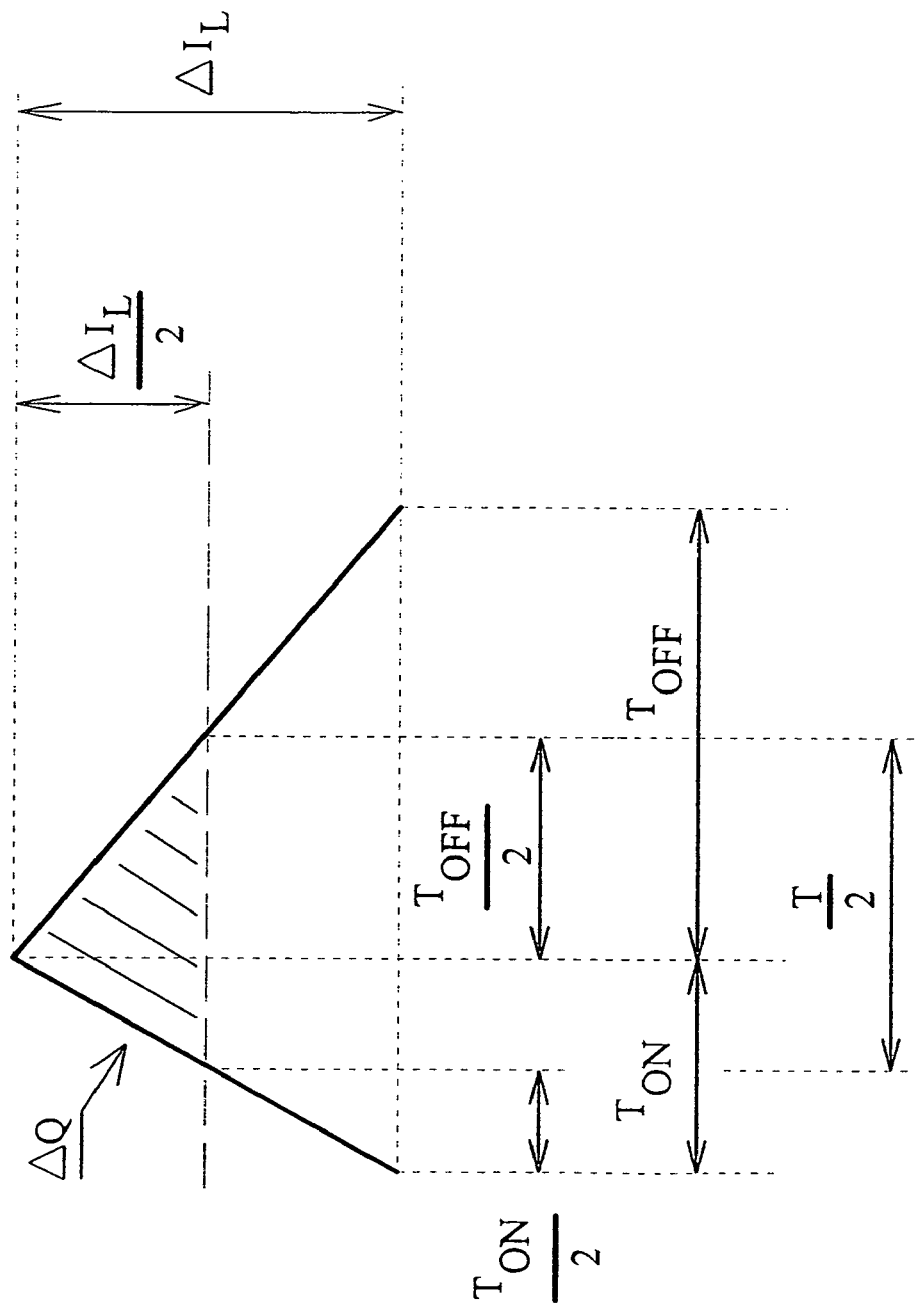

FIGS. 6C-1 and 6C-2 have the equations describing the operation of the circuit disclosed in FIG. 6, using the embodiment shown in FIG. 6B. The equations hold true even if a different pulse-width modulation scheme is used. With some types of pulse width modulator, the frequency is not constant. The equations, however, are correct for each value of the parameters, once steady state is reached. While most of the variables have already been listed above, the exceptions are:

| | |
|---|---|
| $V_{DC}$: | Value of the voltage of the DC power source (61). |
| $R_M$: | The resistance of the windings and commutator of the motor (66). |
| Vemf: | Counter electromotive force of motor (66). It is the voltage induced in the windings as the motor axis rotates. |
| Kv: | DC motor constant. The voltage of Vemf induced for unit of angular speed (Volt * sec). |
| ω: | Angular speed of motor axis (1/sec). |
| $V_{RS}$: | Voltage that is the result of the current been measure using the sensing resistor (67). |

-continued

| | |
|---|---|
| $R_S$: | Value of the sensing resistor used to measure the current. The resistor value has to be negligible in comparison with the resistance of the motor $R_M$. |
| $R_{ESR}$: | Effective serics resistance of the real capacitor (65). |
| $I_{LMIN}$: | Minimum value of the current through the inductance (64). |
| F: | Frequency of the pulse width modulator F = 1/T. |

The analysis used the fact that as the impedance of the capacitor (65) at the frequency of operation F is negligible in comparison with the impedance of the motor (66), all the AC components (the terms containing a multiple of the angular frequency, in the Fourier series expansion) of the pulse width modulated waveform can be considered to circulate through the capacitor. That sum of terms is what makes the current $I_C$. The rest of the current through the inductive element (64) circulates through the motor (66). The current through the real capacitor (65) causes a voltage drop, due to the impedance of the capacitive (C) component of the capacitor (65) and also its effective series resistance $R_{ESR}$. For the analysis to be accurate, this voltage drop has to be negligible in comparison with the motor voltage $V_M$.

Equation (3) in FIG. 6C-1 shows this assumption, as it states that the motor voltage is approximately equal to $I_M*R_M$+Vemf.

The equations in FIGS. 6C-1 result from applying Kirchhoff's laws to FIG. 6B.

It is also assumed that the inductive element (64) has no series resistor associated with the inductive element. Hence the equation (15) is true and results in equations (16), (17) and (18), of FIGS. 6C-1, when the switch (62) is closed, and in equation (19), of FIGS. 6C-2, when the switch is open and the current is circulating through the diode (63).

Equation (20) shows, as it can be seen in the chart $I_L$ of FIG. 6A, that in steady state, the net change of current through the inductive element per cycle is zero. That is, the current grows when the switch is closed and is equal to the current drop when the switch is open.

Equation (21) eliminates the voltage drop over the switch (62) ($V_S$) and the forward voltage drop over the diode (63) ($V_{FD}$), as they are negligible in comparison with the terms they are subtracted from or added to.

Equation (22) follows from equation (21) and gives the relationship that the duty cycle ($T_{ON}$/T) of the pulse width modulator has with the motor voltage, as a consequence of the motor current.

This system differs from a current driven buck converter in that the voltage over the load is not a regulated variable, but it is the result of the effect of the current itself in the load. In a DC motor, the voltage in the load is related to the back electromotive force (Vemf) induced in the motor windings as a result of the motion of the windings in the magnetic fields inside the motor. In fact, given the typical values of resistor RM, and the voltage drop caused on it by the motor current, VM can be used as an estimate of the speed of the motor.

The differences with the current fed buck converter and the well-known down converter switched mode power supply are:

| | |
|---|---|
| DF_1. | Under normal operation, the voltage in the load is not taken into account by the control loop, while in a switched mode power supply, is the controlled variable. With a DC motor, its voltage depends on the back emf. Hence, the voltage depends on the speed of rotation of the motor axis. |

-continued

| | |
|---|---|
| DF_2. | In a switched mode power supply, the capacitor in parallel with the load filters the ripple voltage and may provide the current to the load when the energy accumulated in the inductance drops to zero before the end of the period of the pulse width modulator (what is normally called discontinuous operation). In the embodiment of the invention however, if the current through the inductance drops to zero, the inertia of the motor keeps the motor rotating, and the voltage over the motor is kept by the electromotive force induced in the winding as the motor axis rotates. |

The analysis of the system of FIG. 6B continues in FIGS. 6C-2 for the AC component of the voltage in $V_M$ due to the voltage drop over the capacitor (65) while in steady state.

The graph in FIGS. 6C-2 is a detailed enlargement of the chart labelled $I_C$ of FIG. 6A. It has to be examined keeping in mind that the current through capacitor (65) is similar to the current through the inductive element (64), where the average current $I_{AVERAGE}$ has been subtracted. The area shaded in the drawing, labelled ΔQ, is the total amount of charge that is transported during one-half of the cycle of the pulse width modulator (65), in or out of the capacitor (65), from the inductive element (64).

Equation (23) in FIGS. 6C-2 is the area of the triangle that has been shaded in the drawing (half the base multiplied by the height). Equation 24 in FIGS. 6C-2 shows the relationship between the current variations through the inductive element (64) and the peak voltage in the capacitive component (C) of the model of capacitor (65).

To get the voltage over capacitor (65), the voltage drop over the resistive component $R_{ESR}$ of the model of capacitor (65) must be added, as is shown in equation (25) of FIGS. 6C-2.

If the typical figures for the variables in equation (25) are replaced, the result of equation (26) of FIGS. 6C-2 is reached, validating the original assumption regarding $V_M$ in equation (3) of FIGS. 6C-1.

Numerous variations in the implementation of the circuit disclosed can be made.

The inductance, for instance, can be the inductance of the winding of a transformer. In this case, other windings could produce uncontrolled voltages that can be used to power electronic circuits. This scheme has been widely used in switched mode power supplies.

Another modification of the system disclosed above is that the sense of the current can be changed by changing the polarity of the voltage source. This can be easily done by replacing the switch in FIG. 6 with a bridge circuit as is commonly done in four-quadrant control of DC motors. Also the embodiment of the invention can be applied to what is known as universal motors, a motor with conventional brushes that is insensitive to the sense of the current through it, and it is normally driven by an AC voltage source.

In yet another modification, the capacitor (65) in FIG. 6 can be present, not as an individual component, but embedded in other circuit blocks, as for instance the electronic commutator of a brushless DC motor if the motor (66) is a brushless DC motor, or other control electronics coupled with the motor (66).

All the strategies of pulse-width modulation used with the known systems can be used with the embodiment of the invention to implement the control system (68) and the pulse width modulator (69). Similarly, the switch (62), the diode (63) and the current sensor (67) have the same function as with the current state of the art and can be designed following criteria well known to those skilled in the art.

Some of the numerous possible variations of the circuit shown in FIG. 6 are shown in FIG. 7A to FIG. 7L.

Figure 7A:
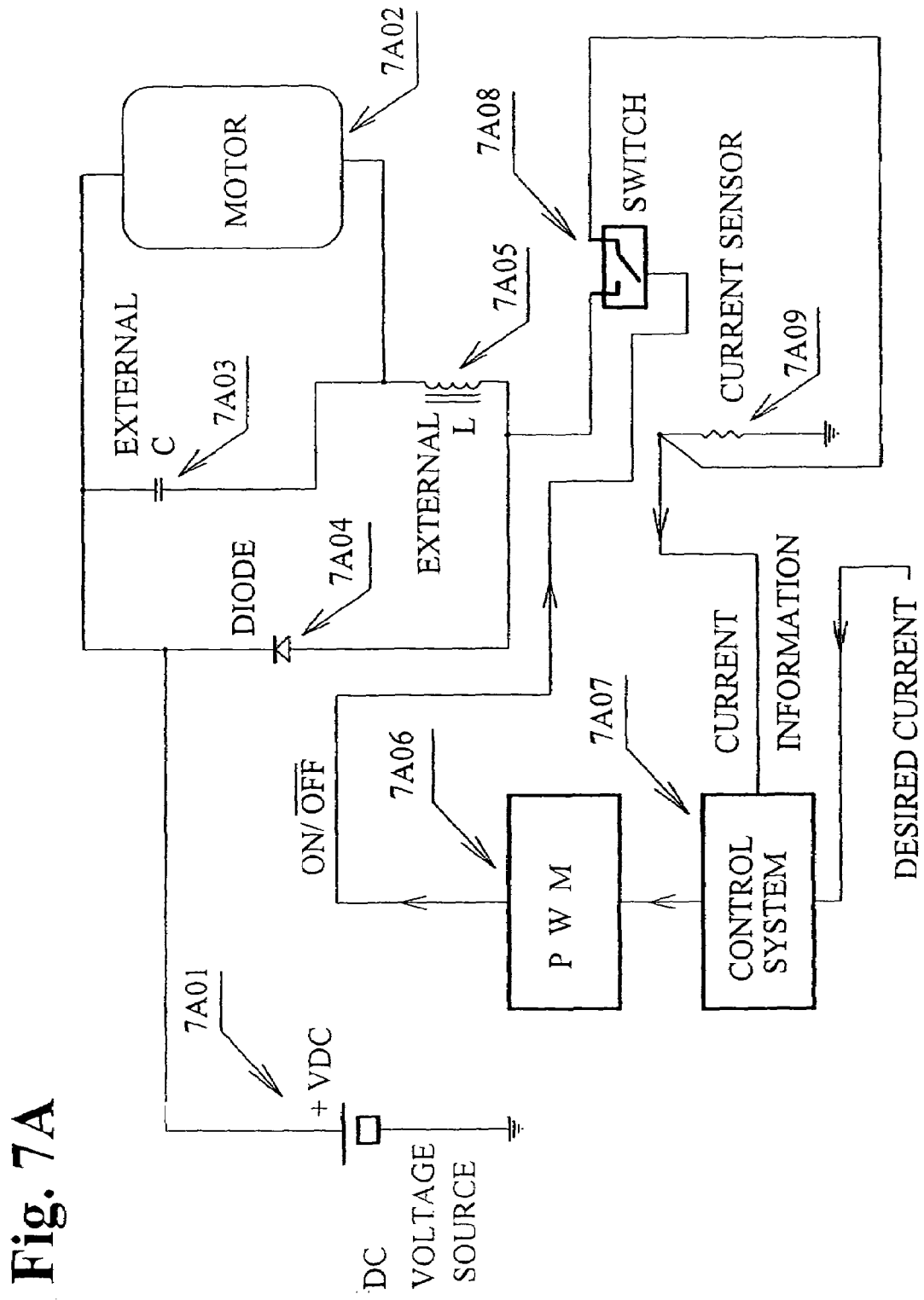

FIG. 7A shows a system similar to FIG. 6 with a different topology. The power source (7A01) has a similar function to the voltage source (61) in FIG. 6. Motor (7A02) has a similar function to the motor (66) in FIG. 6. Capacitor (7A03) has a similar function to the capacitor (65) in FIG. 6. Diode (7A04) has a similar function to the diode (63) in FIG. 6. The inductive element (7A05) has a similar function to the inductance (64) in FIG. 6. Control system (7A07) has a similar function to the control system (68) in FIG. 6. Pulse width modulator (7A06) has a similar function to the modulator (69) in FIG. 6. Current sensor (7A09) has a similar function to the current sensor (67) of FIG. 6. The switch (7A08) has a similar function to the switch (62) of FIG. 6, however, switch (7A08) is connected to ground rather than the positive terminal of the power source (7A01). This circuit makes the implementation of the electronics switch (7A08) and its drivers easier (or simpler) than the electronic switch (62) in FIG. 6. However, the motor (7A02) is removed from the common terminal of the circuit.

Although electrically it appears to be similar to swap the position of the inductive element (7A05) and the parallel combination of the motor (7A02) and the capacitor (7A03), in practice, it is better to connect as shown in FIG. 7A. The reason for this is that in the way shown, the isolation of control elements connected to circuits in the motor are subject to less AC voltage stress with respect to grounded circuit blocks.

A detailed implementation of this topology is shown in FIGS. 9A to 9L.

FIG. 7B shows that there are many points to measure the current for the control system of the circuit disclosed in FIG. 6. FIG. 7B follows the same architecture as FIG. 6. In this figure, the blocks (68) and (69) of FIG. 6 have been joined together in a single control system (7B09).

(7B01) is similar to (61). (7B10) is similar to (62). (7B06) is similar to (64). (7B11) is similar to (65). (7B12) is similar to (66). (7B7) is similar to (63).

All the components 7B02, 7B03, 7B04, 7B05 and 7B06 are current sensors. However, as will be apparent to those skilled in the art, not all the positions render the same waveform. Furthermore, if the sensor is not sensing current in a branch of the circuit connected to ground (e.g., in (7B02) and (7B06)), differential amplification techniques like the circuit shown on (7B14) must be used. The current in (7B03), (7B05) and (7B04) can be sensed with a simple small value resistor without differential techniques. A current transformer like the one illustrated in (7B13) can be used in all the locations. Also, the current in (7B02) flows when the current in (7B03) is not flowing. Current in (7B06) is similar to (7B04). With the values normally chosen for the capacitor (7B11), at the frequency of operation normally chosen to control the switch (7B10), all the high frequency components of the current flow through (7B11) and the low frequency components flow through the sensor in (7B05).

Hence a sensor in (7B05) cannot be used to control the current on a cycle-by-cycle basis, but only as the average over a certain number of cycles of the pulse width modulator embedded in (7B09). Reference 10, chapters 13 and 14, pages 3.172 to 3.192 provide useful information for implementation of current sensors.

Figure 7C:
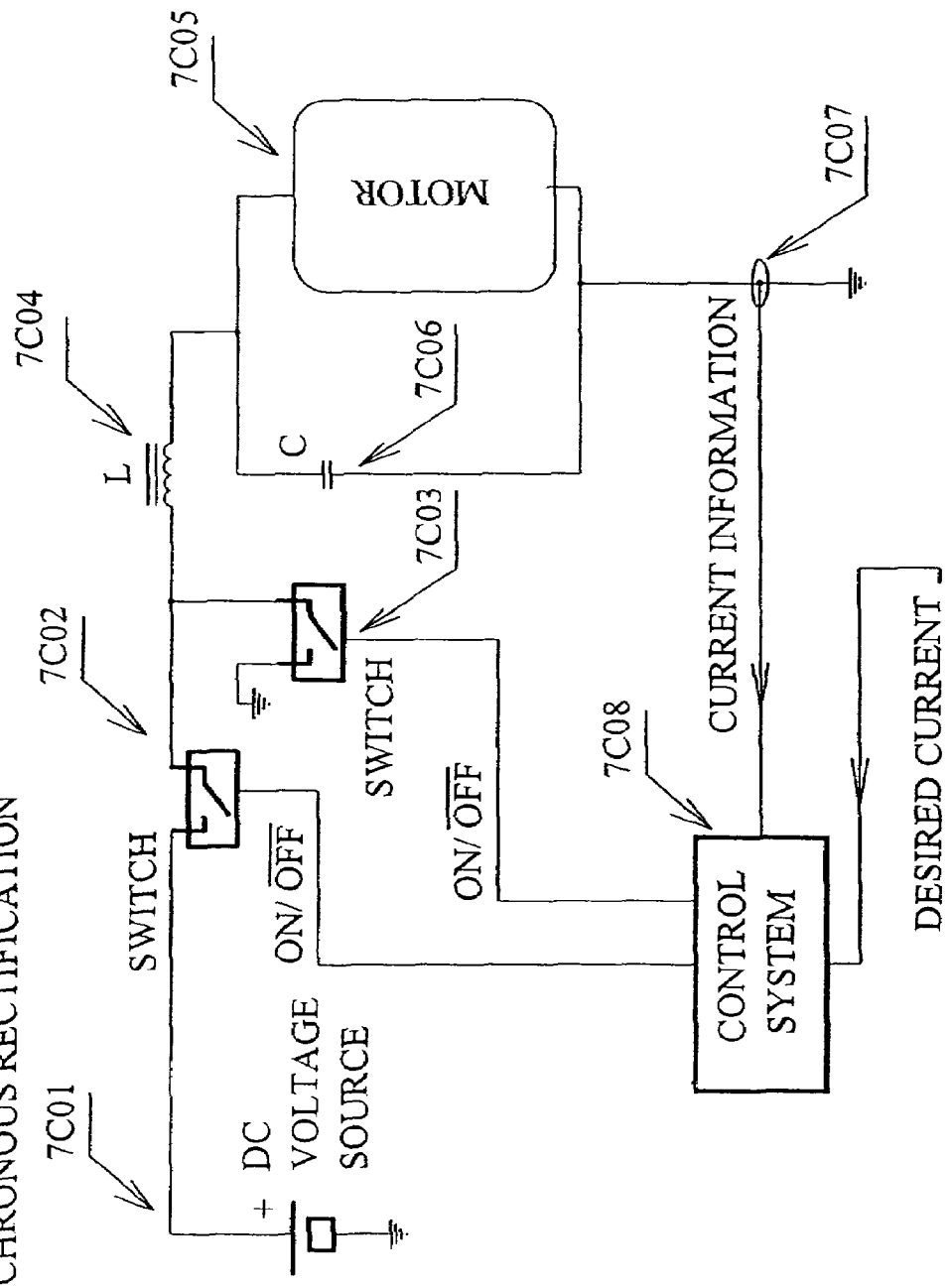

FIG. 7C shows a system similar in topology to FIG. 6. In this system, the pulse width modulator (69) and the control system (68) of FIG. 6 are included in the control system 7C08. If it is compared with FIG. 6 above: (7C01) is similar to (61); (7C02) is similar to (62); (7C04) is similar to (64); (7C06) is similar to (65); (7C05) is similar to (66); and current sensor (7C07) is similar to (67).

The difference with FIG. 6 is a switch (7C03) in the position of the diode in the other figures (63, 7A04 and 7B07). Control system (7C08) has an extra output to control the additional switch (7C03). Those skilled in the art of designing switched mode power supplies will recognize the technique known as "synchronous rectification". This technique consists of replacing the diodes by switches that dissipate less power than the diodes. The switches have to be closed or opened at the precise moment that the diode that they replace conducts (switch closes) or is blocking (switch opens). This technique is currently popular when the current is high, to increase the efficiency of switched mode power supplies, especially at low output voltages. In practice, as the power MOSFET transistors normally used to implement the switches also include a diode in parallel that can conduct when the switch performing the synchronous rectification is not yet closed, the synchronization does not need to be perfect. The control signals to the switches are the logical complement of each other. The controller (7C08) must not close both switches (7C02) and (7C03) at the same time or the power source (7C01) is shorted to ground. Each time the switches must change their state, a period of time in which both switches are commanded to be open must be introduced. This time is what is normally known as "dead time".

In the case of the switch replacing the diode (7C03), the diode in parallel with the switch starts conducting before the switch is made to close. This causes a negligible loss in efficiency. To facilitate the implementation, switch (7C03) can have an actual diode in parallel in addition to the diode embedded in the MOSFET transistor.

Reference 12, page 60 gives details of synchronous rectification. Also, Reference 24, section 2.2.3, pages 2-76 refers to "An introduction to synchronous rectifier circuits using PowerMOS transistors", and Reference 2 provides an implementation of synchronous rectification.

Figure 7D:
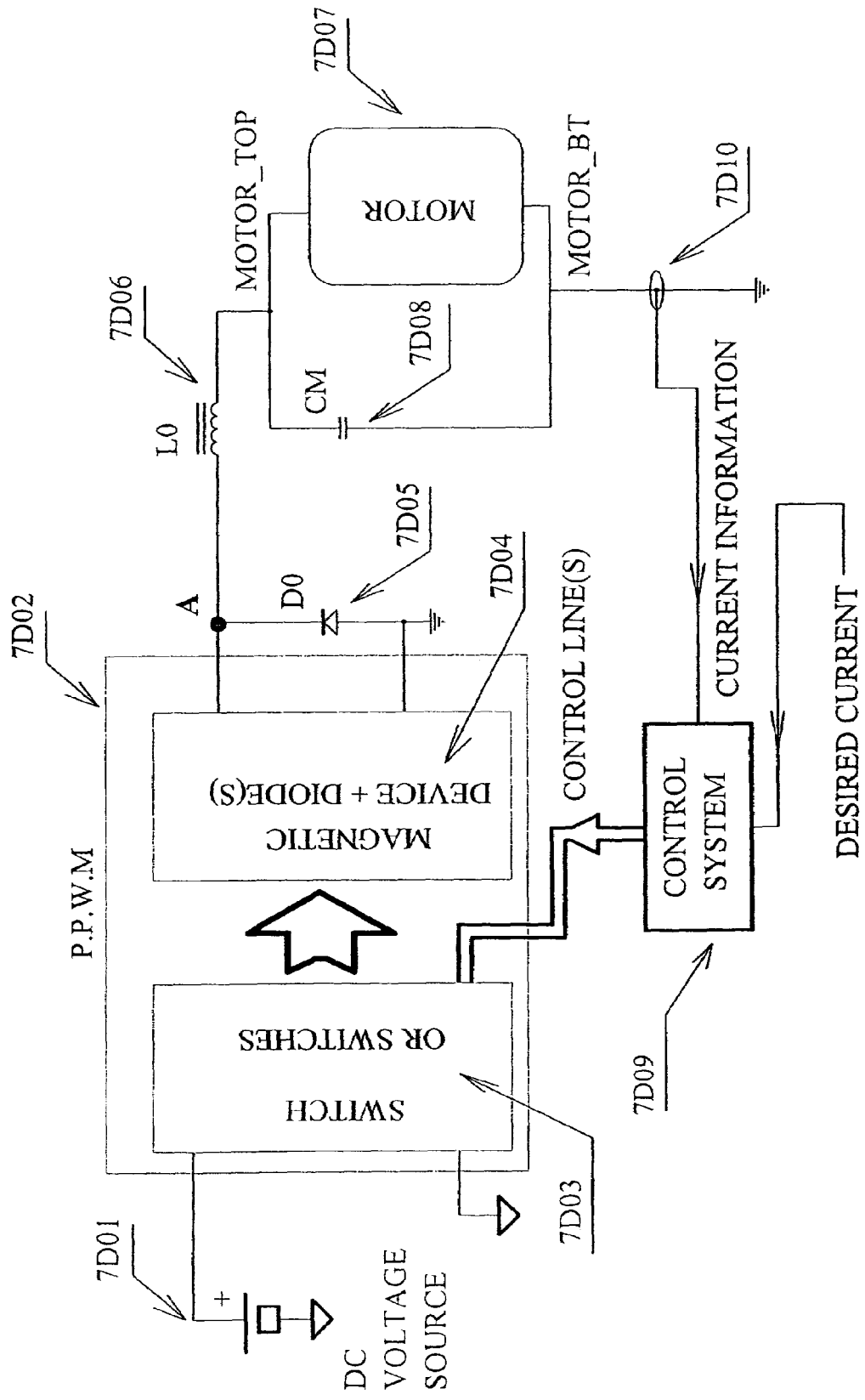

FIG. 7D shows a generalization of the circuit shown so far. The pulse width modulators (69) in FIG. 6 and (7A07) in FIG. 7 and the electronic switch (62) or (7A08), for instance, are simply providing alternatively a voltage close VDC or an open circuit (close to 0 voltage, as measured from the cathode of the diode (63) in FIG. 6).

Referencing FIG. 6, or FIG. 6B, any technique that provides a controllable pulse width modulated waveform in the point (A), extracting power from the DC power source (61) to be delivered to the components connected to point A, can be used with results similar to what the system in FIG. 6 can achieve with the switch (62).

A magnetic device, like a transformer, coupled with a plurality of switches and diodes can be used to that end. In view of the foregoing, it is possible to generalize and define a Power Pulse Width Modulator (PPWM) block (7D02) comprising a plurality of switches in block (7D03) coupled with a magnetic device, also coupled to a plurality of diodes, the latter combination in block (7D04).

Blocks like (7D02) are currently found in switched mode power supplies. The switches in block (7D03) inside PWM (7D02) are controlled from the control system 7D09.

The control system (7D09) includes the control system (68) and the pulse width modulator (69). It differs from similar blocks found in FIGS. 6 and 7A, in that if there is more than one switch, the system has to have more than one control line to command it to open or close.

Not shown in FIG. 7D, for sake of clarity, is the fact that in some combinations with more than one switch, it may be necessary to measure the current in more than one point. In those cases, control systems like (7D09) also differ from the combination (68) and (69) of FIG. 6, in that they receive current information from more than one sensor.

All other parts of the system shown in FIG. 7D are equivalent in function to part of the system shown in FIG. 6. Specifically, with reference to FIG. 6: (7D01) is similar in functionality to the power source (61); (7D06) is similar in functionality to the inductive element (64); (7D08) is similar in functionality to capacitor (65); (7D07) is similar in functionality to motor (66); (7D10) is similar in functionality to current sensor (67); and (7D05) is similar in functionality to diode (63).

The concept behind FIG. 7D will be more clearly understood in light of the following figures showing topologies currently used with switched mode power supplies applied to the circuit disclosed in FIG. 6. In each case, there is a different implementation of the PPWM block (7D02).

The reasons for adding a transformer to the circuit disclosed in FIG. 6 are:
Possibility of isolation between the power source (7D01) and the motor (7D07) or the control system (7D09).
The voltage of the power source (7D01) is not limited to values larger than the operating voltage of the motor (7D07).

The reason for not simply using an off-the-shelf switched mode power supply to drive the motor in current control mode using the circuit shown in FIG. 5 is that by implementing the circuit in the manner disclosed, a simpler, less expensive system results, especially if the system has to provide quick accelerations of the motor and power factor correction.

The current levels in the secondary side of the transformers (the motor side) are observed in the primary side (the switch or switches side) affected by the turns ratio of the transformer. This must be taken into account while designing the switches, and when placing current sensors in the primary side of the transformers.

After the generalization made in FIG. 7D, four examples follow:

Example 1

Figure 7E:
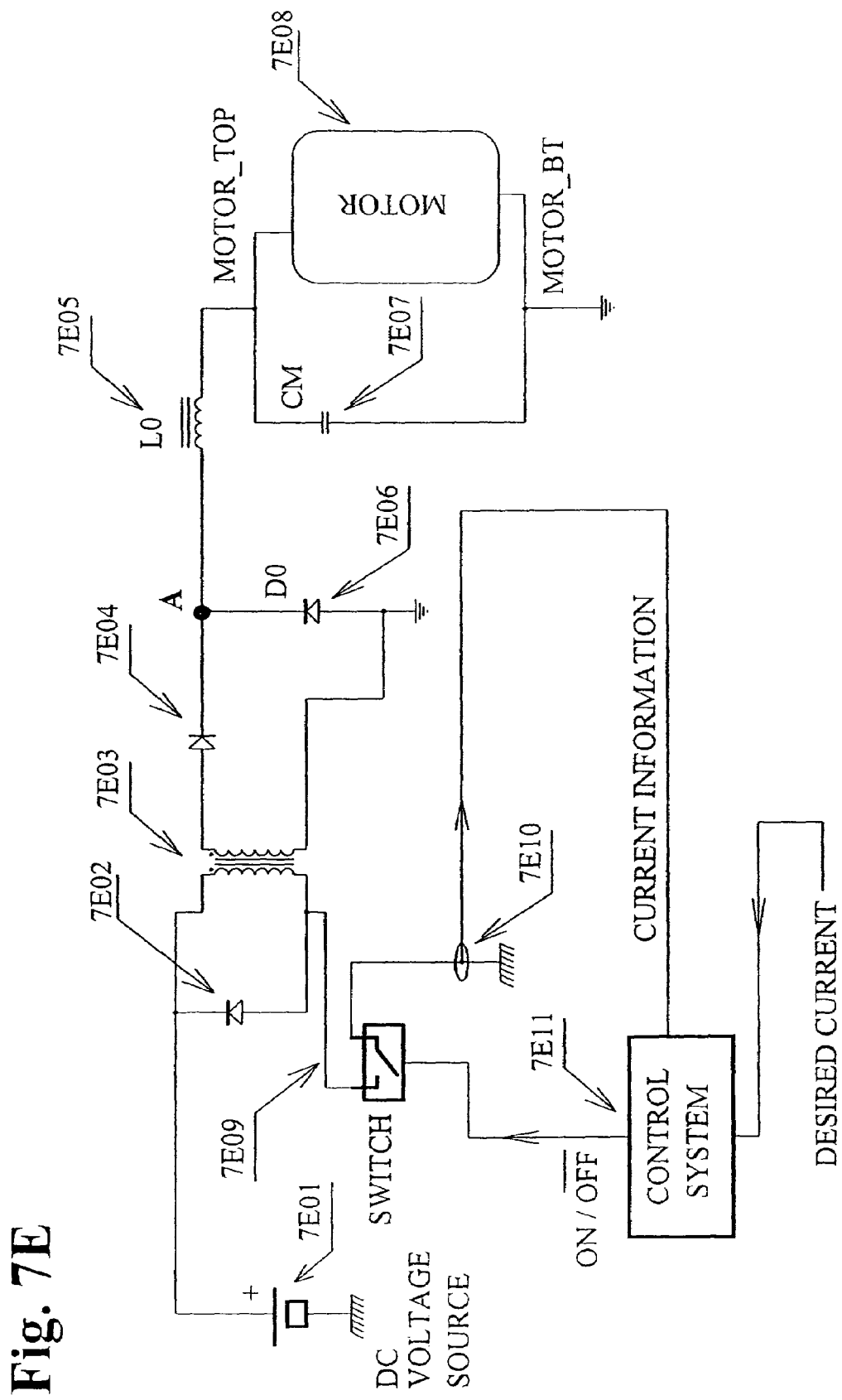

FIG. 7E. Topology Derived from the Forward Converter

The system in FIG. 7E uses a transformer (7E03) to couple a rectangular waveform to the node labelled (A) in the drawing. There is a pulse width modulator embedded in the control system (7E11) that controls the switch (7E09) that can command it to open or close. When the switch (7E09) opens and closes, a rectangular waveform is applied to the primary side of the transformer (7E03). This rectangular waveform is coupled by a transformer (7E03) to its secondary side and is coupled to the node labelled (A) in the drawing, through the diode (7E04). The node labelled (A) in the drawing is coupled to a system similar to the one found in FIG. 6. If FIG. 7E is compared with a combination of FIG. (6) and FIG. (7A), the following applies: Power source (7E01) is similar in functionality to the power source (61); winding or inductive element (7E05) is similar in functionality to the inductive element (64); capacitor (7E07) is similar in functionality to capacitor (65). Motor (7E08) is similar in functionality to motor (66); (7E10) is similar in functionality to current sensor (7A09); (7E09) is similar in functionality to the switch (7A08); and (7E06) is similar in functionality to diode (63). The pulse width modulator (7A06) and the control system (7A07) are embedded in the control system (7E11).

The function of diode (7E04) is to prevent the winding of transformer (7E03) short-circuiting the DC voltage in the point labelled (A) in the drawing to ground. Diode (7E02) discharges the energy accumulated in the inductance of the transformer (7E03), while the switch (7E09) is open. With this type of connection, the duty cycle of the pulse width modulator inside (7E11) has to be less than 0.5 (50%).

The same pulse width modulator detailed in FIG. (6B) can be used in (7E11), using the small resistor (67) of FIG. 6B to implement the sensor (7E10). However, it must be kept in mind that the current sensed in the position of sensor (7E10) is the current though the inductive element (7E05), affected by the number turn relationship of transformer (7E03).

Clearly, the combination of (7E02), (7E03), (7E04) and (7E09) implements the block (7D02) of FIG. 7D.

Those skilled in the art of switched mode power supplies, rather than motor control, will recognize that the system of FIG. 7E has part of the topology of a current mode "forward converter".

Details of how to design each of the components coupled with the transformer (7E03) and the transformer itself can be found in the following references:
Reference 3, page 217.
Reference 7, pages 104 and 170.
Reference 9, page 37.
Reference 10, pages 2.63 to 2.69.
Reference 11, pages 76-83.
Reference 12, pages 32 and 40.
Reference 24, pages 2-13, 2-84 and 2-101.

Example 2

Figure 7F:
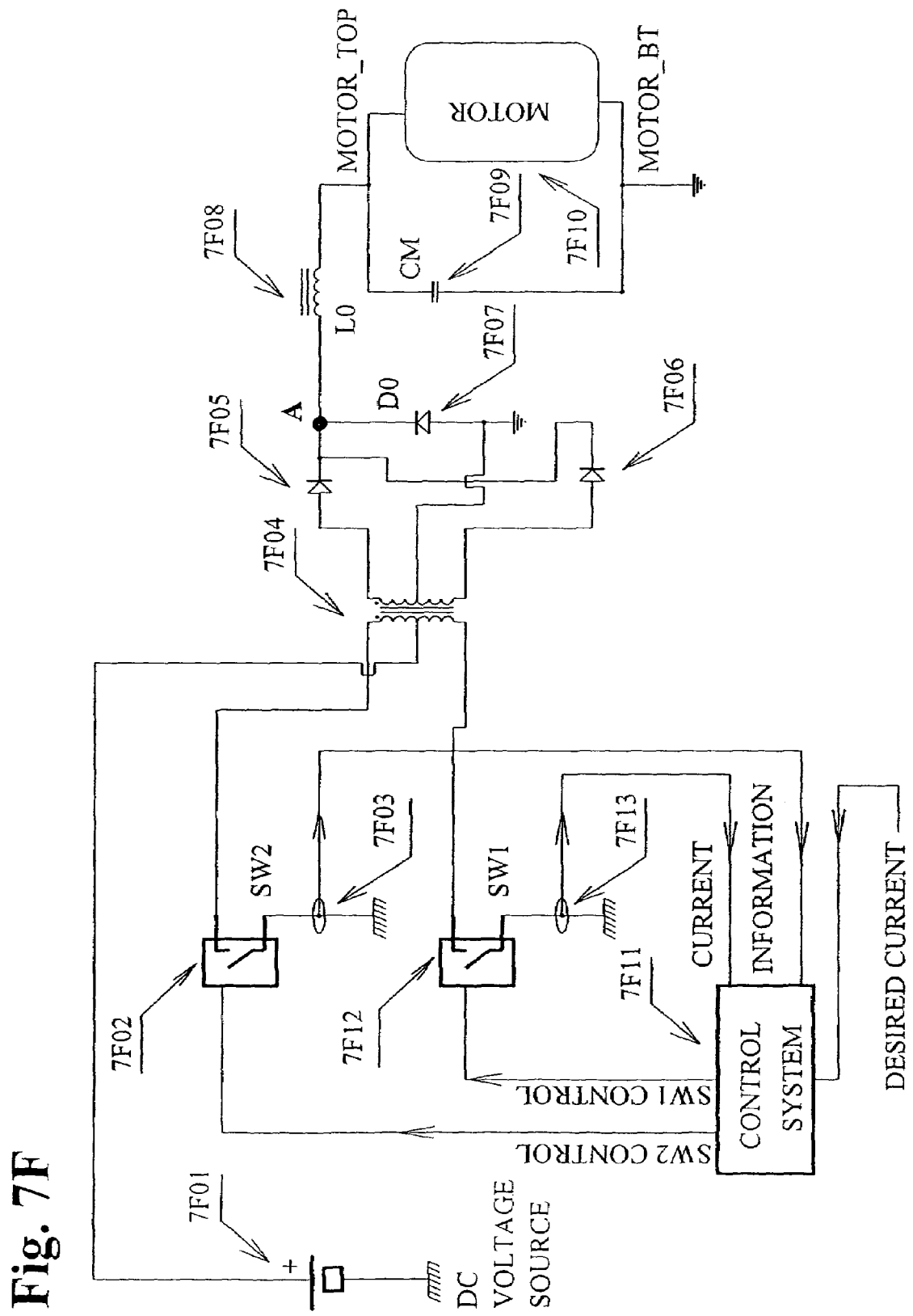

FIG. 7F. Topology Derived from the Push-Pull Converter

FIG. 7F uses a transformer (7F04), two switches (7F02) and (7F12), and two diodes (7F05) and (7F06) to implement the block (7D02) in FIG. 7D. The two switches alternate in opening and closing. The combination of elements named above generates a pulse width modulated waveform in the node labelled (A) in the drawing.

The node labelled (A) in the drawing is coupled to a system similar to the one found in FIG. 6. If FIG. 7F is compared with a combination of FIG. 6 and FIG. 7A, the following applies: (7F01) is similar in functionality to the power source (61); (7F08) is similar in functionality to the inductive element (64); and (7F09) is similar in functionality to capacitor (65). (7F10) is similar in functionality to motor (66); (7F13) and (7F03) are similar in functionality to current sensor (7A09); (7F02) and (7F12) are similar in functionality to the switch (7A08); and (7F07) is similar in functionality to diode (63). The pulse width modulator (7A06) and the control system (7A07) are embedded in the control system (7F11).

The function of diodes (7F05) and (7F06) is to prevent the winding of transformer (7F04) from short-circuiting the DC voltage in the point labelled (A) in the drawing to ground.

The control system (7F11) has the functionality of the control system (7A07) and the pulse width modulator (7A06). One difference is that control system (7F11) has to take information from two current sensors (7F03) and (7F13). However, since when one switch is open the other is closed, the current information from both sensors can simply be added together, and can be filtered with a low pass filter, to get a waveform similar to the waveform of sensor (67) in FIG. 6. It must be kept in mind that the current sensed by the sensors is the current through the inductive element (7F08), affected by the number of turns relationship of the transformer (7F04).

The other difference is that consistently with the use of two switches, and as it was mentioned while commenting on FIG. 7D, the control system (7F11) has two outputs to control one switch each.

The system formed by transformer (7F04), diodes (7F05) and (7F06) and the switches (7F02) and (7F12) can be analyzed and designed with techniques similar to the techniques used in a "push-pull" switched mode power supply.

Details of how to design each of the components coupled with the transformer (7F04) and the transformer itself can be found in the following references:

Reference 3, page 220.
Reference 7, pages 116 and 153.
Reference 9, page 37.
Reference 10, pages 2.147 to 2.151 and 2.153 to 2.159.
Reference 11, pages 34-38.

Example 3

Figure 7G:
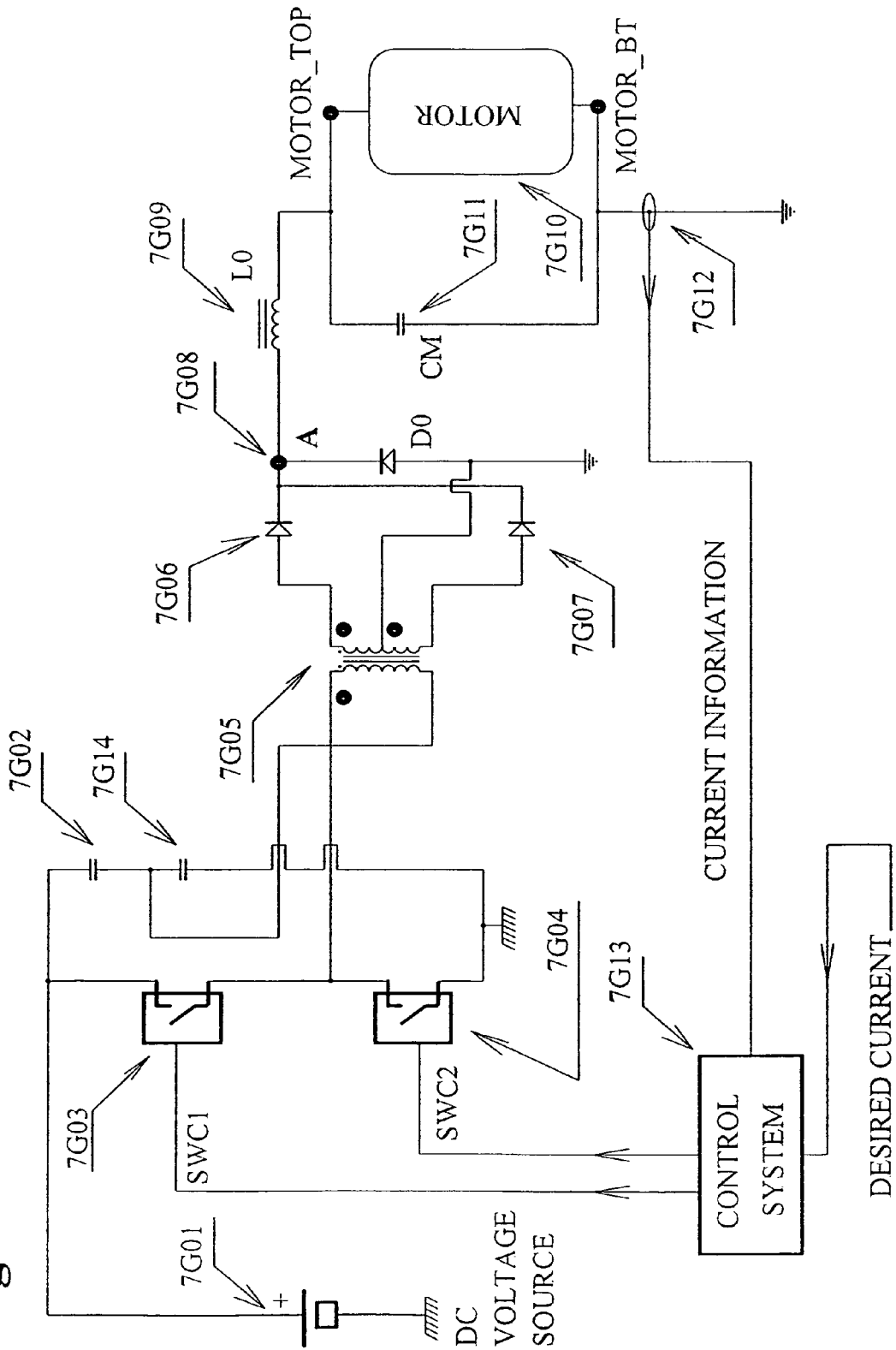

FIG. 7G. Topology Derived from Half- and Full Bridge Converter

In FIG. 7G, a block equivalent to the block (7D02) of FIG. 7D is implemented with capacitors (7G02) and (7G14), switches (7G03) and (7G04), diodes (7G06) and (7G07) and transformer (7G05).

The two switches alternate in opening and closing. The combination of elements named above generates a pulse width modulated waveform in the node labelled (A) in the drawing.

The node labelled (A) in the drawing is coupled to a system similar to the one found in FIG. 6. If FIG. 7G is compared with a combination of FIG. 6 and FIG. 7A, the following applies: (7G01) is similar in functionality to the power source (61); (7G09) is similar in functionality to the inductive element (64); and (7G11) is similar in functionality to capacitor (65). (7G10) is similar in functionality to motor (66); (7G12) is similar in functionality to current sensor (67); (7G03) is similar in functionality to the switch (62) and (7G04) is similar in functionality to the switch (7A08); and (7G08) is similar in functionality to diode (63).

The pulse width modulator (69) and the control system (68) are embedded in the control system (7G13).

The function of diodes (7G06) and (7G07) is to prevent the winding of transformer (7G05) to short-circuit the DC voltage in the point labelled (A) in the drawing to ground.

The control system (7G13) has the functionality of the control system (68) and the pulse width modulator (69). The current sensor 7G12 can be implemented with the small resistor of FIG. 6B. The control system must control two switches, so as mentioned while commenting on FIG. 7D, there are two control outputs.

Those skilled in the art of switched mode power supplies, rather than motor control, will recognize the transformer arrangement of the "half-bridge" switched mode power supply. Furthermore, by looking at FIG. 7G, it will be obvious to those skilled in the art of switched mode power supplies, rather than motor control, that replacing the capacitors (7G03) and (7G14) with diodes with the cathode connected towards the positive terminal of the power source (7G01) provides a "diagonal-half bridge" (sometimes called a "two transistor forward converter"). Further, by replacing the capacitors (7G03) and (7G14) with electronic switches controlled by adding two extra switch control lines to the controller in FIG. 7G13, the "bridge"—also known as a "full bridge" configuration—is obtained.

Details of how to design each of the components coupled with the transformer (7G05), and the transformer itself, can be found in the following references:

Reference 3, page 223.
Reference 7, pages 111, 113 and 152.
Reference 9, page 93.
Reference 10, pages 2.80 to 2.115.
Reference 12, page 33.

Example 4

Figure 7H:
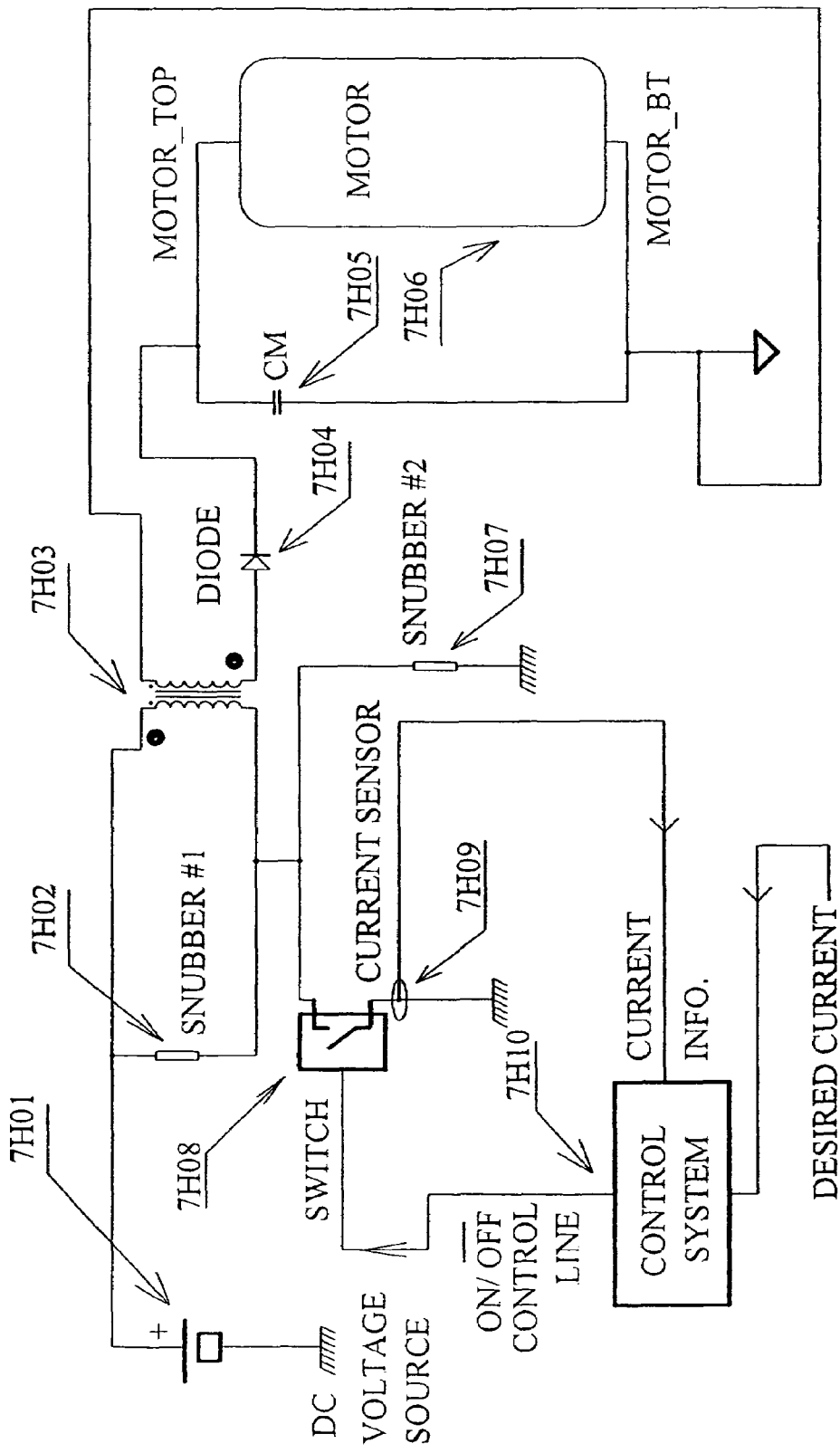

FIG. 7H. Topology Derived from the Flyback Converter

This embodiment is based on the switched mode power supply topology known as a flyback converter (also known as "ringing choke power supply"). In this case, the system is different from FIG. 7D, since a single component, the transformer (7H03), provides the functionality of both, the inductive element (64) and the catch or freewheeling diode (63) in FIG. 6. The inductive element (64) is provided by the transformer inductance, and the diode (63) is not needed because of the properties of the magnetic system formed by the transformer (7H03) if its windings are connected with opposing polarities. Transformers working in which the mode (7H03) is working have also been described in the literature as two coupled inductors.

Diode (7H04) is used simply to prevent the secondary winding of the transformer to short-circuit the positive motor voltage to ground.

Snubber circuits in blocks (7H02) and (7H07) are needed due to the fact that a practical transformer (7H03) has parasitic components, like for instance leakage inductance.

If FIG. 7H is compared with a combination of FIG. 6 and FIG. 7A, the following applies: (7H01) is similar in functionality to the power source (61); the functionality of the inductive element (64) is provided by transformer (7H03); (7H05) is similar in functionality to capacitor (65). (7H06) is similar in functionality to motor (66); (7H09) is similar in functionality to current sensor (7A09); (7H08) is similar in functionality to the switch (7A08); the functionality of diode (63) is provided by transformer (7H03). The pulse width modulator (7A06) and the control system (7A07) are embedded in the control system (7H110).

The control system (7H110) can be implemented with the pulse-width modulation method shown in FIG. 6B. This is a frequently used method for controlling current through a flyback transformer. An integrated circuit often used to implement this functionality in switched mode power supplies is the UC2845 (see Ref. 23).

Details of how a flyback transformer operates, how to design each of the components coupled with the transformer (7H03), and the transformer itself can be found in the following references:

Reference 3, page 214.
Reference 7, pages 151, 166 and 190.
Reference 9, page 105.
Reference 10, pages 2.3 to 2.62.
Reference 11, pages 29-34 and 83-90.
Reference 12, pages 32, 36-34 and 83-90.

Example 5

Figure 7I:
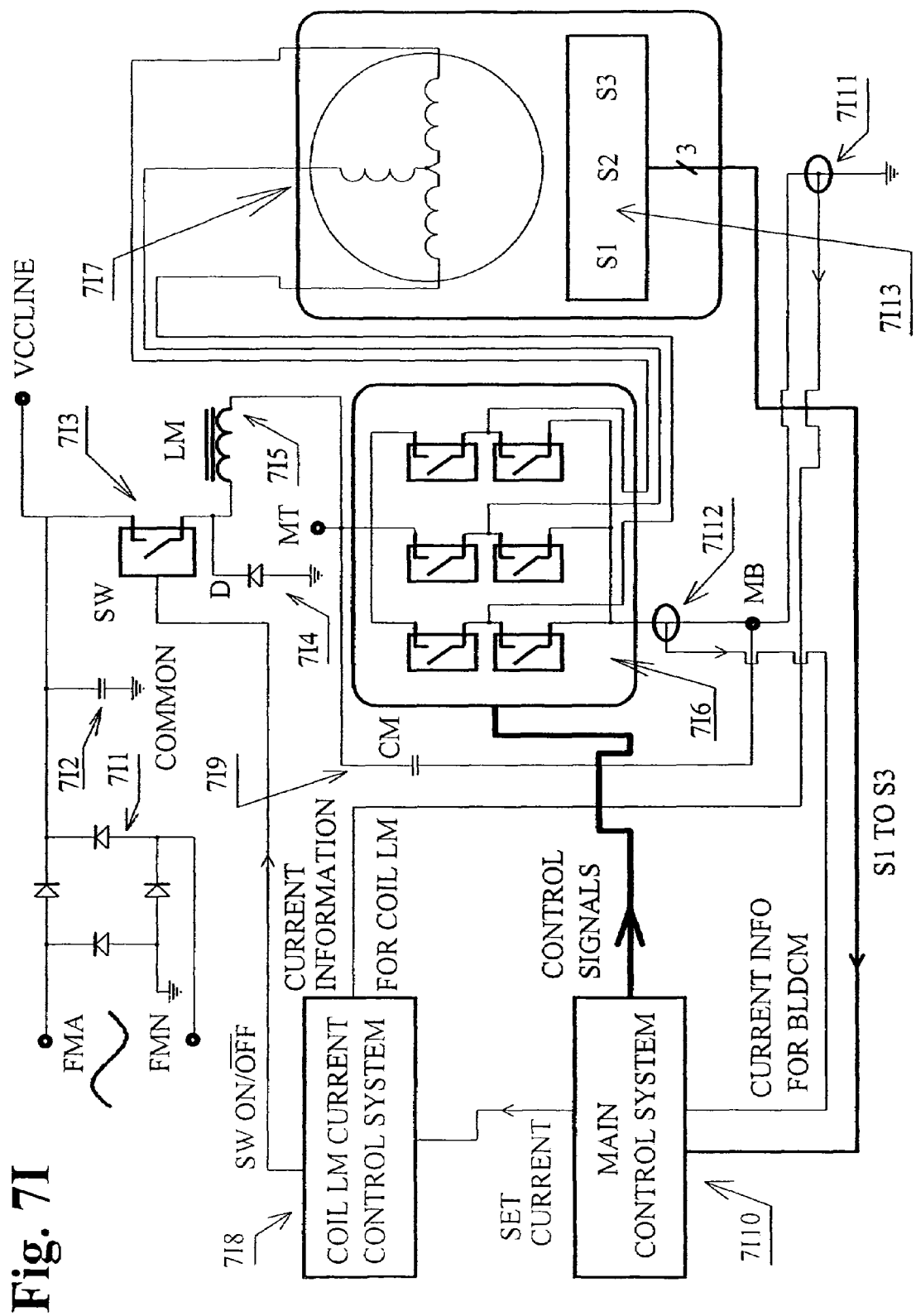
Figure 7J:
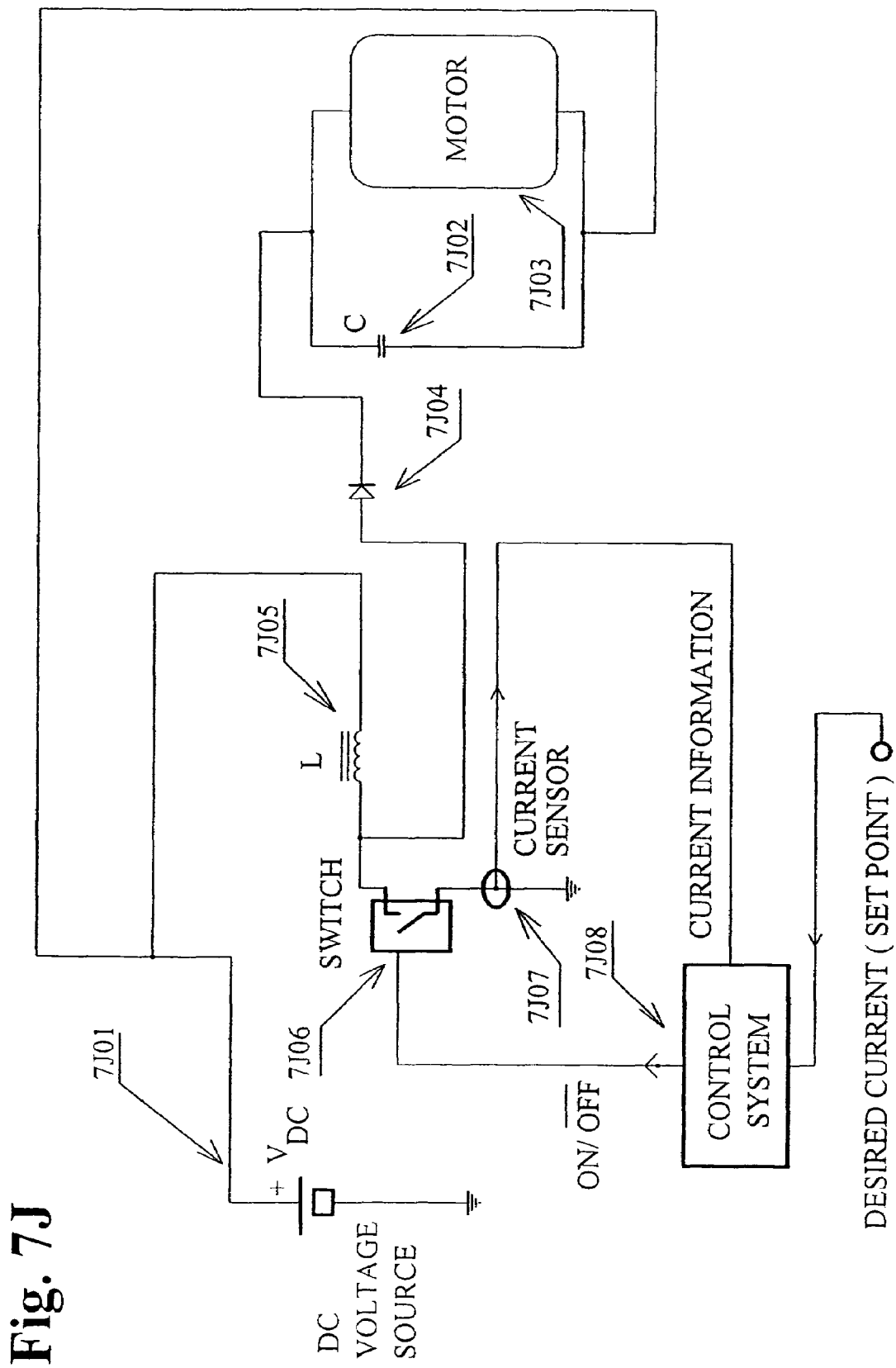

FIG. 7J. New Topology Derived from an Un-Insulated Input Referenced Flyback Converter or from an Input Referenced Boost Converter This embodiment is loosely based on the switched mode power supply topology known as a flyback converter (also known as "ringing choke power supply"). However, it is different in the sense that it does not use a transformer and the output is referred to the input and not to ground.

The circuit works as follows: When the switch (7J06) closes, current flows from the DC voltage source (7J01) to the inductive element (7J05). Diode (7J04) is reverse-biased. When the switch (7J06) opens, the current circulating through the inductive element flows through the diode (7J04), to the parallel combination of the capacitor (7J02) and the motor (7J03).

If FIG. 7J is compared with FIG. 7A, the following applies: (7J01) is similar in functionality to the power source (7A01); the functionality of the inductive element (7A05) is provided by (7J05); (7J02) is similar in functionality to capacitor (7A03); (7J03) is similar in functionality to motor (7A02); (7J07) is similar in functionality to current sensor (7A09); (7J06) is similar in functionality to the switch (7A08); the functionality of diode (7A04) is provided by (7J04). The pulse width modulator (7A06) and the control system (7A07) are embedded in the control system (7J08).

The control system (7J08) can be implemented with the pulse-width modulation method shown in FIG. 6B.

There is currently no switch-mode power supply topology using a configuration from which the circuit can be derived. An analysis of the circuit operation is provided in FIG. 15, for the case of continuous current flow though the inductance (7J05).

Once the analysis is done, it can be learned from it that the dynamics of the system can be described with equations similar to the buck-boost converter (also known as the positive to negative converter). However, care should be taken to keep in mind the polarity of the output and the fact that it is not referenced to ground. The analysis of the dynamic behavior of the buck-boost converter (also known as the positive to negative converter) can be found in References 3, 9 and 10.

Figure 15:
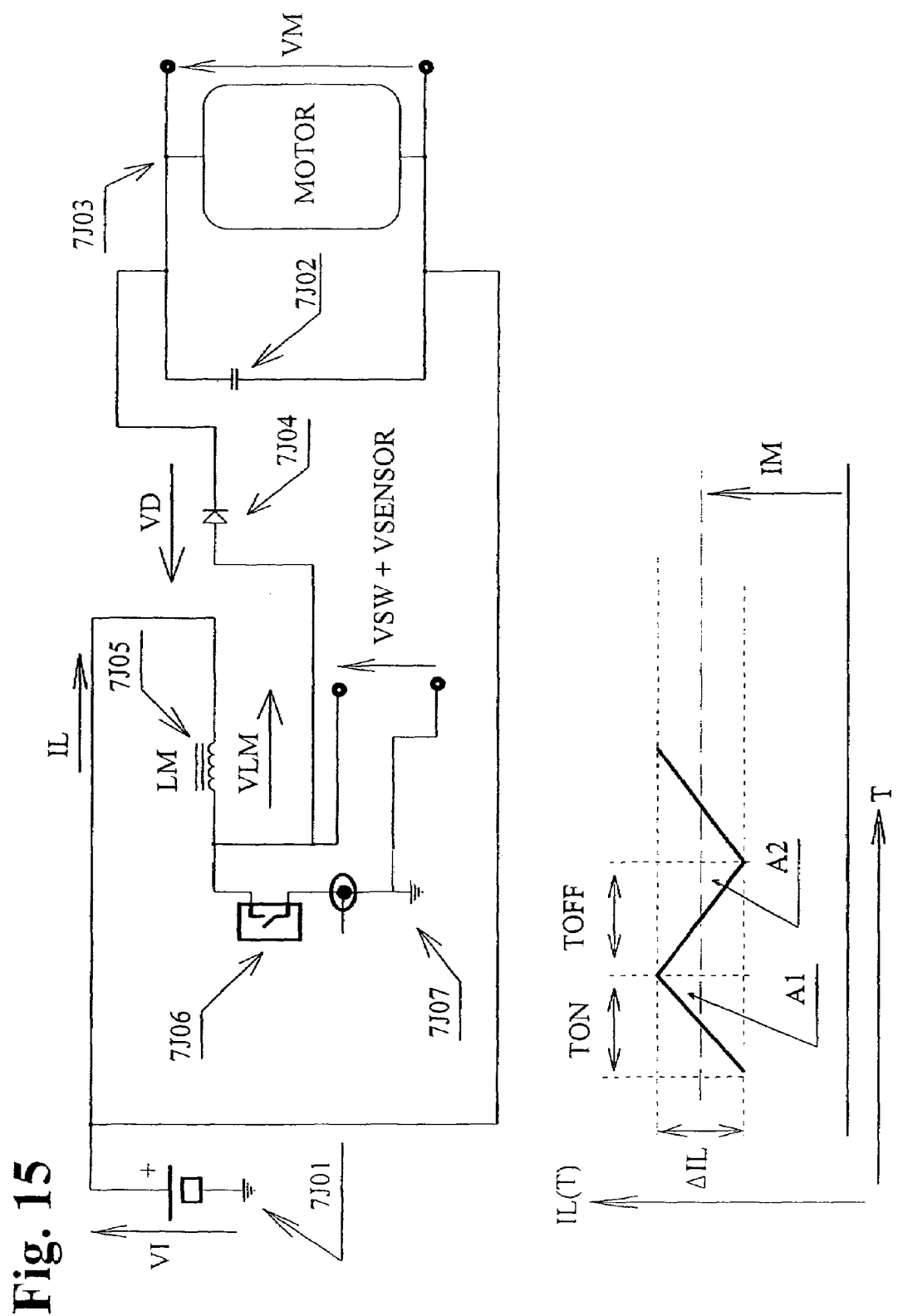
FIG. 15 is a block diagram of the embodiment of the invention shown in FIG. 7J with accompanying analysis.

The meaning of the notation used in FIG. 15 can be seen directly from the circuit diagrams in FIG. 15. The analysis is made for the case of continuous current circulation through the inductive element. The result in equation (1506) shows that the voltage over the motor $V_M$, can be lower or higher than the value voltage source (7J01). The relationship between both voltages depends on the relationship between $T_{ON}$ and $T_{OFF}$.

The Equations (1501) and (1502) are similar to the equations (3) and (4) in FIGS. 6C-1. Equation (1503) shows that it is assumed that the voltage drop in the inductive element (7J05) is much larger in value than the voltage drop in the switch (7J06) and the current sensor (7J07). Similarly equation (1504) shows that it is assumed that the voltage drop in the diode (7J04) is much smaller than the value of the voltage over the motor.

It will be obvious to those skilled in the art how to do the same analysis for the discontinuous case, wherein the current through the inductive element drops to zero before $T_{OFF}$ finish. This type of analysis is common to switch-mode power supply technology. In any case, the results from the analysis of the buck-boost converter (negative to positive converter) can be used with the precautions explained above.

Example 6

Figure 7K:
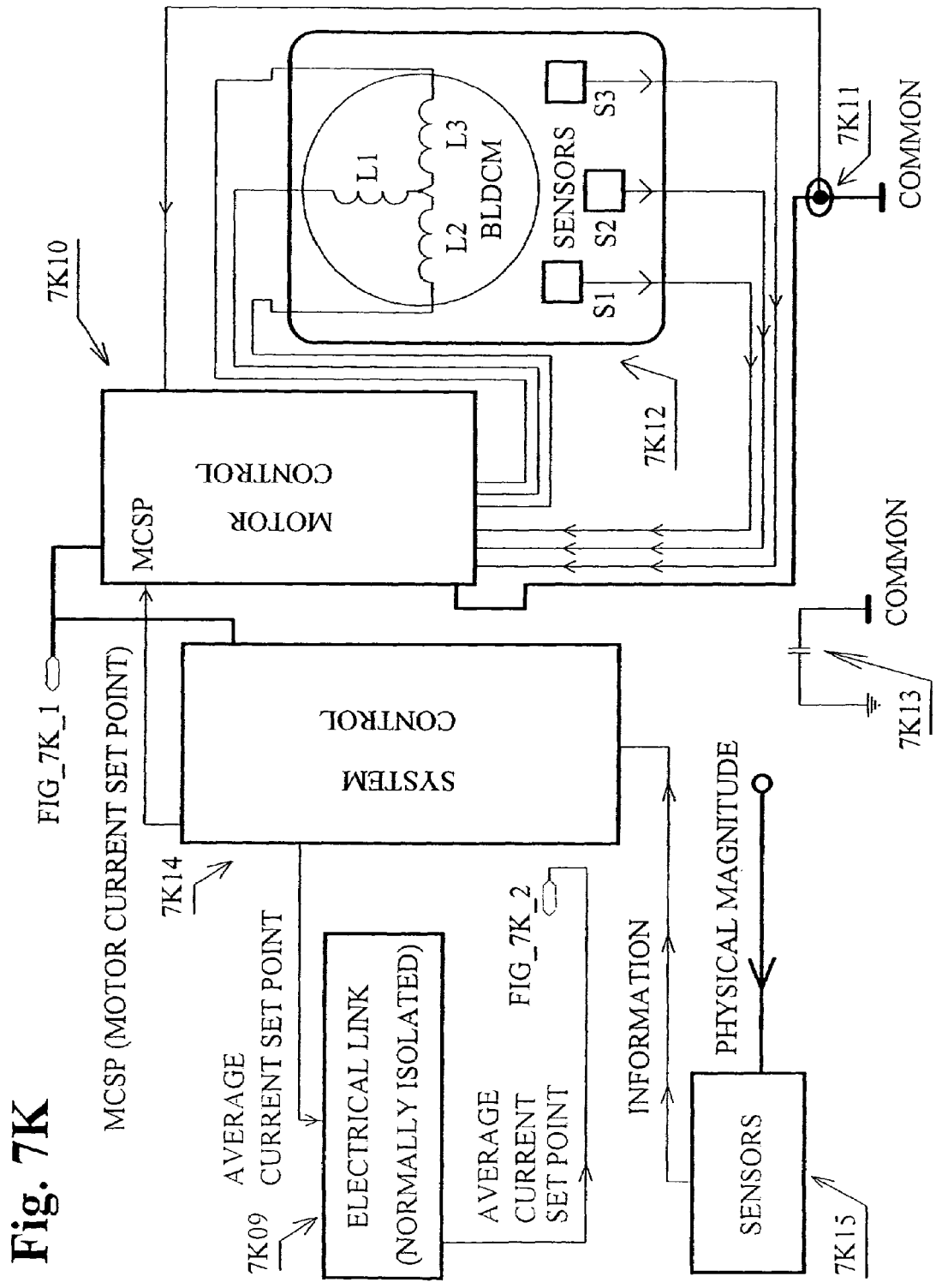
Figure 7K:
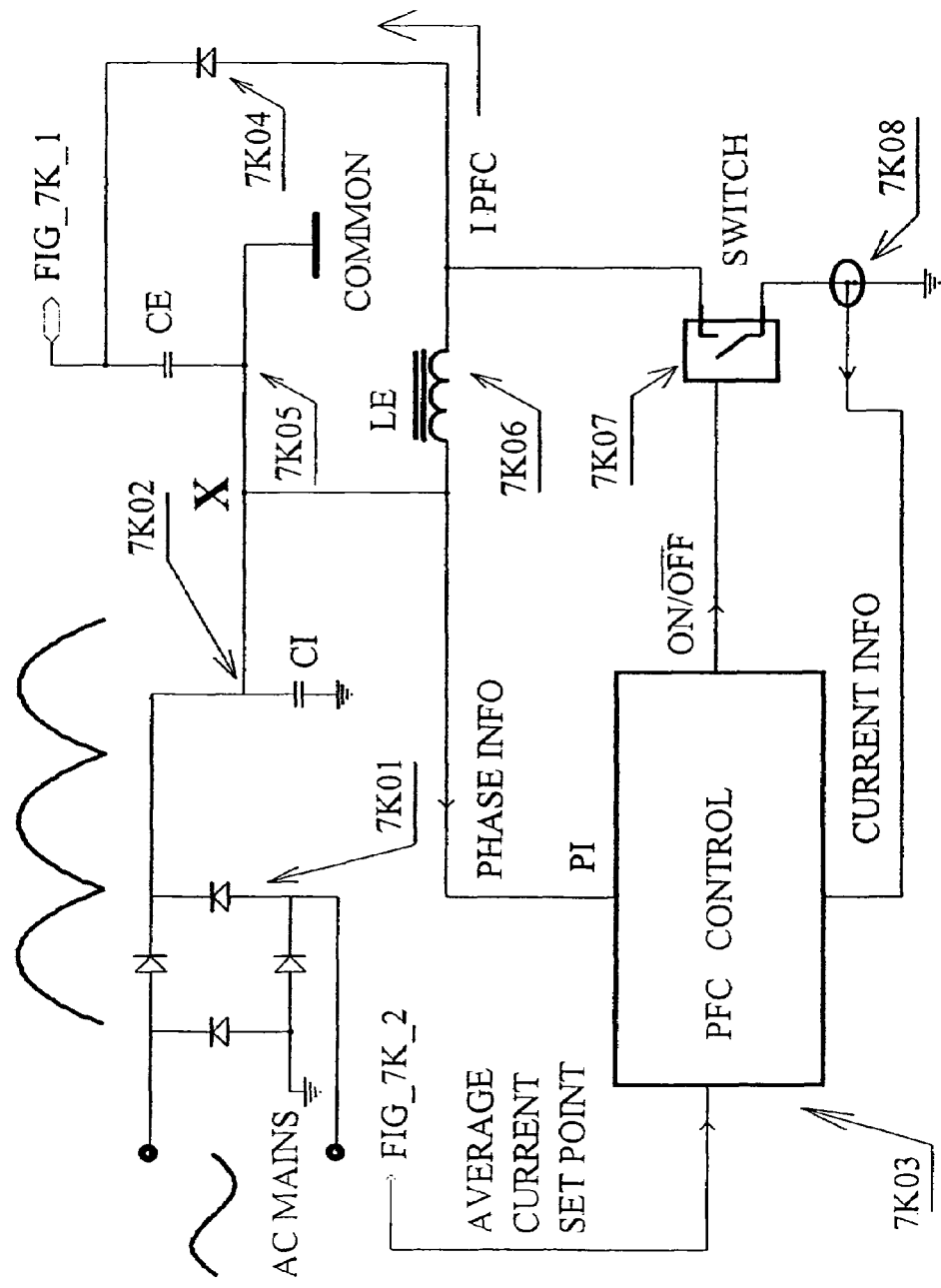
Figure 7L:
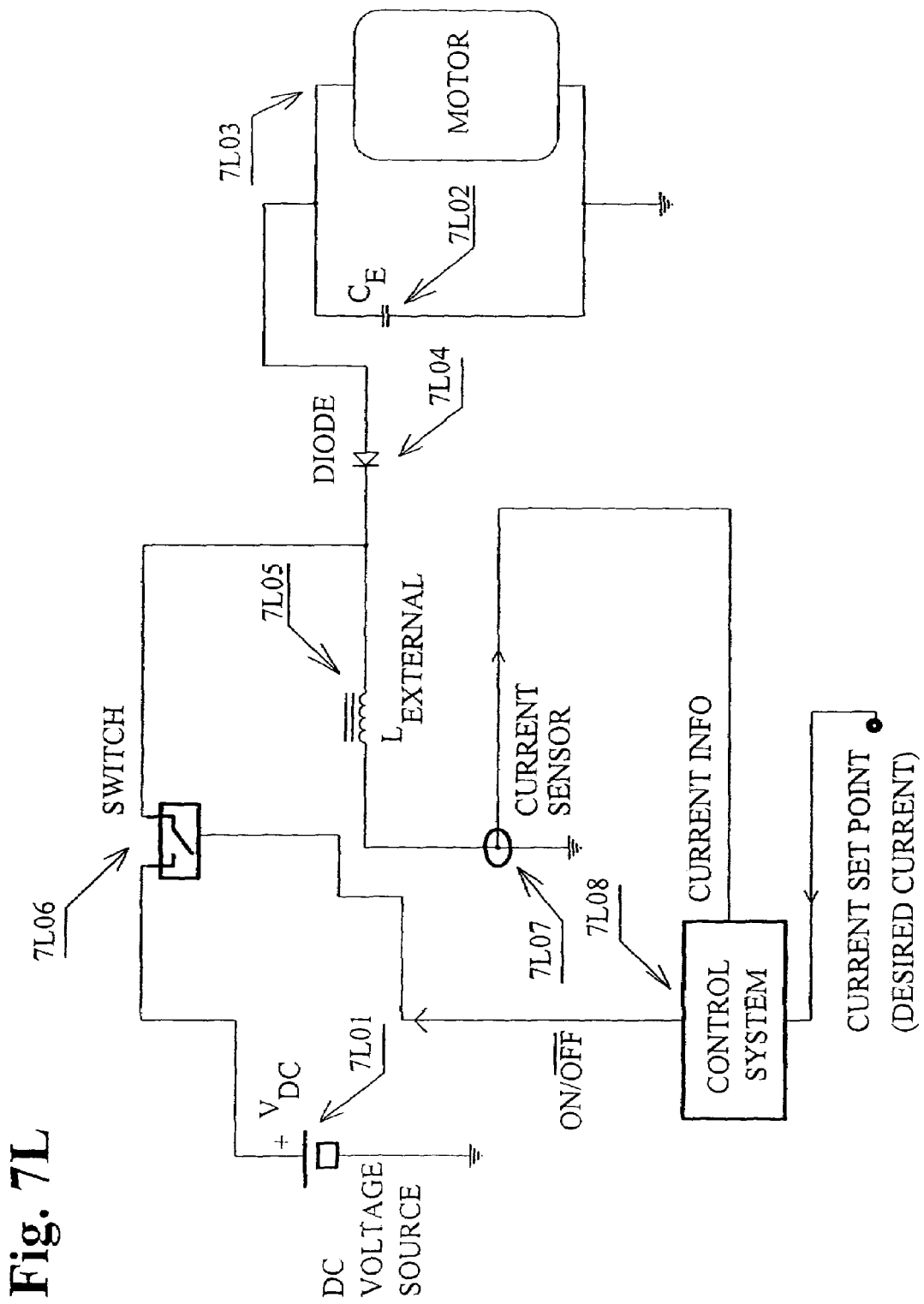

FIG. 7L. Topology Derived from the Buck-Boost Converter

This embodiment is based on the switched mode power supply topology known as a buck-boost converter (also known as a positive to negative converter). The circuit works as follows: When the switch (7L06) closes, current flows from the DC voltage source (7L01) to the inductive element (7L05). Diode (7L04) is reverse-biased. When the switch (7L06) opens, the current circulating through the inductive element will flow through the diode (7L04) to the parallel combination of the capacitor (7L02) and the motor (7L03).

If FIG. 7L is compared with a combination of FIG. 6 and FIG. 7A, the following applies: (7L01) is similar in functionality to the power source (61); the functionality of the inductive element (64) is provided by (7L05); (7L02) is similar in functionality to capacitor (65). (7L03) is similar in functionality to motor (66); (7L07) is similar in functionality to current sensor (7A09); (7L06) is similar in functionality to the switch (62); the functionality of diode (63) is provided by (7L04). The pulse width modulator (69) and the control system (68) are embedded in the control system (7L08).

The control system (7L08) can be implemented with the pulse-width modulation method shown in FIG. 6B.

For this embodiment there is a well-known switch-mode power supply topology from which the steady state operation can be derived (see Ref. 9, page 150, Ref. 10, page 31 and Ref. 3, page 81).

For the case of continuous current through the inductance, the results are similar to the circuit 7J. Hence the voltage over the motor can be larger or smaller than the voltage of the DC power source.

As with all the other examples, the voltage over the motor for the given current set by the control system (7L08) will depend on the characteristics of the motor, its load, and the speed of rotation.

The advantage of this circuit with respect to the circuit in FIG. 7J is that the motor is referred to ground, however, the voltage is of negative polarity with respect to the voltage of the DC power source.

FIG. 7I illustrates a different embodiment of the circuit disclosed in FIG. 6. The main difference is that the current through the motor (7I7) as measured with the current sensor (7I12) is controlled independently of the current through the inductance $L_M$ (7I5), which is measured with the current sensor (7I11). The current through the inductance (7I5) is controlled by applying a pulse width modulated waveform to the control terminal of the switch (7I3) in a way similar to FIG. 6. The current through the motor is controlled by applying pulse width modulation techniques to the switches in the electronic commutator (7I6) in FIG. 7I. In this case, the motor current is controlled using the inductance of the motor windings, exactly as the current state of the art does. This is shown in FIG. 5. FIG. 7I shows two different control systems, for sake of clarity. However, in practice, a single microprocessor can control both current loops. In this case, the set current signal shown from the main controller (7I10) to the controller (7I8) is a value passed between different segments of a running program.

The system of FIG. 7I can revert to the system of FIG. 7A, if the electronic commutator (7I6) of the motor (7I7) is not pulse width modulated. In this case the current through the motor 7I7 is the low frequency component of the current switched through the inductance $L_M$ (7I5) by the switch (7I3) and the diode (7I4).

If the current through the motor (7I7) is made different than the current provided through the coil (7I5), charge accumulates in capacitor $C_M$ (7I9) raising the voltage of the capacitor.

Hence the current through the motor can still be controlled independently of the current through the coil $L_M$, in all the other embodiments, without sensing the actual motor current, simply by measuring the voltage in the capacitor with relation to what the voltage should be if it were the product of the back electromotive force induced voltage in the motor windings.

Allowing control of the current through the inductance (7I5) independently of the current provided to the system comprising the motor (7I7), its electronic commutator (7I6) and the capacitor (7I9) yield a very versatile apparatus. There are at least two applications for such a system:

Application_7I_1. Power Factor Correction

The capacitor in the rectifier filter (7I2) is chosen small enough for the voltage at the output of the rectifier (7I1) to track the full wave, rectified AC main voltage. The current in the inductance $L_M$ (7I5) is made a full wave rectified waveform:

$$I(t)=I\text{peak}*|\sin(\phi)|$$

where the current waveform is made synchronous with the full wave rectified AC line.

The controller (7I10) has to make the mean value of the current waveform (Ipeak* $2/\pi$) equal to the average current that is taken by the motor (7I13) and control electronics, from the capacitor $C_M$ (7I9).

The current state of the art uses an analog multiplier to multiply the attenuated full wave AC rectified waveform by the set current for the control loop (see Refs. 20 and 21).

A proposed method is to sense the time of zero crossing of the AC signal and calculate the phase ($\phi$) of the sinusoidal signal by relating the time at which a new current value must be set with the period of the line. The period of the line can be measured continually calculating the time it takes for the number of zero crossing events to occur and dividing the measured time by that number (e.g., 16 is a good choice for that number).

$$I(t)=I\_\text{average\_needed}*\pi/2*|\sin(\text{ticks\_from\_0\_crossing}/\text{ticks\_in\_period})$$

Where:

I_average_needed is the average current required through the DC motor; ticks_from_0_crossing is the amount of time from the zero crossing of the AC main measured in an arbitrary unit (events of a periodic phenomena or "ticks");

ticks_in_period is the period of the AC main measured in an arbitrary unit (events of a periodic phenomena or "ticks").

In this way there is no need for connecting an analog to digital converter input of the controlling microprocessor to the AC main.

Table 1 contains a pseudo-code, following the syntax of the C language, showing the algorithm.

TABLE 1

```
// Power Factor Correction Algorithm without A/D converter
Initialization( )
{
P_Ticks = 0 ;              // clear ticks accumulator
Ticks = 0 ;                // clear ticks accumulator
Period = 0 ;               // set initial value of period as not calculated yet
Old_Line = 0 ;             // set initial value for algorithm
N_cycles = 0 ;             // clear 16 cycle counter
Set timer interrupt( ) ;   // initialise the hardware for a periodic timer interrupt
}
// End of initialization
Timer_interrupt( )
{
// here each timer interrupt ;
P_Ticks = P_Ticks + 1 ;    // count for calculating the period
Ticks = Tick + 1 ;         // count for calculating the phase
New_Line = Read_line_state ( ) ; // read state of the AC line – high or low
If ( New_line <> Old_line ) {
    // here if there was a change in state of the AC main
    Old_line = New_line ; // save state for detecting next transition
    If ( New_line = High ) {
        // here if a new AC line cycle
        Ticks = 0 ; // clear the phase accumulator
        N_cycles = N_cycles + 1 ; // count the line cycles
        If ( N_cycles > 15 ) {
        // here after 16 line cycles
        // a new period average can be calculated
        N_cycles = 0 ;          // clear cycle counter
        Period = P_Ticks / 16 ; // calculate the period average of last 16 cycles
        P_Ticks = 0 ;           // clear accumulator of next calculation
            }
        }
If ( Period > 0 ) { // here to modulate the current
        I_out = I * π / 2 * | sin ( Ticks / Period ) | ;
        }
    else
        { // here the first 16 cycles, no PFC
        I_out = I ;
        }
// Note: "I" is calculated elsewhere in a control algorithm suitable for the application
} // end of the timer interrupt
```

Application_7I_2. Bilevel CPAP Device

In a bilevel device, the motor needs to take considerable current while accelerating to raise the air pressure delivered to the patient. After a few seconds, the motor is braked for decelerating to drop the air pressure. While the current through the motor varies considerably, the average current through the inductance needs only to be equal to the average current drawn by the motor and the control system (normally the current drawn by the control system is negligible in comparison with the current drawn by the motor).

This application can also make use of the power factor correction method explained above.

Application_7K. Power Factor Corrected Brushless DC Motor Controller

The system in FIG. 7K makes use of the topology of FIG. 7J and the technology disclosed in FIG. 7I. The DC voltage source (7J01) in FIG. 7J is equivalent to the output of the full wave rectifier (7K01) in FIG. 7K. The capacitance of capacitor Ci (7K02) is of small value so the voltage in the node X tracks the full wave rectified AC mains waveform.

The functionality of the switch (7K07) is similar to (7J06) and also to the switch (7I3) in FIG. 7I. However, the switch (7K07), like the switch (7J06), is a low-side drive switch, similar to the switch (7A08). The current sensor (7K08) has a similar functionality to the sensors (7I11), (7J07) and (7A09).

The inductive element (7K06) has similar functionality to (7J05). The capacitor (7K05) has a similar functionality to the capacitors (7I9) and (7J02).

The feedback circuit block (7K09) can be implemented by using a pulse width modulated output from a microcontroller and linking it through an optocoupler with the set point input of the power factor correction control (7K03). A practical example of this type of link can be found in FIG. 9H.

The function of the controller (7K03) is similar to the function of the controller (7I10) combined with (7I8), as described for FIG. 7I.

The controller (7K03) shapes the current through the inductive element (7K06) so the system has a power factor close to unity.

Any of the current state of the art techniques or algorithms for power factor correction can be used in the controller (7K03) (see Ref. 10, page 222 or Ref. 25, chapter 1):

- Fix-on time, Discontinuous Current Control (DCC), with or without fixed output voltage (for the boost topology is called a "boost follower").
- Critical Conduction Mode (CRM) also known as Transitional Mode Controllers (Ref. 25, page 8).
- Continuous Conduction Mode (CCM) Control (see Refs. 20, 21 and 25).

In continuous current control, the control loop can use as feedback several alternatives, for instance average current control or peak current control.

From a practical implementation point of view, most if not all the current integrated circuits controllers designed for boost converter based power factor correction circuits can be used with little modification for the block (7K03).

If the power factor correction controller is based on a microcomputer with analog to digital converter the technique disclosed in the description of the controllers of FIGS. 7I and 9 can be used. Alternatively, if the factor correction controller is based on a microcomputer without analog to digital converter the algorithm disclosed in TABLE 1 can be used.

Figure 9I:
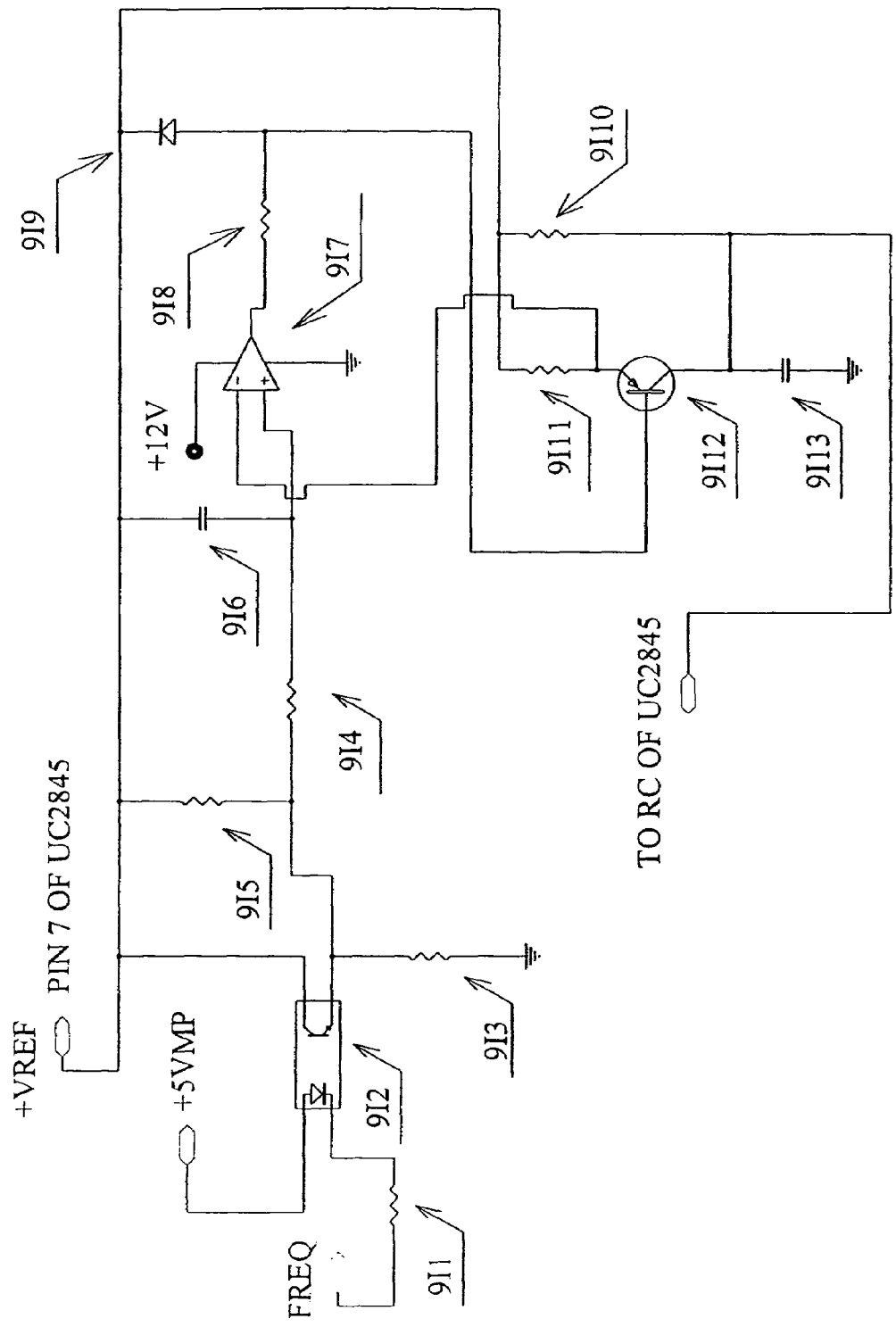
Figure 17A:
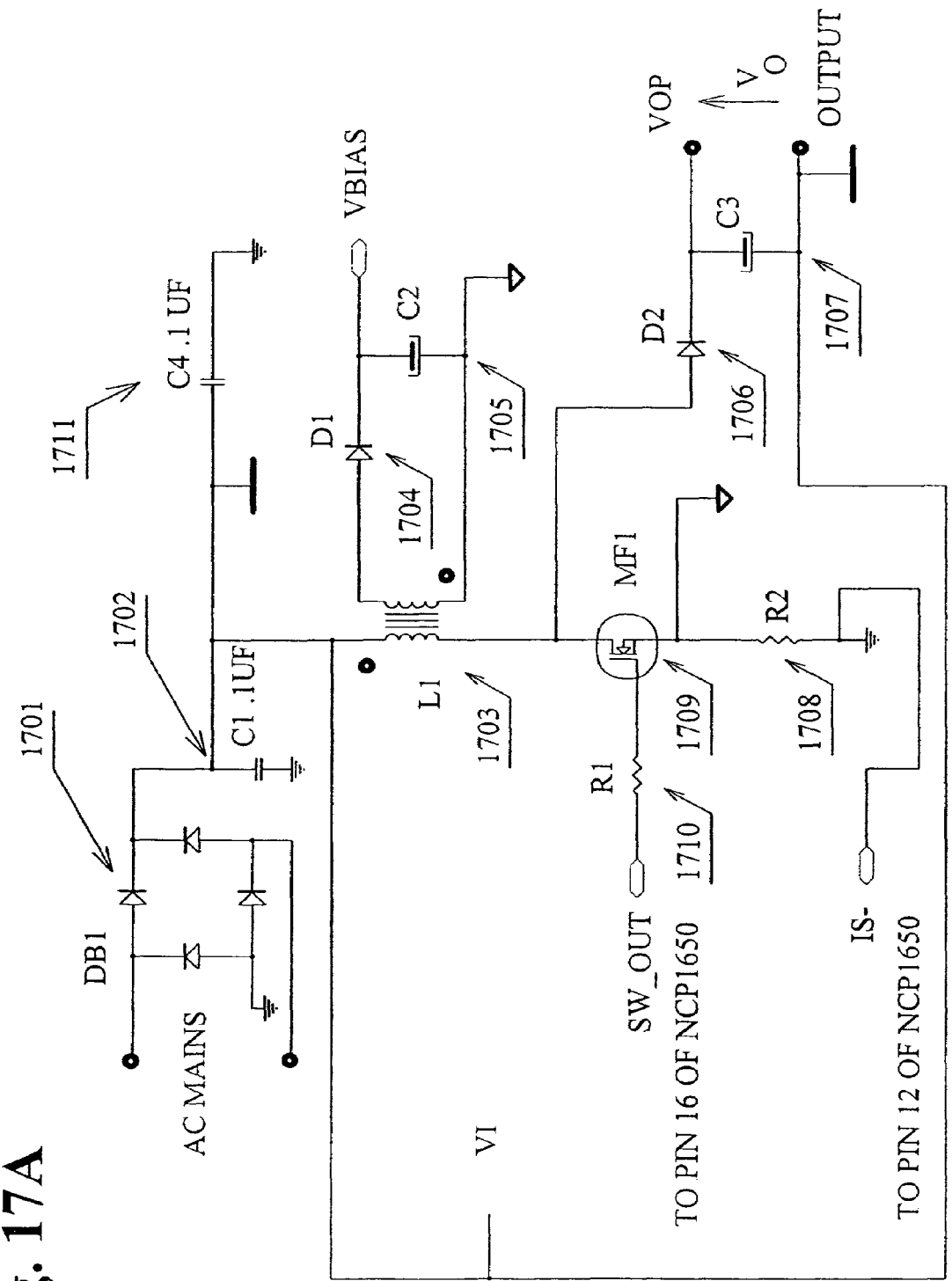
FIGS. 17A to 17F are diagrams of embodiments of the invention shown in FIG. 16.
Figure 17B:
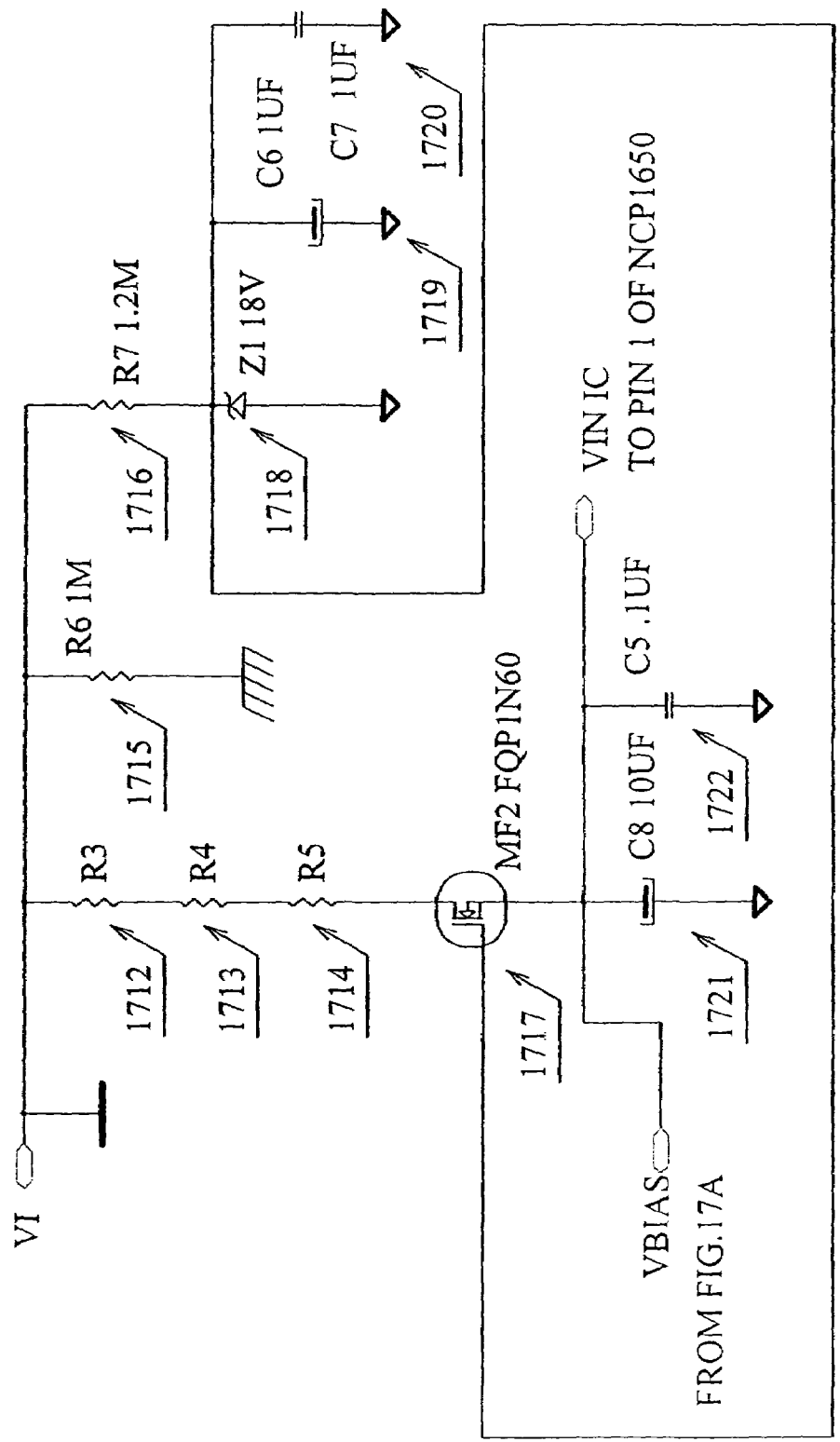
Figure 17C:
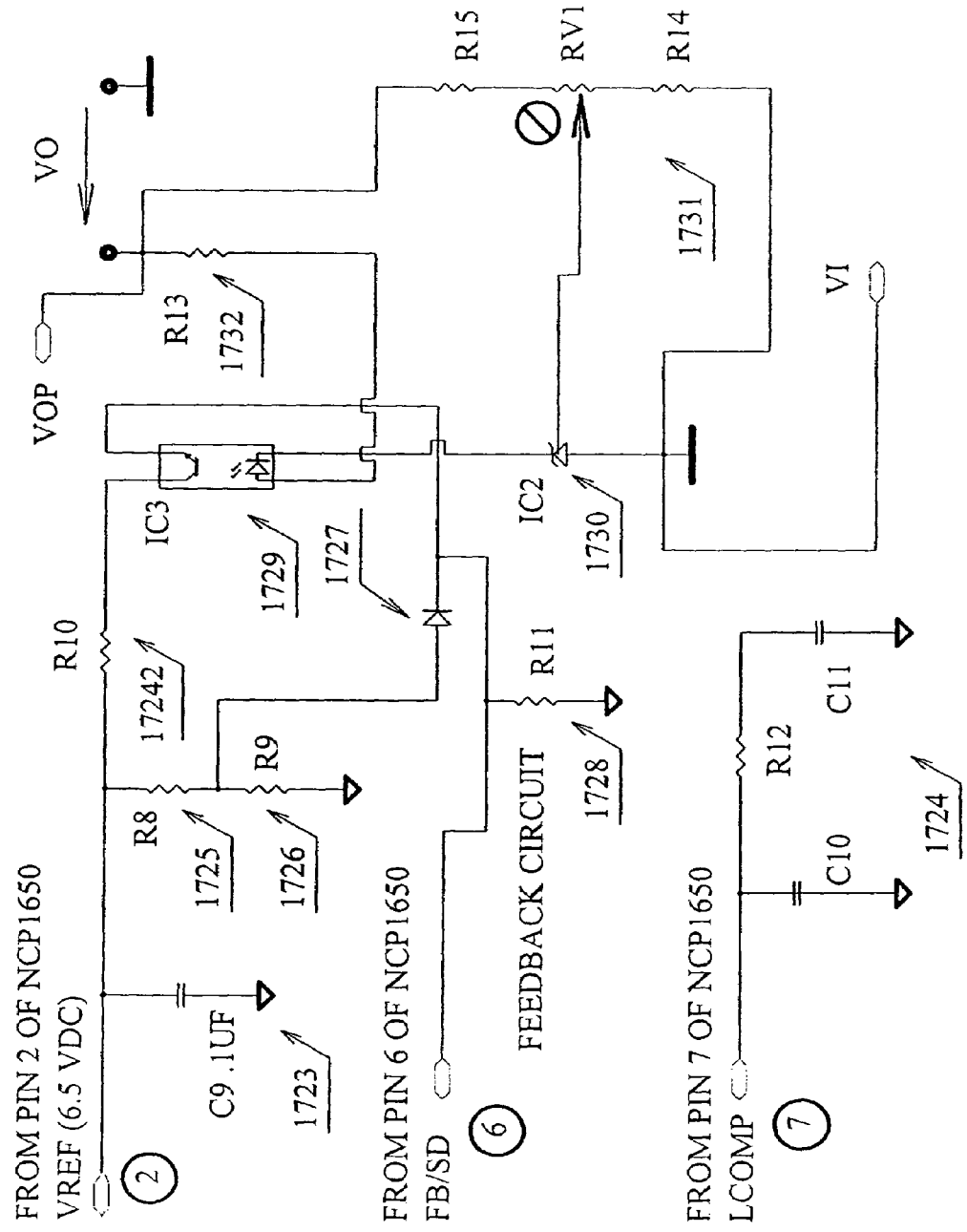
Figure 17D:
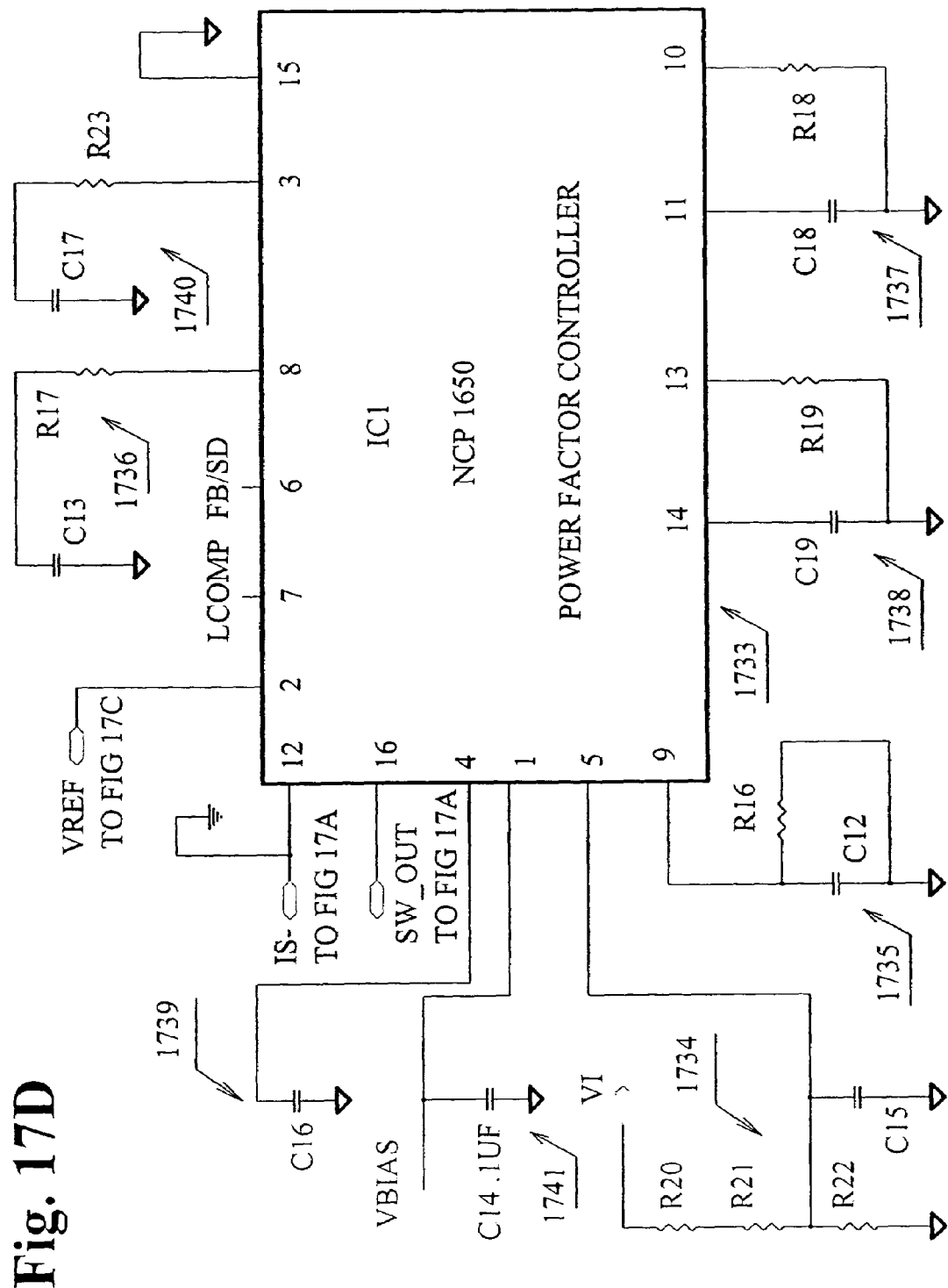
Figure 17E:
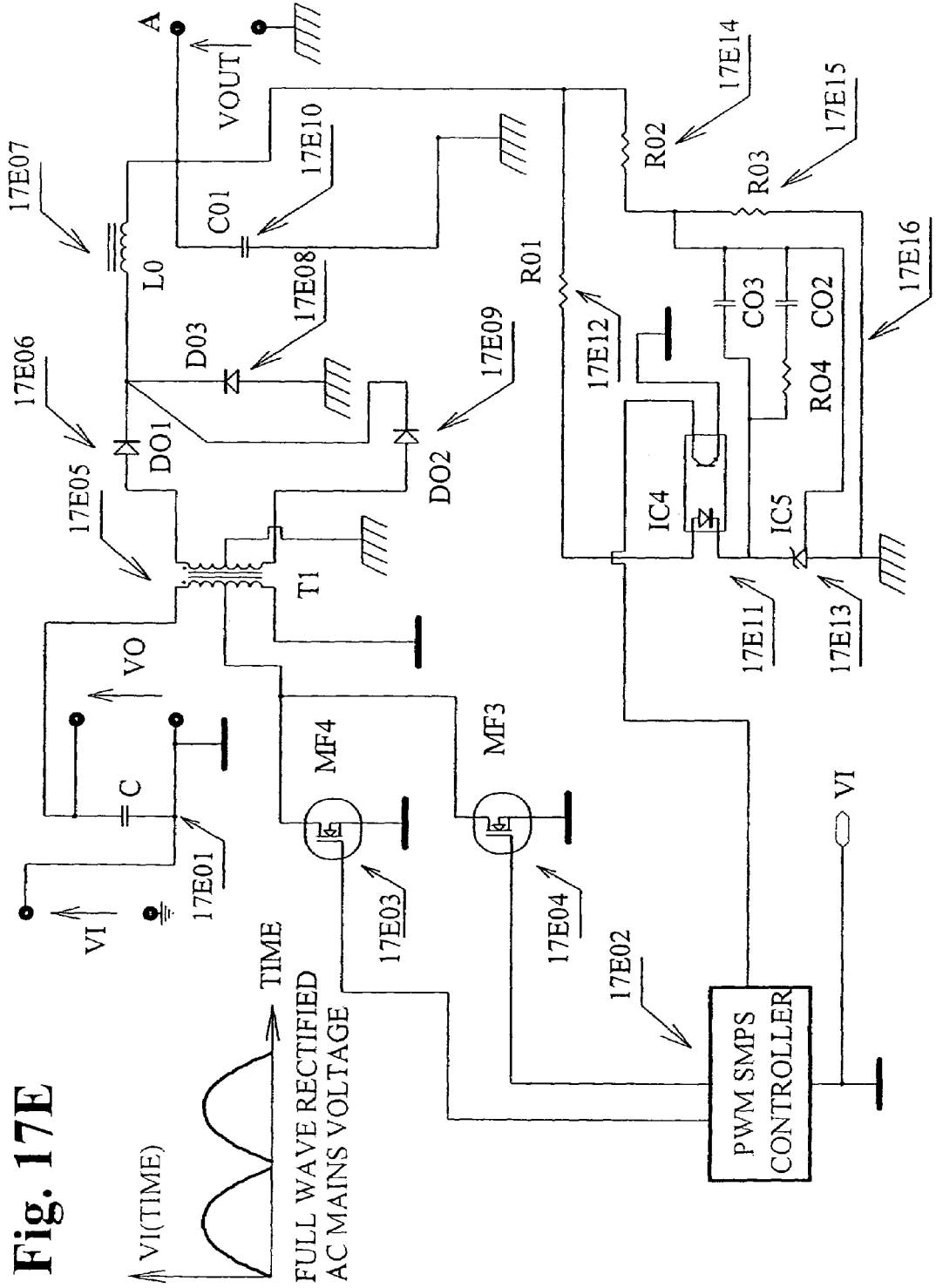
Figure 17F:
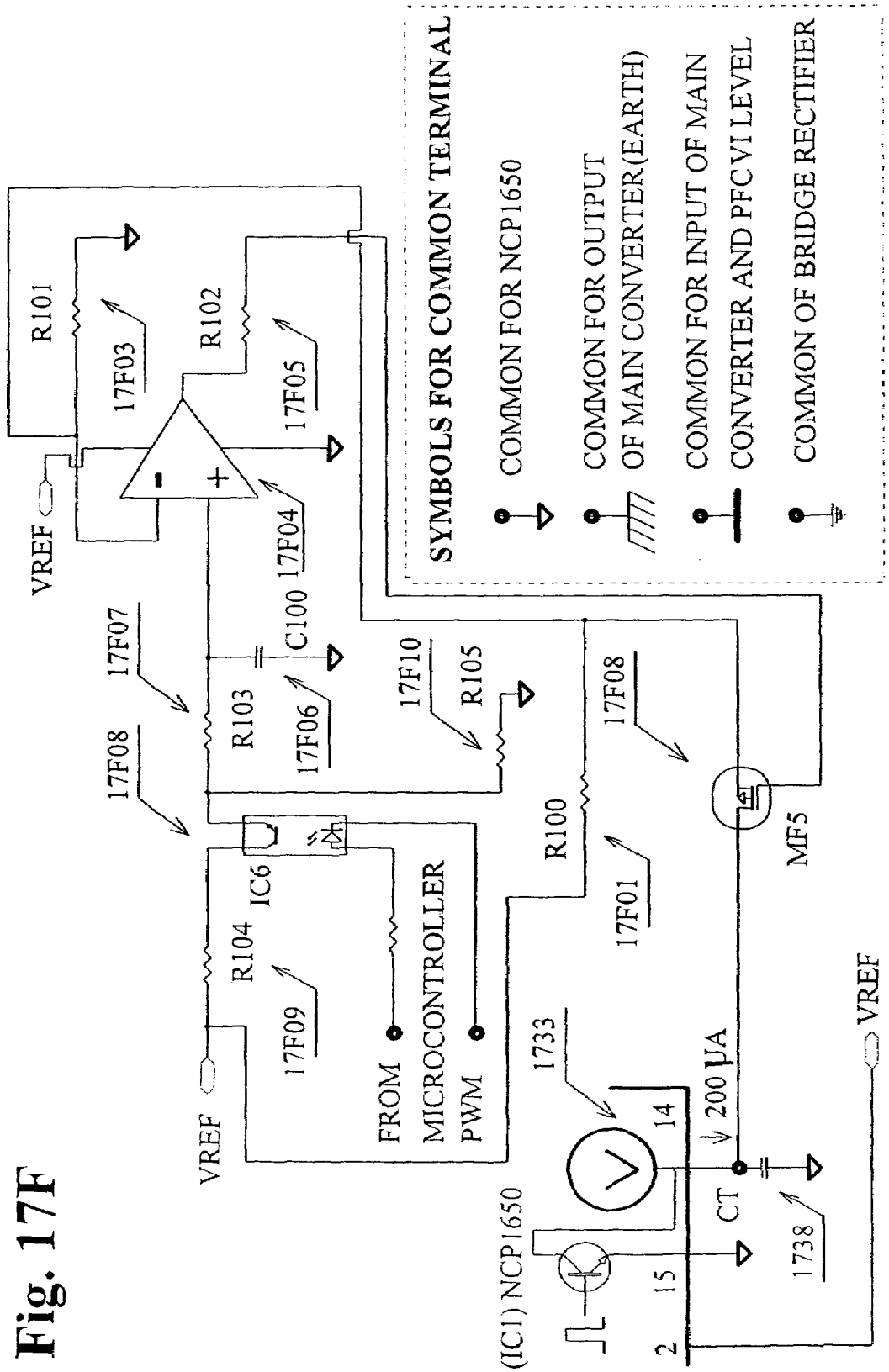

If a classical controller with fix oscillation frequency, set by external components, is used along with a microcomputer, the technique shown in FIGS. 9H, 9I and 17F, in combination with the algorithm of TABLE 3, can be used to change randomly the frequency of oscillation of the controller, improving on the EMI characteristics of the system.

The block (7K10) is a brushless DC motor controller. (7K12) is the brushless DC motor. A current sensor (7K11) for the current through the motor (7K12) is shown in FIG. 7K.

However, a similar system would work if no direct measurement is made of the current though the motor (7K12). In this case, the current would be assumed by design and adjusted by the main controller (7K14) in response to another measured physical quantity obtained through the sensors (7K15). If there is no need for fast reaction from the brushless DC motor (7K12), the system can be further simplified by removing the pulse width modulation from the controller (7K10). That is a slow reacting system that still works if no pulse width modulation is applied to the windings L1 to L3 of the motor (7K12). In this last case, the current through the motor is controlled by controlling the average current through the inductance (7K06). The current through (7K06) tracks the full wave rectified pulsating voltage at the node X. The inertia of the motor plus its load filters the current pulses. This last case is ideal for cooling or ventilation fans, while the full control scenario (usage of sensor (7K11) and pulse width modulation of the winding in (7K12)) is ideal for bi-level flow generators for the medical industry.

Capacitor (7K13) is included to show that since the controllers (7K14) and (7K10) and the motor (7K12) itself are not connected directly to ground, a plurality of de-coupling capacitors with good high frequency response, connected to a ground plane, may be necessary to improve the ability of the set-up to pass the electromagnetic compatibility regulations.

Figure 8A:
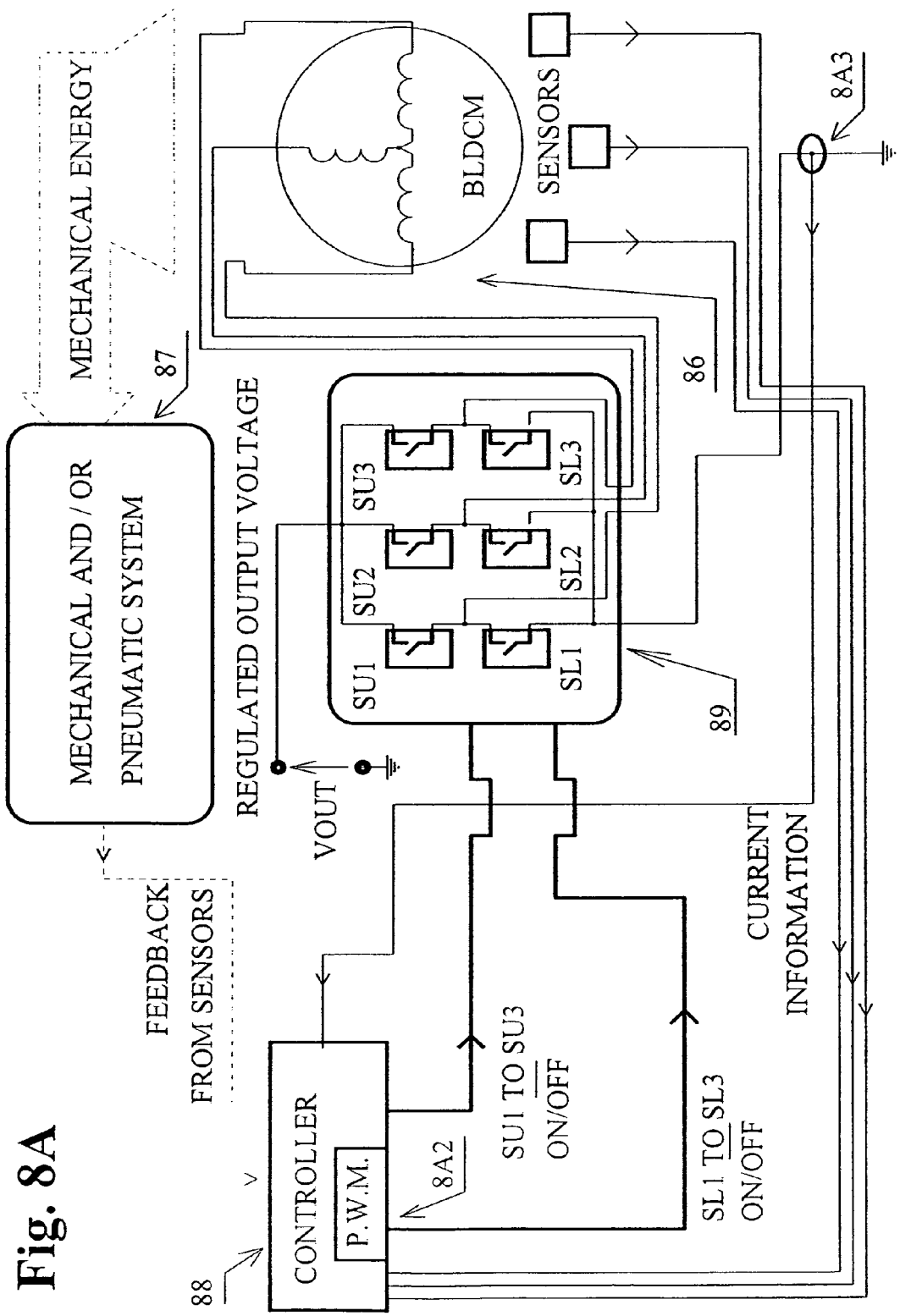
FIGS. 8A to 8C are block diagrams contrasting embodiments of the invention and the known system using switched mode power supplies.
Figure 8A:
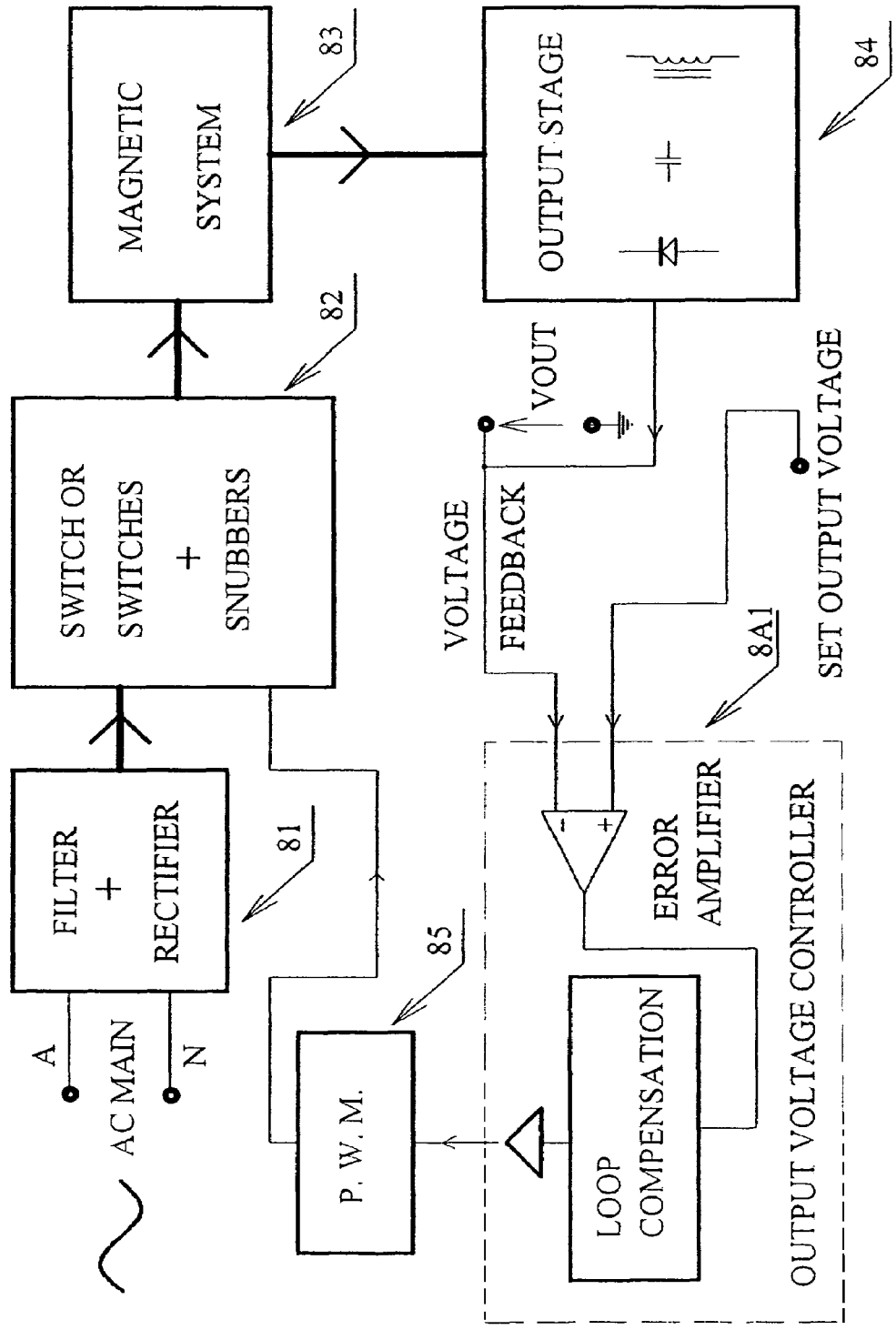
Figure 8B:
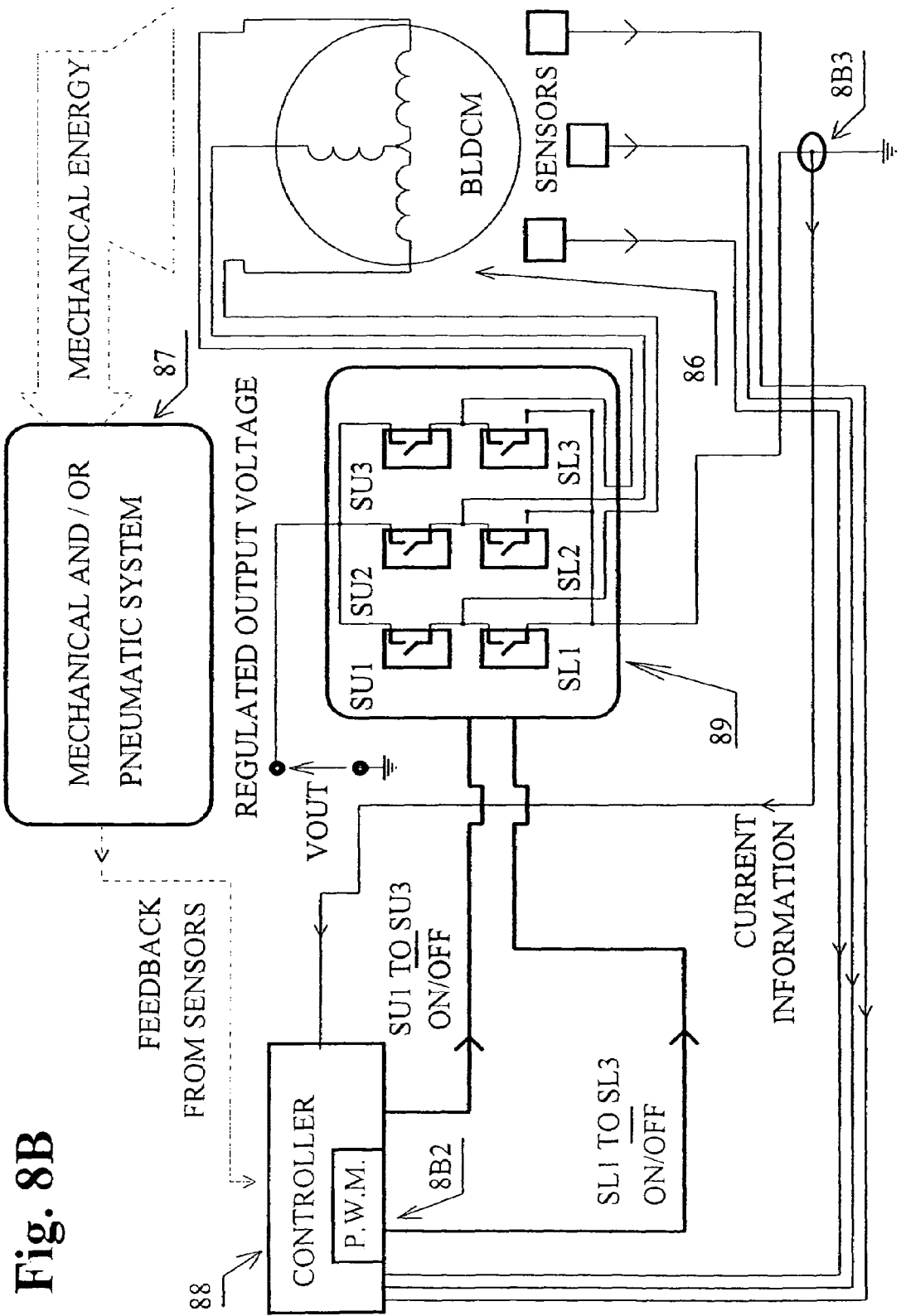
Figure 8B:
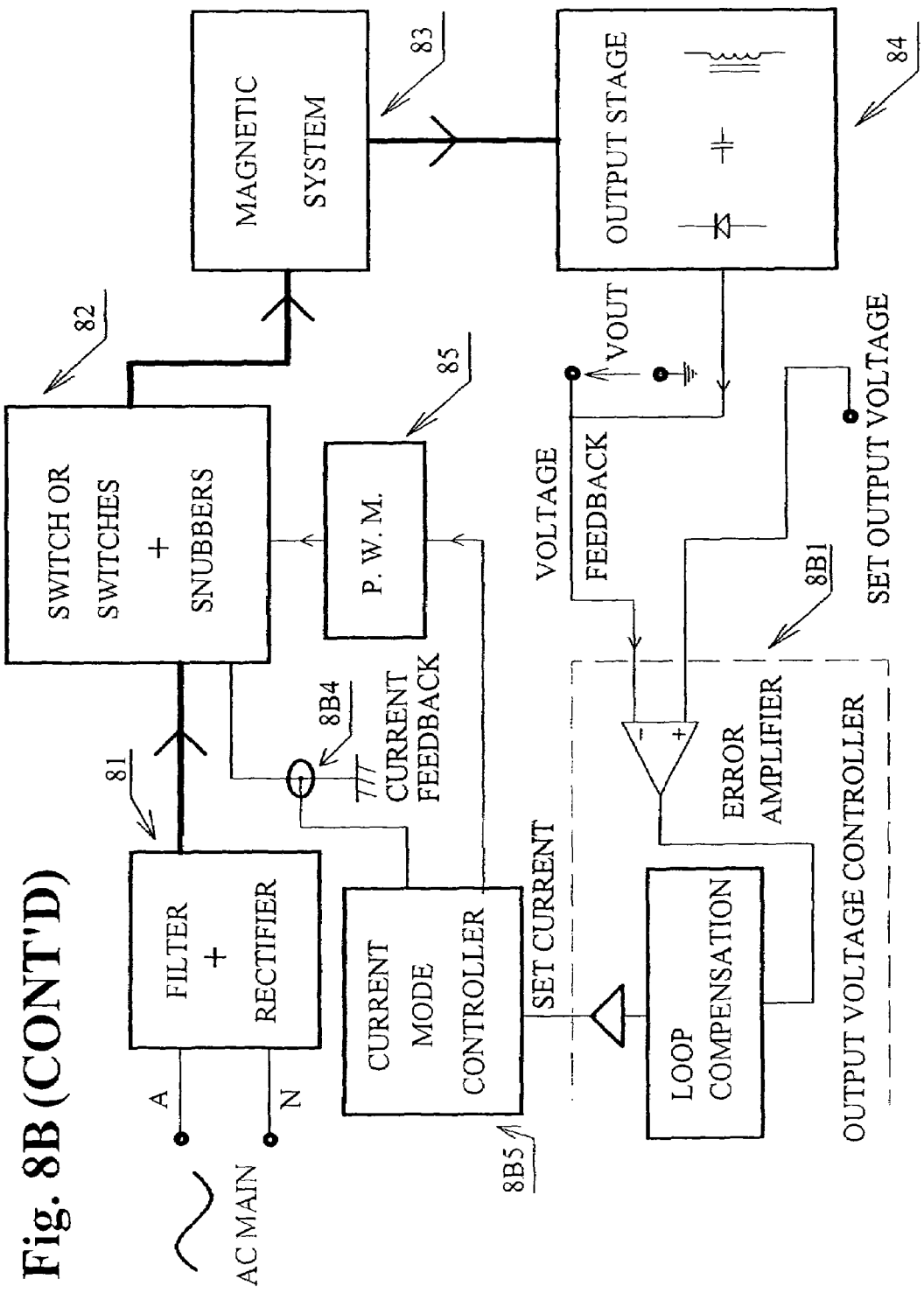
Figure 8C:
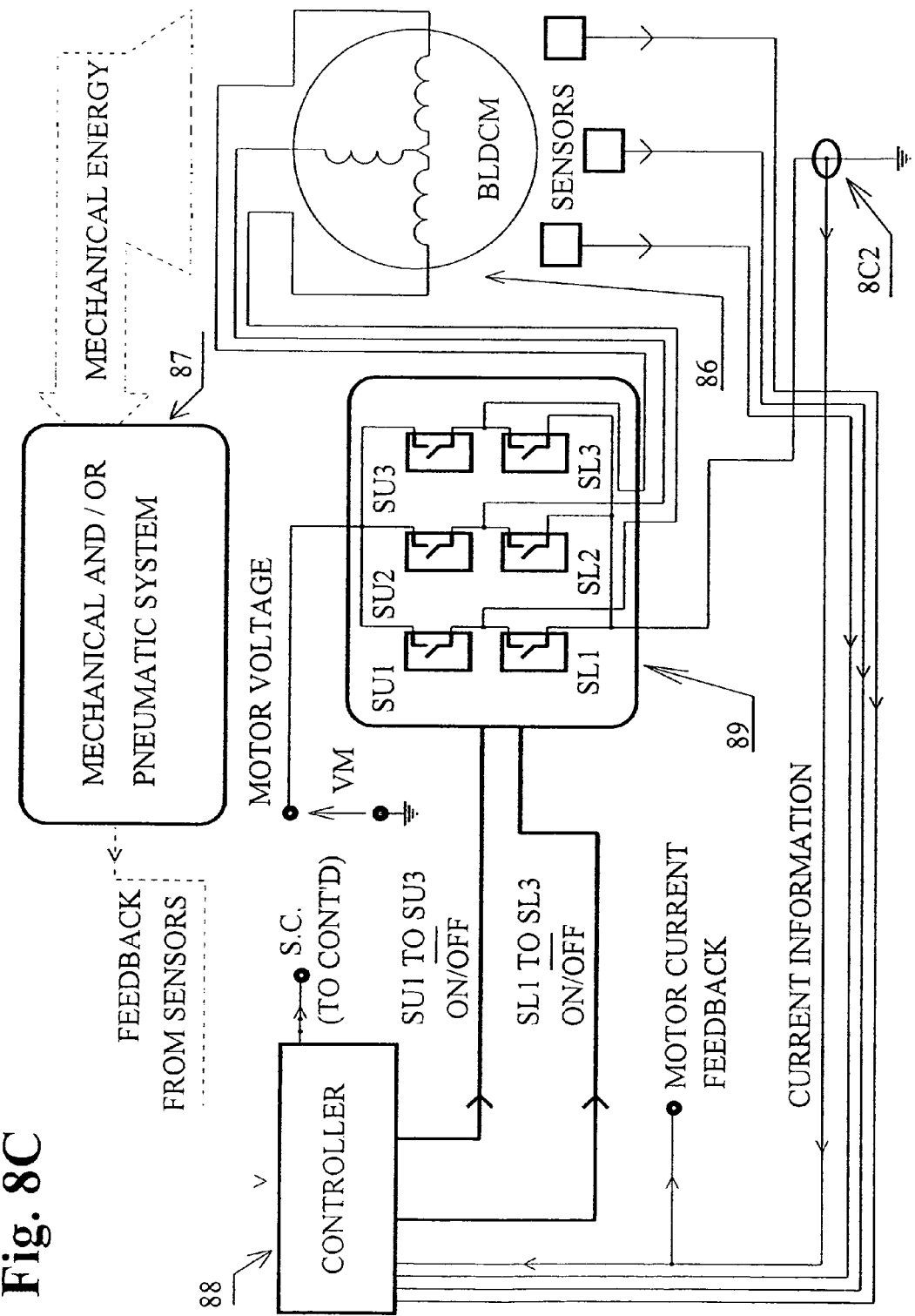
Figure 8C:
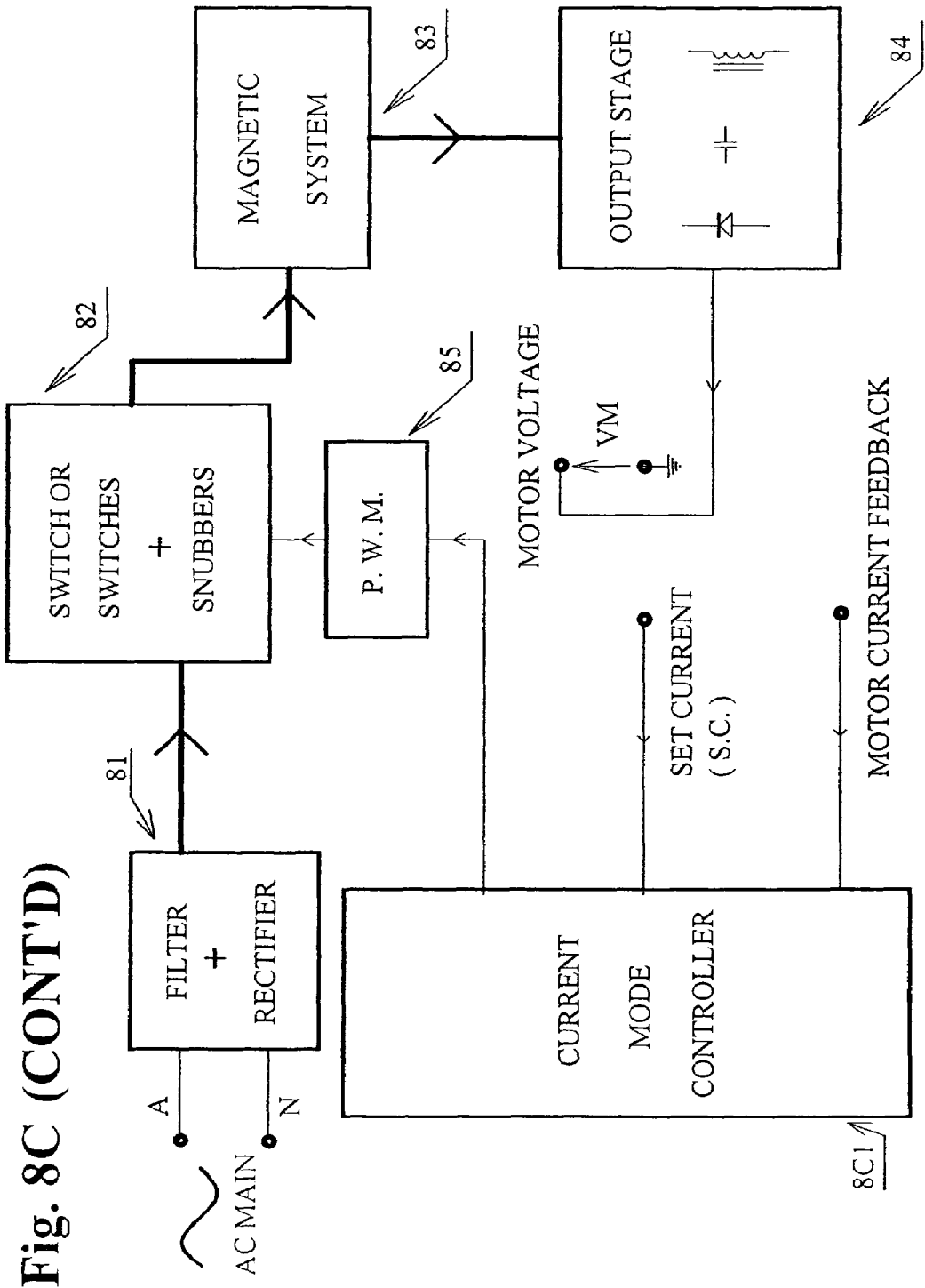

FIGS. 8A to 8C show the relationship between the circuit and the technology used in switched mode power supplies (SMPS), as applied to flow generators. To facilitate the comparison, in the three drawings of FIG. 8, blocks with the same number have a similar function.

FIG. 8A shows a flow generator with a switched mode power supply (SMPS) controlled in voltage mode. The controller 8A1, in the SMPS, uses feedback from the output voltage of the SMPS (Vout) to control a pulse width modulator (PWM). The PWM (85) operates a plurality of switches (82) that interact with a magnetic system (83). The controller (88) controls the current through the BLDCM (86) by applying pulse width modulation (8A2) to the electronic commutator (89), in response to feedback obtained from a physical variable (87).

In FIG. 8B, there is a similar system with the exception of the SMPS. The only change is in the SMPS itself. In fact, the systems in FIGS. 8A and 8B could interchange the SMPSs provided that both SMPSs meet the same minimum requirements.

In the current mode SMPS, the feedback from the output voltage is used by a controller (8B1), but the output of the controller yields the set current (or desired current) of a current mode controller (8B5). This current mode controller may use some common circuitry with some embodiments of the circuit, for instance FIGS. 7E, 7F and 7H. Current mode control is a superior choice and its advantages for SMPS are well known.

The circuit applied to a CPAP flow generator is shown in FIG. 8C. There are several blocks in common, but unless a more flexible system like the one already disclosed in FIG. 7I is implemented, the following differences can be seen:

| | |
|---|---|
| D8_1 | The voltage over the motor (VM) does not need to be a controlled variable. The voltage is the consequence of the speed of rotation. |
| D8_2 | The PWM in the electronics commutator (8B2 and 8A2) is not required. |
| D8_3 | The control system of the power supply itself is fully integrated into the main controller (88). |

Once the flow generation is in operation, a voltage can be measured across the motor. Since the control electronics need only a small fraction (say, as a example, around 5%) of the power needed to operate the motor, the voltage measured across the motor, as the result of its control operation, can be used to extract the power necessary for control electronics. This is the concept disclosed in FIG. 4 and detailed further in FIG. 10.

To power the control electronics (44 in FIG. 4 and 10A07 in FIG. 10A) while there is no voltage produced over the motor an "auxiliary power supply" (42 in FIGS. 4 and 10A09 in FIG. 10A) is used. The idea is to use the "auxiliary power supply" to only provide power during the initial phase of equipment operation after power is applied.

Once a suitable voltage on the motor is established, an electronic switch (43 in FIGS. 4 and 10A08 in FIG. 10A) is used to unload the "auxiliary power supply". Alternatively, the "auxiliary power supply" can be shut down by the control electronics itself (10A07) or automatically (see circuit of FIG. 10B). If the power drawn by the "auxiliary power supply" is small, and it is acceptable for it to remain operating, a simple current summing junction can replace the electronic switch (10A08). The advantage of this scheme is that the "auxiliary power supply" can be made simply and inexpensively, since the auxiliary power supply operates or draws significant power only for a short period of time. As the auxiliary power supply draws power during a short period of time, the heat generated inside the case is small.

There is another form of operation for the system comprised by the electronic switch and the auxiliary power supply. This system is shown in FIG. 10D.

Figure 10A:
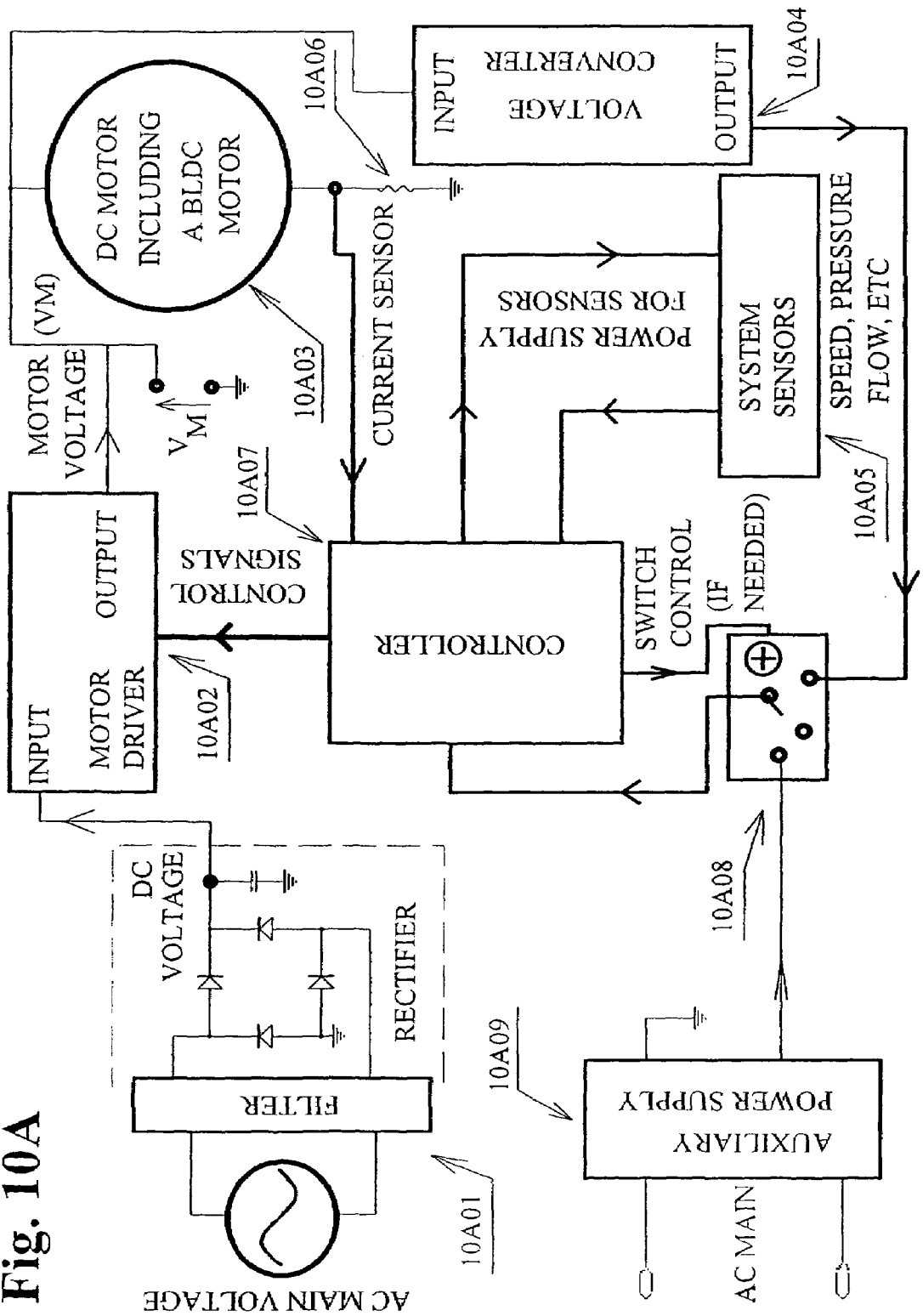
FIG. 10A is a more detailed conceptual block diagram of an airflow generator with an auxiliary power supply and an electronic switch or a current summing point to use a voltage resulting from the voltage on the brushless DC motor while in operation, once the resulting voltage reaches a suitable value.
Figure 10B:
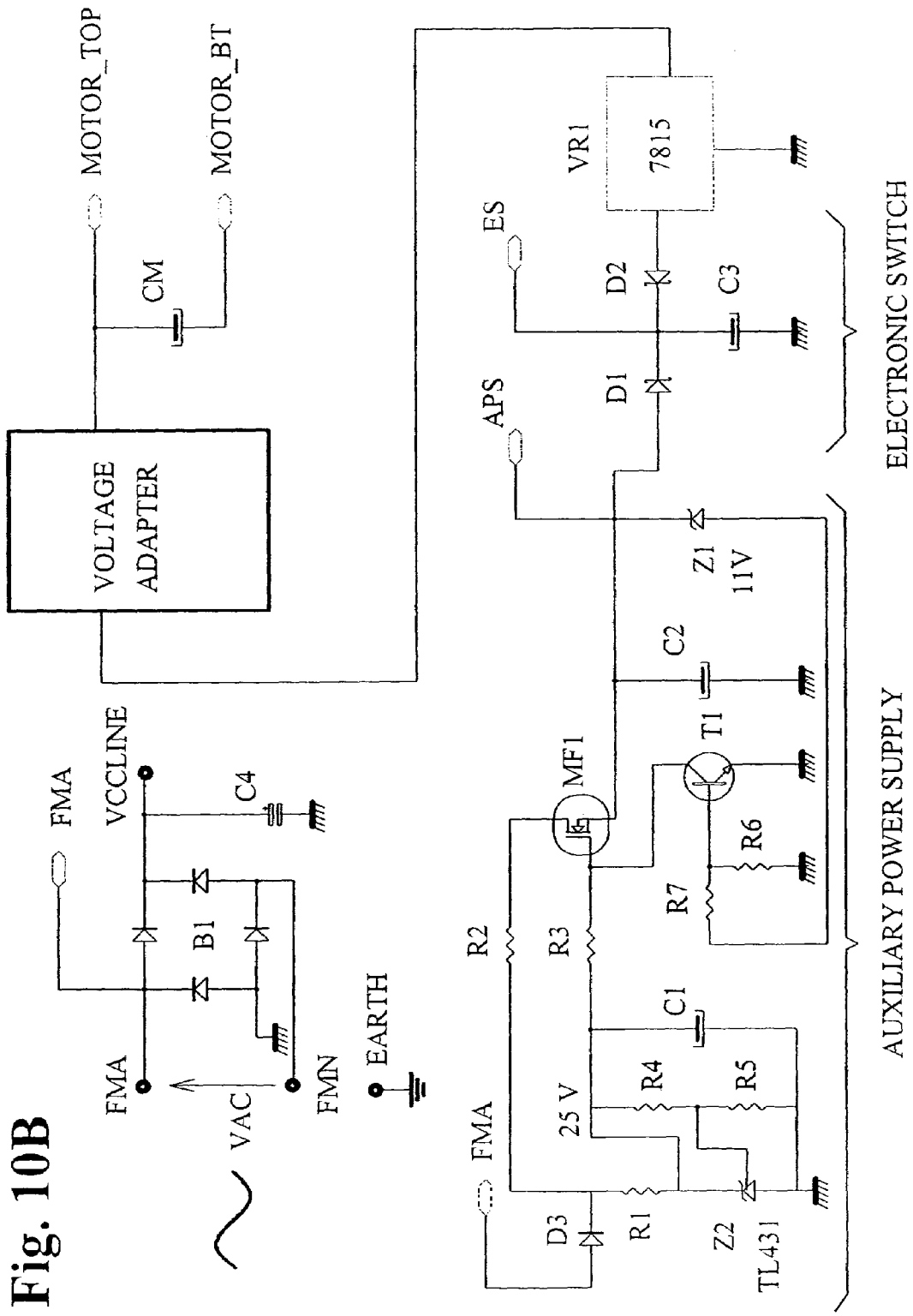
FIG. 10B is a block diagram of a system with an auxiliary power supply and the electronic switch.
Figure 10C:
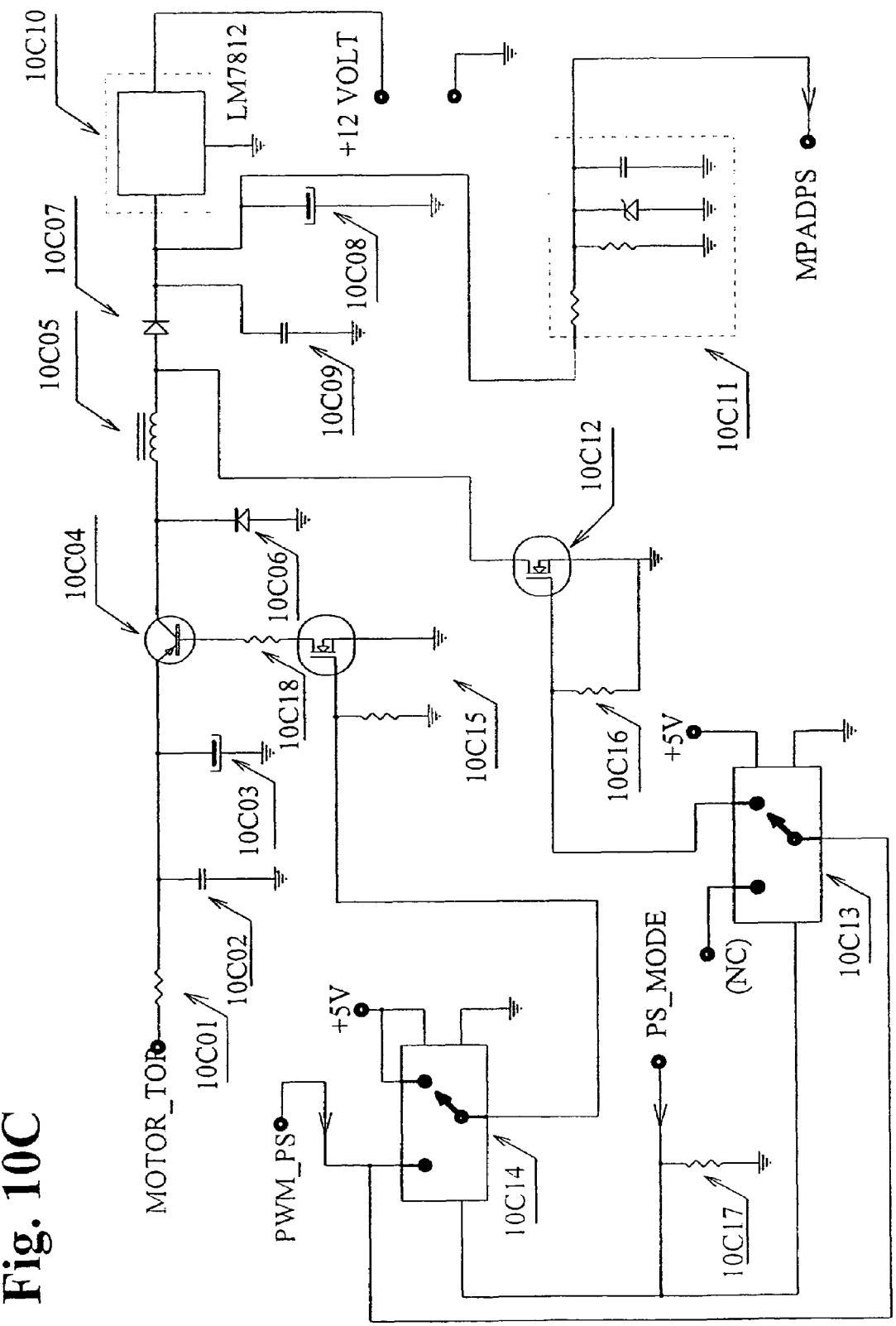
FIG. 10C is a circuit diagram of a DC-DC converter system to adapt the voltage developed over the motor to power the controlling electronics in accordance with FIG. 10A.
Figure 10D:
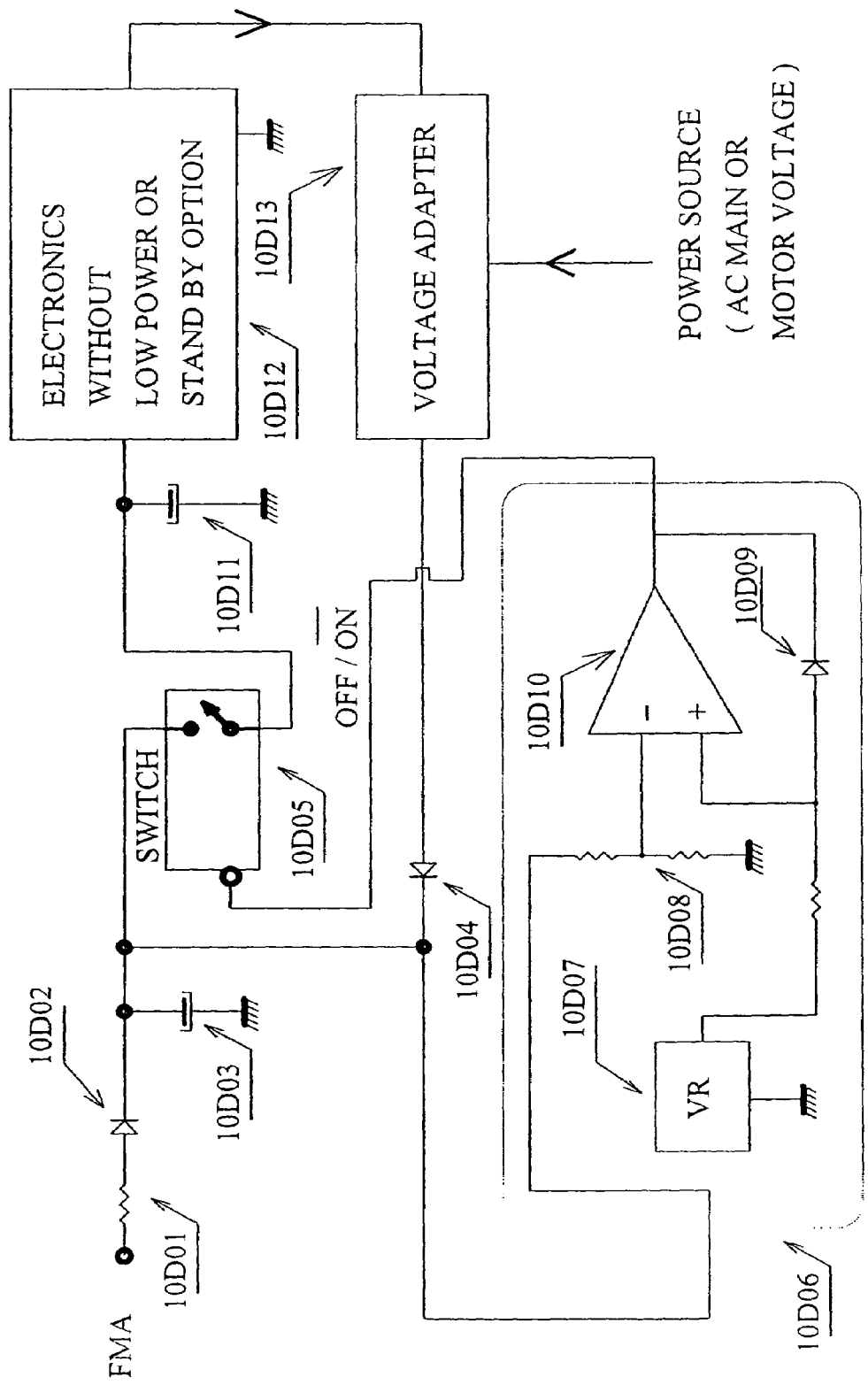
FIG. 10D is a block diagram of a system that allows the use of a simple auxiliary power supply without the need for low power electronics.

In FIG. 10D, the auxiliary power supply has a capacitor (10D03) that is charged with current from the AC main through a resistor (10D01) and a rectifier (10D02). The switch (10D05) is normally open. A voltage comparator with hysteresis (10D10) senses the voltage in the capacitor. The comparator (10D10) closes the switch (10D05) when the voltage in the capacitor is larger than a certain value. When the switch is closed, the electronics (10D12) is powered. Once the electronics are powered, the voltage in the capacitor (10D03) decreases due to the power consumption of the electronics. The electronics (10D12) have to activate the motor driver to extract power from the AC main and generate enough voltage over the motor, so a voltage adapter (10D13) can provide power to the electronics (10D12) via the diode 10D04. The voltage adapter (10D13) is typically a simple linear voltage regulator but can be as complex as a DC/DC converter, depending on the fluctuations and the value of the available voltage.

The current state of the art would also use a capacitor like (10D03). Charged with a similar system, however, rather than a switch like (10D05), the electronics would be made to operate in a very low power mode. The advantages of this aspect of the circuit are:

| | |
|---|---|
| SW_A1. | There is no need for low power electronics in the circuit following the switch. |
| SW_A2. | The switch (10D05) and the comparison system (10D06) can be implemented in a simple way, with commonly available discrete components at a lower cost and drawing a lot less power than a system using low power electronics. Low power electronics need to draw power to bias internal circuitry. The differences can be micro-amps, for the low power electronics (due to the needs of current biasing circuits), in comparison with nano-amps for the switch (the leakage current of a semiconductor). It has to be noted, that in the current state of the art of low power micro-controllers, the lower power is drawn, only after normal power is drawn, to initialise the low power mode. Such devices only work with the switch option. The resistor (10D01) charging the capacitor (10D03) is typically never disconnected. The less power the system can draw from the capacitor, before operation, the larger the resistor value and the lower the power that is continually dissipated in (10D05). With the possible practical implementations of (10D05) and (10D06), the main problem is the leakage current of the capacitor (10D03) itself. |
| SW_A3. | The currently available low power electronic devices also work from lower voltages than the higher power consumption options. A practical switch can be implemented without that restriction and switch when a higher voltage is present in the capacitor (10D03). That higher voltage in the capacitor allows the electronics to operate longer before the other source of power is available. |

Advantages for an Airflow Generator:

The practical advantages of the embodiments of the invention for an airflow generator for CPAP are:

(1) Allow a simpler, less expensive power supply as the requirements of the brushless DC motor (BLDCM) and its electronic commutator are far less demanding than those of the controlling electronics. This is particularly useful in bi-level devices as the sudden acceleration of the motor requires extra power, and power supplies tend to be bigger, more complex and expensive.

(2) Allow the controlling elements of the power supply to be fully integrated into the controlling electronics (typically microprocessor based), hence lowering the component count, which in turn leads to more reliability and lower cost.

(3) Allow greater flexibility, since the controlling processor can be made to control not only the current though the BLDCM, but also the voltage over the BLDCM that can be made to change continually as commanded by the control electronics. If as it is commonly used to control the voltages over the windings, the electronic commutation is pulse width modulated, it allows a flexible control scheme in which simultaneously the voltage available to the pulse width modulating circuit can be changed in addition to the pulse width itself.

(4) If the flexibility discussed above is not necessary, then the electronic commutation of the BLDCM does not need to include pulse width modulation. The resulting system is simpler, has fewer components and is more efficient, since there is no power dissipation in the switches (typically MOSFETs) of the electronic commutator of the BLCDM when performing pulse width modulation.

Different Implementations:

I1. A Complete Flow Generator without Auxiliary Power Supply

FIG. 9 shows an example of an airflow generator for CPAP treatment that uses the invention disclosed above. A conventional low power AC main frequency transformer with two secondary windings is used (9B2, in FIG. 9B) to power the control electronics, while the BLDCM (9D2, in FIG. 9D) is driven from the rectified AC main (node VCCLINE, in FIG. 9A), following the circuit disclosed (see FIG. 9C) with the topology shown in FIG. 7A. The BLDCM (9D2, in FIG. 9D) Hall effect sensors and its electronic commutator are powered from the voltage generated from running the motor itself.

FIG. 9A shows the circuit from the AC main IEC power connector (9A6) to the node VCCLINE. VCCLINE, the output of the circuit, is the full wave rectified AC main. This is the DC voltage source (7A01) of FIG. 7A.

Two fuses (9A8) and (9A7) are included for protection. The switch (9A9) is used to turn the equipment on or off. The switched AC main voltage is found between SA and SN. A metal-oxide varistor (MOV), (9A10) protects the device against AC main voltage transients.

A filter (9A1) is used for EMI compliance (Ref. 8). The requirements on this filter should be reduced, as the frequency of the main source of EMI is modulated using spread spectrum techniques. A rectifier bridge (9A2) connects as a full wave rectifier, with a capacitive filter provided by (9A4). The capacitor (9A3) improves the high frequency impedance of the filter. A NTC (9A5) protects the rectifier bridge (9A2) against in-rush current when the equipment is turned on.

FIG. 9B shows the low power transformer (9B2) that provides power to the control electronics. The nodes FMA and FMN in FIG. 9B are connected to the input of the rectifier bridge (9A2) after the filter (9A1) and the NTC (9A5). A snubber network 9B1 protects the transformer. One of the secondary windings is rectified by the bridge (9B3), and the output is filtered by (9B6) and regulated by linear regulators (9B4) and (9B5). This circuit provides +15 volts to power the analog sensors, and +5 volts to power the microcontroller. The sensors and the microcontroller are in FIG. 9J.

FIG. 9C shows the other main components of the circuit. The coil (9C3) is the inductance $L_M$, shown as (7A05) in FIG. 7A. The capacitor (7A03) of FIG. 7A is implemented with the capacitors (9C2) and (9C1). Capacitor (9C1) improves the high frequency behavior of the capacitor (9C2). Diode (9C4) corresponds to diode (7A04) of FIG. 7A. The motor (9C5) corresponds to the motor (7A02) of FIG. 7A.

Electrically, the BLDCM and the electronic commutator (also known as BLDCM "controller") is a two terminal network with terminals labelled MOTOR_TOP and MOTOR_BT. The current flowing from MOTOR_TOP to MOTOR_BT is the variable used by the speed control loop, to control the speed of the BLCDM and hence the air pressure that the flow generator produces.

The switch of FIG. 7A is implemented by the power MOSFET (9H4) in FIG. 9H. The current sensor (7A09) in FIG. 7A is implemented with the resistor (9H5) in FIG. 9H. (7A06) and (7A07) are implemented inside the UC2845 integrated circuit (9H3) in FIG. 9H. The data sheet of the device manufactured by Texas Instruments (it used to be a device manufactured by Unitrode) can be consulted for details. The drain of (9H4) is the node SW in FIG. 9H that connects to the same node in FIG. 9C. The "desired current" terminal in FIG. 7A is the command information that the microprocessor in FIG. 9J sends to the UC2845 in FIG. 9H.

FIG. 9D shows the interface with the BLDCM (9D2). A low voltage drop linear voltage regulator (9D1) gets +5 volts from the terminal MOTOR_TOP. The node is called (+5VSENSORS) in FIG. 9D. A diode (9D27), and a filter consisting of resistor (9D29) and capacitors (9D28), is used with the voltage regulator.

The motor sensors (terminals S1M to S3M of 9D2) interface the main microcontroller through optocouplers (9D8, 9D9 and 9D10). The outputs of the optocouplers are the signals S1, S2 and S3 that connect to the microprocessor (9J2) in FIG. 9J.

Part of FIG. 9D and FIGS. 9E and 9F show an implementation of an electronic commutator for a typical BLDCM used in airflow generators for CPAP. The circuit shown is particularly flexible in terms of maximum and minimum voltage that the commutator would work with. This is achieved by the use of a current source to drive the gate of the P-channel MOSFETs.

In FIG. 9D, resistor (9D25), Zener diode (9D26), resistor (9D24) and transistor (9D23) form a current source. When the optocoupler (9D5) is not conducting, the current in the collector of (9D25) causes Zener diode (9D11) to conduct, turning the P-channel MOSFET (9D3) on. Resistor (9D12) is included for protection.

The N-channel MOSFET (9D4) is of logic level type and is turn-on when optocoupler (9D6) conducts. A simple resistor (9D13) is shown in the gate of (9D4). However, extra circuitry to accelerate the removal of charge from the gate capacitance may be necessary if the pulse width modulation of the electronic commutator is used. The point connecting the drain terminal of both power MOSFETs is connected to L1 terminal of the BLDCM; the signal name is L1C.

Negative voltage with respect to MOTOR_BT is used for the current source. The voltage is labelled MOTOR_BT_V and is generated from +5VSENSORS by the circuit shown in FIG. 9G. FIG. 9G shows a positive to negative voltage converter using a cascade of two industry standard charge pump integrated circuits ICL7660 (9G1 and 9G2 in FIG. 9G).

In FIGS. 9F and 9E, the current source, the N and P channel power MOSFETs and the two optocouplers have a function similar to the circuit in FIG. 9E that drives the L1 winding of the motor. The L2 winding of the motor is driven by circuitry in FIG. 9E, while the L3 winding of the motor is driven by circuitry in FIG. 9F.

FIG. 9H shows a practical circuit that controls the switch (7A08) in FIG. 7A. An integrated circuit normally found in off-the-main switched mode power supplies, the Unitrode's UC2845 (9h3), is controlling a power MOSFET (9H4). The current sensor (7A09) of FIG. 7A is the resistor (9H5). RC network (9h7) and (9h8) is a low pass filter that is necessary to eliminate switching noise from the voltage resulting from sensing the current.

The voltage of one of the windings of the transformer (9B2) is rectified by (9h1), filtered by (9h12) and regulated to 12 volts by (9h2). The 12 volts are used to power the current mode controller chip (9h3).

Transistor (9h12) saturates due to the current through resistor (9h9), connected to the +12 volt supply. A low voltage in pin 1 of (9h3) inhibits the operation of the chip and keeps the power MOSFET (9h4) off. To start the operation of the chip, or to make it work in bursts, to achieve very low currents through the motor, the main microprocessor operates the optocoupler (9h10) through resistor (9h11). A low level in the terminal labelled (shdwn) enables the operation of the current mode controller. In this way, the initial current can be set, before the chip can operate.

The current is set through pulse width modulation applied to resistor (9h20), connected to the optocoupler (9h19). The waveform in the collector of (9h19) is filtered by resistor (9h16) and capacitor (9h17) and is buffered by operational amplifier (9h15) to give a voltage that is used by the error amplifier of the UC2845 (9h3). The error amplifier is programmed with a gain of (−1) by resistors (9h14) and (9h13). Capacitor (9h21) limits the bandwidth of the amplifier. The voltage in pin 1 of the UC2845 is reduced internally by subtracting two diode drops and divided by three before being compared by the voltage sensed by the pin labelled (CS). When the voltage in (CS) exceeds the voltage in pin 1, as processed above, the switch (9h4) is turned off. The switch (9h4) is turned on by the oscillator inside the UC2845.

The optocouplers (9h10) and (9h19) are controlled by the microcontroller (9J2) that controls the main function of the airflow generator. By changing the parameters of the pulse width modulation in the optocoupler (9h19), the main microcontroller changes the maximum current through the sensing resistor (9h5), hence changing the average current through the BLDCM. The other optocoupler (9h10) can be used to set the current to "0" for several cycles, hence allowing for small average current to flow through the BLCDM. This optocoupler can also be used in case of error or when the equipment is in stand-by.

The timing for the oscillator is provided by an RC network connected to the pin labelled (RC) in (9h3). Normally a simple RC network is connected there.

FIG. 9I shows a circuit to change the frequency of operation of the UC2845, under the control of the microprocessor (9J2). This is done to use spread spectrum techniques to facilitate EMI compliance (Ref. 8). Pulse width modulation is applied through the optocoupler (912). The waveform in the emitter of the output transistor of (912) is filtered by (914) and (916). (913) and (915) form a resistive divider that limits the maximum voltage over the filter. The output is referred to +Vref, the 5 volts reference in the UC2845. Operational amplifier (917) and transistor (9112) are connected as a current source that is proportional to the voltage between +Vref and the output of the filter (voltage over the capacitor (916)). This current charges the capacitor (9113) that is part of the oscillator of UC2845. Resistor (9110) provides a minimum current for charging the capacitor, giving a minimum frequency to the oscillator.

Another way of changing the frequency of the oscillator is to replace the resistor in the RC oscillator of the UC2845 with a digitally controlled potentiometer.

FIG. 9-J shows the main microcontroller of the flow generator. The microcontroller (9J2) operates the electronic commutator of the BLDCM (9D2) and the user interface (9J3) and reads the information from sensors (9J4). The circuit block (9J4) represents the pressure and airflow sensors typically found in the top end CPAP flow generators. (9J2) also interfaces with the current mode controller UC2845 of FIG. 9H. This microcontroller could also communicate with other clinical equipment (typically through serial lines) as is well-known practice.

The microcontroller (9J2) sets the current through the BLDCM by using the pulse width modulator PWM2 and an output line (signal name SETC and shdwn) connecting to the circuit of the UC2845. (9J2) also changes the frequency of operation of the UC2845 by using another pulse width modulator (PWM3). The microcontroller (9J2) in FIG. 9J has to generate the needed dead time, that is, the time necessary to prevent both MOSFETs, the N-channel and the P-channel from conducting at the same time, effectively short-circuiting MOTOR_TOP with MOTOR_BT.

Figure 9J:
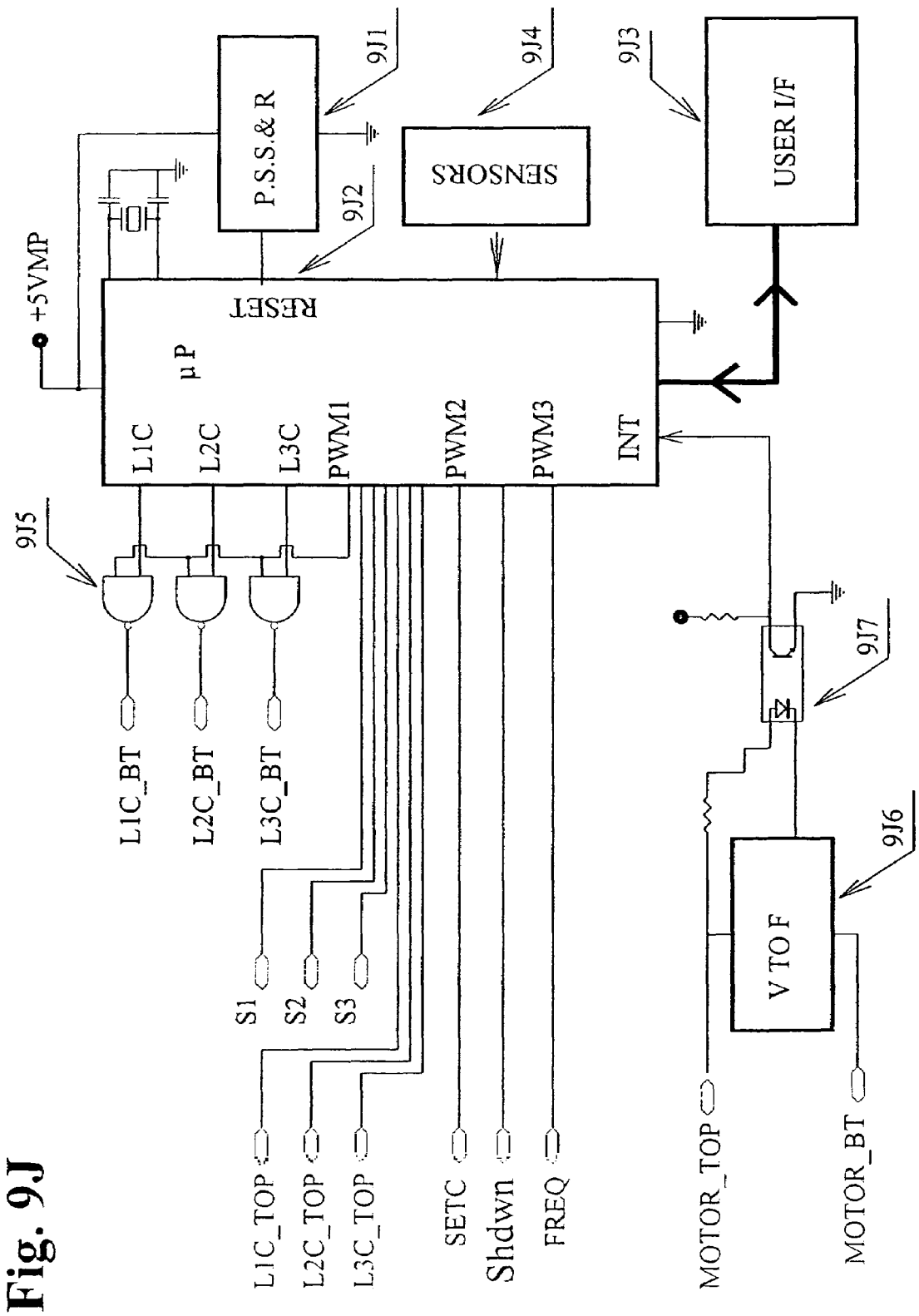

A voltage to frequency converter, appearing as a block (9J6) in FIG. 9J, connects to microcontroller (9J2) through optocoupler (9J7). This is used to measure the voltage between MOTOR_TOP and MOTOR_BT.

Figure 9K:
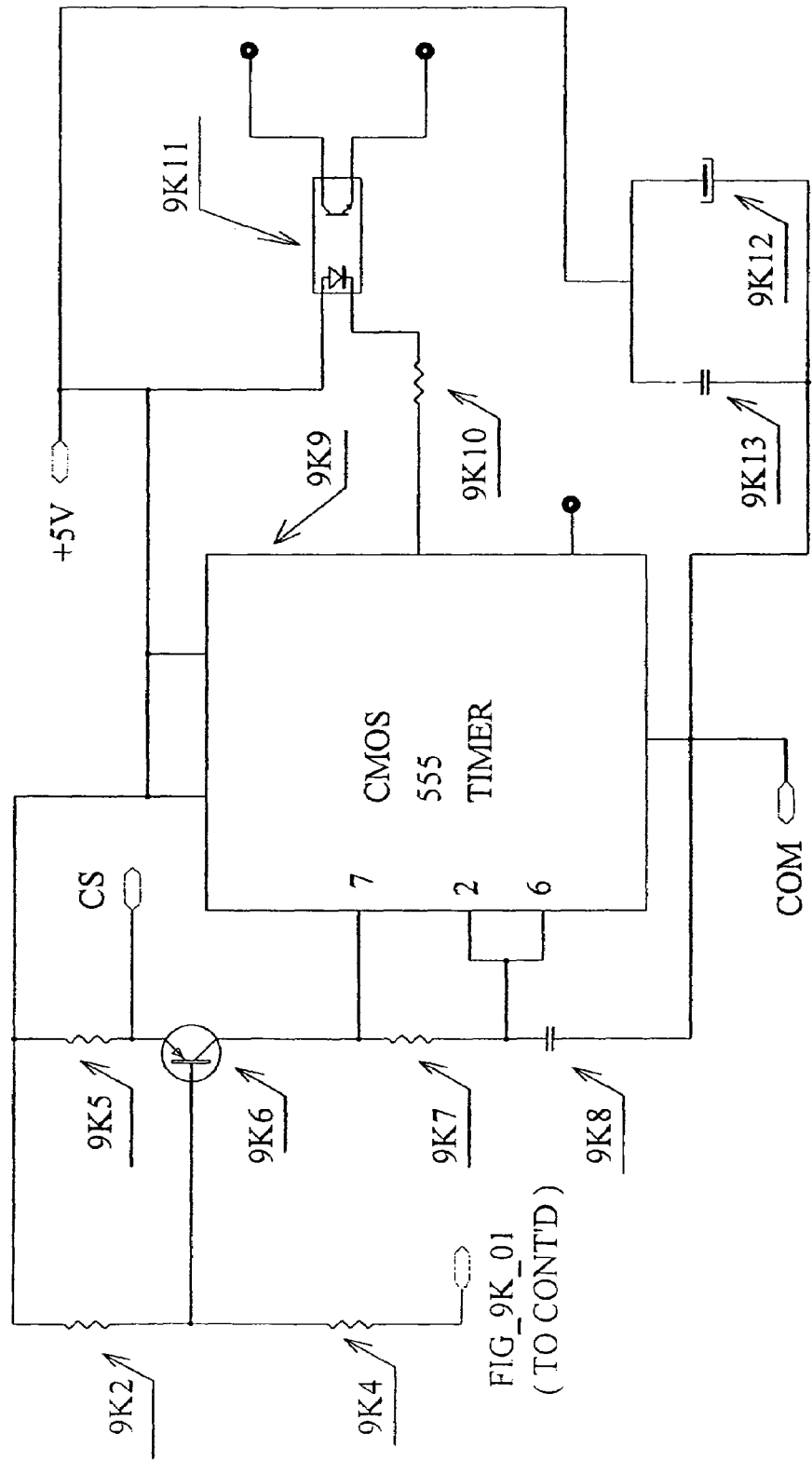
Figure 9K:
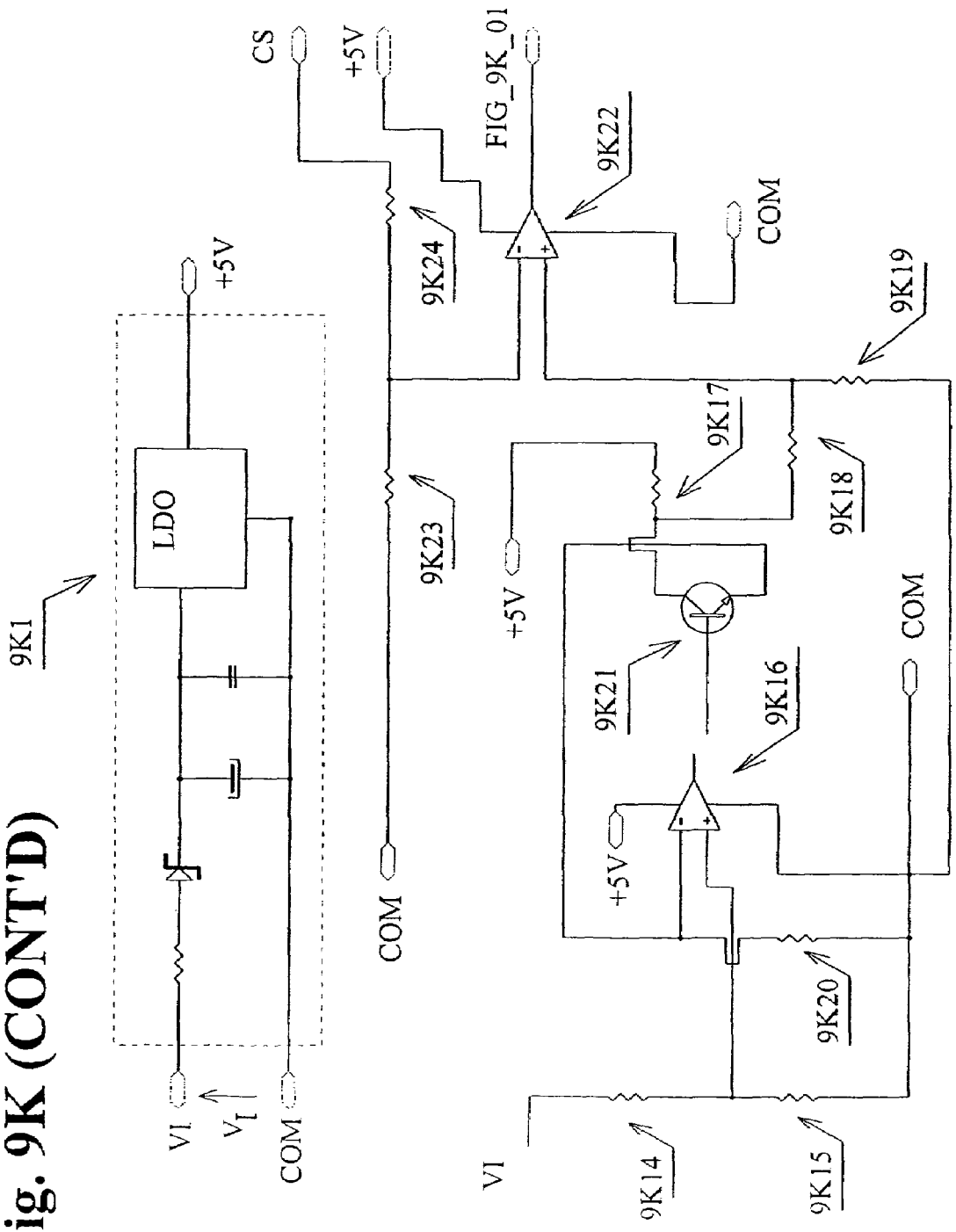

FIG. 9K shows a circuit for the voltage to frequency converter (9J6). The voltage in MOTOR_TOP is filtered and regulated by a low voltage drop 5V linear regulator (9K1). Operational amplifiers (9K16) and (9K22), along with transistors (9K21) and (9K6), form a controlled current mirror. The current that charges the timing capacitor (9K8) depends on the voltage across resistor (9K15), which in turn depends on the input voltage, the voltage between MOTOR_TOP and MOTOR_BT. The capacitor (9k8) is connected to a CMOS 555 timer IC, (9K9). The capacitor (9k8) is discharged by resistor (9K7), which is operated by the timer IC. Discharge time is constant and the charge time depends on the input voltage. Optocoupler (9K11) in FIG. 9K corresponds to optocoupler (9J7) in FIG. 9J.

Figure 11A:
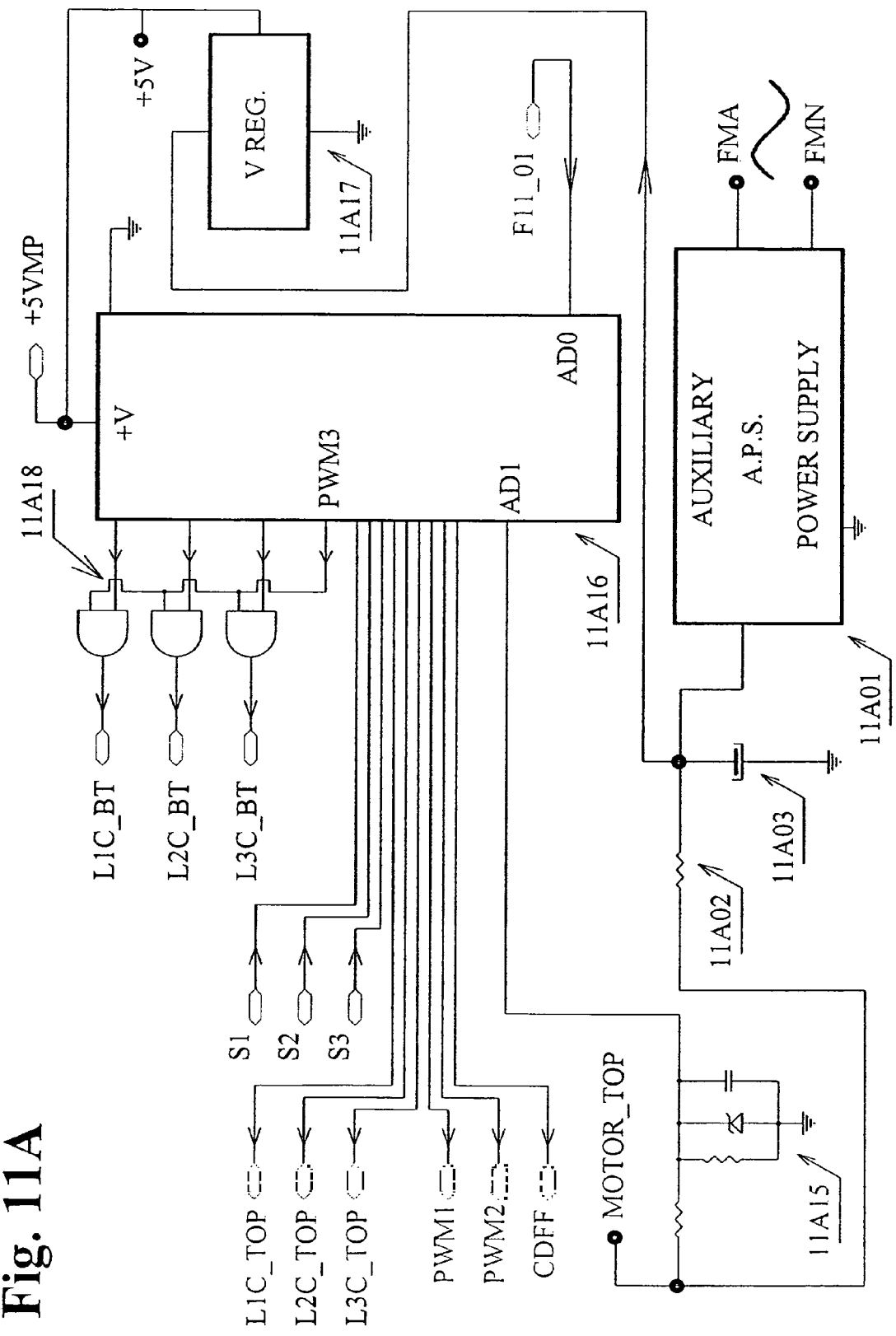
FIGS. 11A and 11B are diagrams of an airflow generator for CPAP treatment implementing an embodiment of the invention.

A crowbar circuit (11A06), as shown in FIG. 11A, may be added, connected between MOTOR_TOP and MOTOR_BT as a protection device. The crowbar is a well-known circuit in which an SCR is triggered when the voltage across the terminals of the circuit exceeds a given value, working as a protection against malfunctions. Usually when a crowbar is triggered, a fuse (11A04 in FIG. 11A) is blown to prevent further damage.

An alternative way of operating the electronic commutator of the BLDCM is to use a "small", 20-pin microcontroller (for instance, the AT90S2313 from Atmel Semiconductor) to perform the logic and interface with the main controller via an optically coupled serial NRZ full duplex line. This solution releases the main microprocessor from the task of operating the electronic commutator. The 20-pin microcontroller can report data to the main controller, such as speed of the BLDCM, as it would be connected to the motor sensors. Commands to brake the motor or operate coasting can be given by the main microcontroller to the 20-pin microcontroller through the serial communication line. Also with additional interface circuitry, the "small" 20-pin microcontroller can report the voltage over the motor or can operate its own pulse width modulator or current control circuitry, to have a system as was disclosed in FIG. 7I. The second "small" microcontroller can also be used as a complex watch dog timer. Both microcontrollers can reset each other in case of detection of a fatal error condition.

Figure 9L:
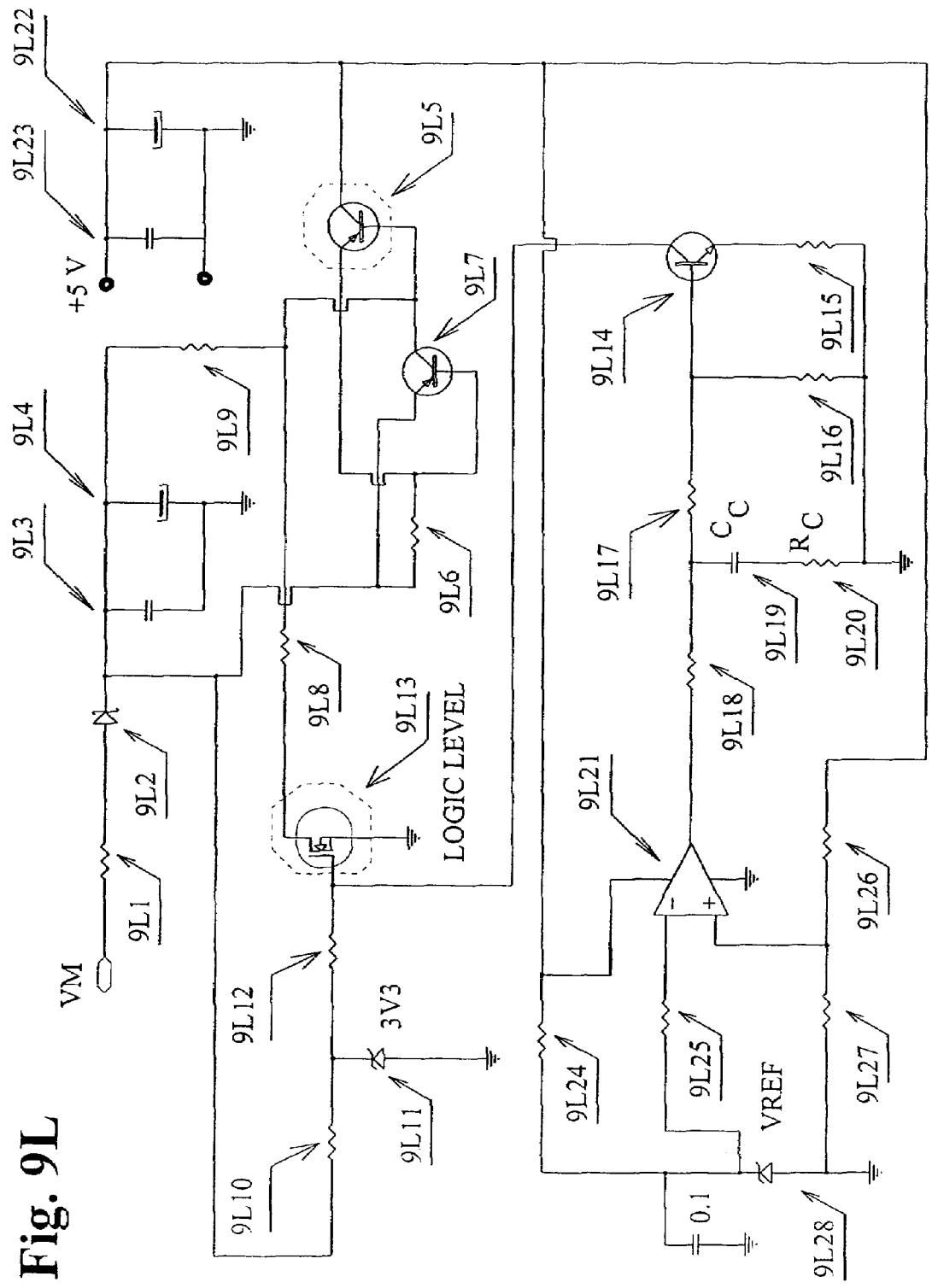

FIG. 9L shows a low voltage drop linear regulator suitable to be used in (9D1), (9K1) and (11A17). The circuit is designed to be used with 24 volt motors, since currently available integrated circuits such as, for instance, the LM2940 can work continually only with 20 VCC.

In the circuit of FIG. 9L, an operational amplifier (9L21) works as the error amplifier of a linear voltage regulator.

Resistors (9L26) and (9L27) form the feedback network, and its relationship determines the output voltage. (9L28) is a voltage reference that is powered from the output of the circuit itself through resistor (9L24). A PNP topology is chosen for the pass transistor of the linear regulator (9L5) to obtain low voltage drop. Transistor (9L7) and resistor (9L6) provide current limiting. The output current circulates through resistor (9L6) and when the voltage drop reaches a value that causes the base-emitter junction of (9L7) to conduct, the current through the collector of (9L7) diverts current from the base of (9L5), limiting the output current.

Resistors (9L9) and (9L8) bias transistor (9L5) from the drain terminal of a logic level MOSFET (9L13). The gate terminal of the logic level MOSFET (9L13) is connected to a voltage source implemented with 3.3 volt Zener diode (9L11), through resistor (9L12). Resistor (9L10) provides bias current to the 3.3 volt Zener diode (9L11). The collector current of transistor (9L14) can cause a voltage drop in resistor (9L12) and turn off the logic level MOSFET (9L13).

On powering up the circuit, when the output voltage is lower than the minimum voltage needed for the operation of the operational amplifier (9L21) and transistor (9L17), the logic level MOSFET (9L13) is saturated as its gate has the full 3.3 volts of the Zener diode (9L11). In this condition, maximum current circulates through the resistor (9L8) from the base of transistor (9L5). The current charges output capacitors (9L22) and (9L23). This arrangement guarantees that the circuit powers up. When the operational amplifier senses that the voltage at the output, as reduced by the resistive divider (9L26) and (9L27), is larger than the voltage reference (9L28), the voltage on its output is raised.

The output of the operational amplifier (9L21) is connected to a resistive divider formed by (9L18), (9L17) and (9L16). The resistive divider formed by (9L18), (9L17) and (9L16) biases the base of transistor (9L17). Because of the emitter resistance (9L15), transistor (9L17) works as a current source. The higher the voltage difference between the sampled circuit output voltage in the non-inverting (+) input of the operational amplifier (9L21) and the reference voltage (9L28), connected to the inverting input of (9L21), the higher the voltage at the base of (9L14) and the higher the current through its collector.

The higher the current through collector of (9L14), the lower the voltage in the gate of logic level MOSFET (9L13), and the lower the current through the base of (9L5). The lower the current through the base of (9L5), the lower the current through its collector, and the lower the output voltage of the circuit is, compensating the original effect. Capacitor (9L19) and resistor (9L20) compensate the feedback loop, by shaping its frequency response. Resistor (9L1) and capacitors (9L4) and (9L3) form a low pass filter for the noise and voltage variations of the input voltage $V_M$. Schottky diode (9L2) is needed if the voltage available from $V_M$ is discontinuous.

I2. Auxiliary Power Supply DC-DC Converter and Switch

FIG. 10B shows an example of the "auxiliary power supply" referred to in FIG. 10A and FIG. 4. This power supply typically dissipates significant power during the first seconds of operation of the unit. It consists of the shunt regulator (Z2), formed by a programmable Zener diode TL431, that is followed by a power MOSFET (MF1) connected to the voltage generated by the TL431 via the resistor (R3). The combination of Zener diode (Z1), transistor (T1) and the resistors (R6) and (R7) causes the voltage at the output to stabilize around 12 volts.

If the voltage at the output (point labelled APS) grows, the base current of transistor (T1) also grows, causing the collector current of transistor (T1) to grow. This, in turn, causes the voltage in the gate of MOSFET (MF1) to decrease, causing the output voltage to decrease. In this way, the system is stable. The electronic switch shown in FIG. 4 is made with diodes (D1) and (D2) for sake of clarity.

When the linear regulator 7815 produces 15 volts, diode (D2) conducts and diode (D1) is reverse-biased. However, in a practical circuit, diode (D1) can be replaced by a short-circuit, since a voltage larger than around 13 volts in the output (node labelled APS) makes the transistor (T1) conduct in such a way as to cut off MOSFET (MF1). This leaves only a small current flowing every half cycle of the AC main through the programmable Zener integrated circuit TL431 (Z2). The voltage to generate the 15 volts of the 7815 regulator is generated from the voltage over the motor by a suitable DC-DC converter.

Alternatively, the inductance $L_M$ ((64) in FIG. 6) connected to the BLDCM can be replaced by a transformer, with one of its secondary windings generating the voltage for the 7815.

I3. DC-DC Converter

FIG. 10C shows an implementation of the DC-DC converter necessary to extract useable voltage out of the motor voltage.

The DC-DC converter is designed to be controlled from the main microprocessor. The design can be used to reduce or boost the voltage collected from MOTOR_TOP, according to the mode of operation. The circuit can operate in three modes:

DCDC_m1: As a down converter switched mode power supply. The voltage from MOTOR_TOP is filtered by resistor (10C01) and capacitors (10C02) and (10C03). The transistor (10C04), diode (10C06) coil (10C05) and capacitors (10C08) and (10C09) can operate as a down converter switched mode power supply, when motor voltage is high. In this mode of operation the MOSFET (10C12) is off and transistor (10C04) is controlled by a pulse width modulator output from the microcontroller (PWM_PS). The microprocessor uses the voltage sampled by (10C11) (node labelled MPADPS) to close the loop.

DCDC_m2: As a boost converter switched mode power supply. The voltage from MOTOR_TOP is filtered by resistor (10C01) and capacitors (10C02) and (10C03). Transistor (10C04) is saturated all the time. The MOSFET (10C12), diode (10C07) coil (10C05) and capacitors (10C08) and (10C09) operate as a boost converter (also called a "ringing choke") switched mode power supply, when motor voltage is low. In this mode of operation, the MOSFET (10C12) is controlled by a pulse width modulator output from the microcontroller (PWM_PS). The microprocessor uses the voltage sampled by (10C11) (node labelled MPADPS) to close the loop.

DCDC_m3: As a linear power supply. The voltage from MOTOR_TOP is filtered by resistor (10C01) and capacitors (10C02) and (10C03). Transistor (10C04) is saturated all the time. The MOSFET (10C12) is off all the time. The coil (10C05) and capacitors (10C08) and (10C09) act as further filtering. Diode (10C07) conducts all the time.

The microprocessor selects the mode of operation based on the voltage over the capacitor (10C08), by operating the output line PS_MODE. The line PS_MODE changes the way analog switches (10C14) and (10C13) connect.

I4. Start-up Switch

Figure 10E:
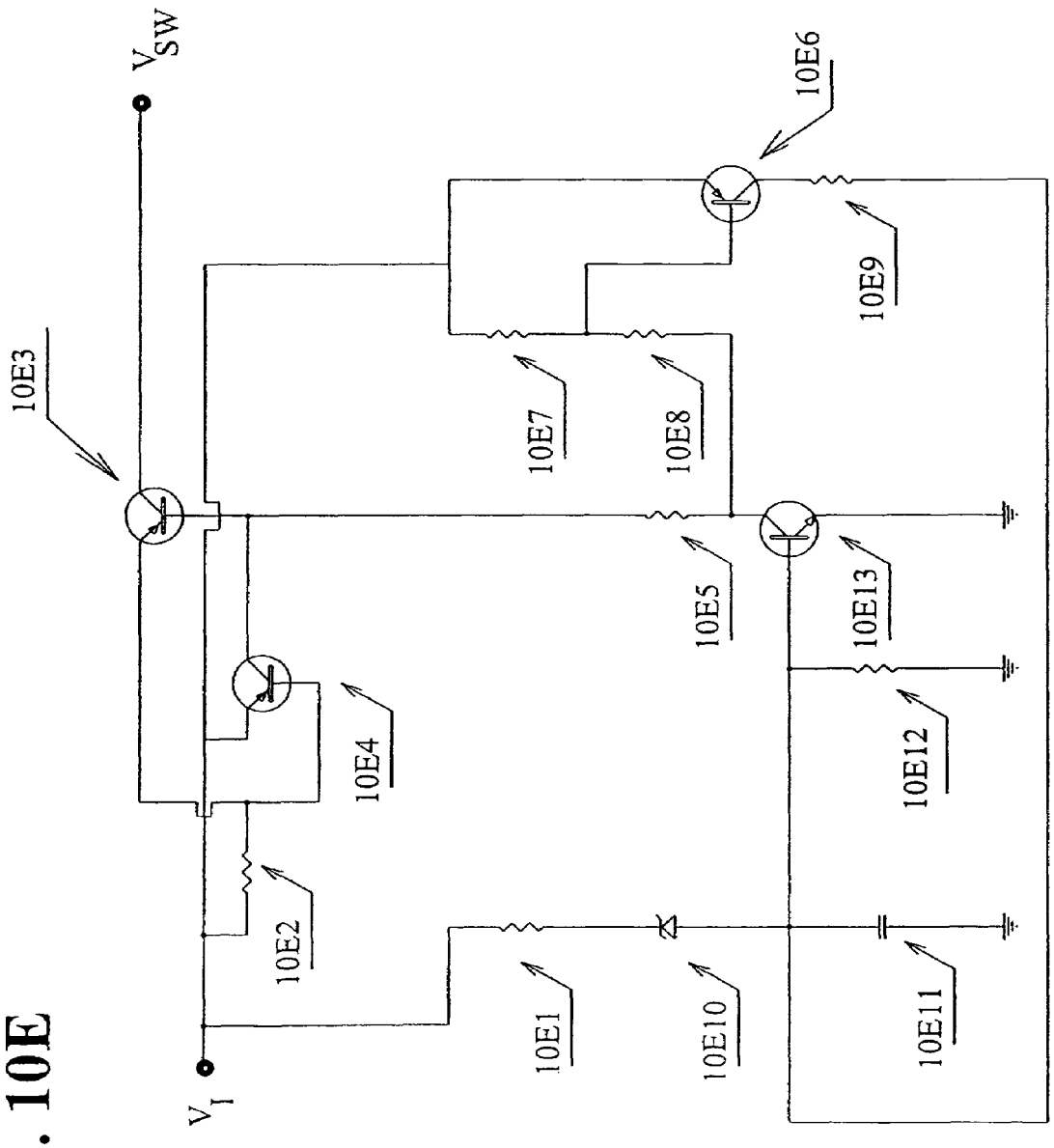
FIG. 10E is a circuit diagram of an electronic switch used in FIG. 10D.

FIG. 10E shows an implementation of the switch (10D05) of FIG. 10D and the circuit that operates the switch (10D06) in FIG. 10D. When transistor (10E13) is off, and the voltage at the input is lower than the Zener voltage of diode (10E10) plus the minimum voltage drop for conduction in the base of transistor (10E13), the transistor (10E03) is off. The current taken from the input voltage is the leakage current of all the transistors connected. When the voltage at the input is high enough for the base of (10E13) to conduct with current through the Zener diode (10E10), transistor (10E03) is turned on, as collector of (10E13) draws current and is pulled down. Also, transistor (10E06) is turned on.

The collector current of (10E06) goes through the base of (10E13) establishing a positive feedback loop, which keeps (10E13) conducting even when the input voltage Vi becomes lower than the minimum voltage required to start the operation of the switch.

Transistor (10E04) and resistor (10E02) limit the current through the transistor (10E03). In this way, large capacitors can be connected to Vi and Vsw, without damaging the transistor (10E03).

I5. Flow Generator with Auxiliary Power Supply

FIG. 11A shows an airflow generator using the concept of auxiliary power supply.

The topology is similar to that of FIG. 6 with the switch implemented by MOSFET (11A05), the DC power source being the rectified AC main as in FIG. 9A (note node VCCLINE). The inductance is coil (11A08) and the freewheeling diode is (11A07). The capacitor in parallel with the BLDCM is (11A11). The current is sensed by resistor (11A14). The BLDCM is (11A12).

All the control circuit runs from +5 volts from a low voltage drop regulator (11A17). The auxiliary power supply (11A01) can be implemented with the circuit of FIG. 10B, modified to give around 6 volts at the output rather than 12 volts. This is done by changing Zener diode (Z1) in FIG. 10B to a 5.6 volt Zener diode rather than an 11 volt one.

An alternative to the auxiliary power supply (11A01) is the arrangement of FIG. 10D. With the circuit of FIG. 10E replacing the switch (10D05) and the circuit block (10D06), the low voltage drop 5V regulator (11A17) and all the circuits running from 5 volts take the place of (10D12), and the voltage adapter (10D13) is resistor (11A02) and capacitor (11A03).

The microcontroller (11A16) has inputs and outputs that can interface with a brushless DC motor and electronic commutator similar to the one shown in FIG. 9. Consequently, the control lines out of (11A16) have been labelled consistently with the output lines out of (9J2). The voltage in the node MOTOR_TOP is monitored using an analog input to the microcontroller (A/D converter) through network (11A15). The MOSFET (11A05) is driven by a pulse transformer (11A09). The electronic commutator of the BLDCM can be pulse width modulated to enable a more flexible operation. The effect is achieved by applying one of the PWM outputs of the microcontroller to the gate (11A18).

Figure 11A:
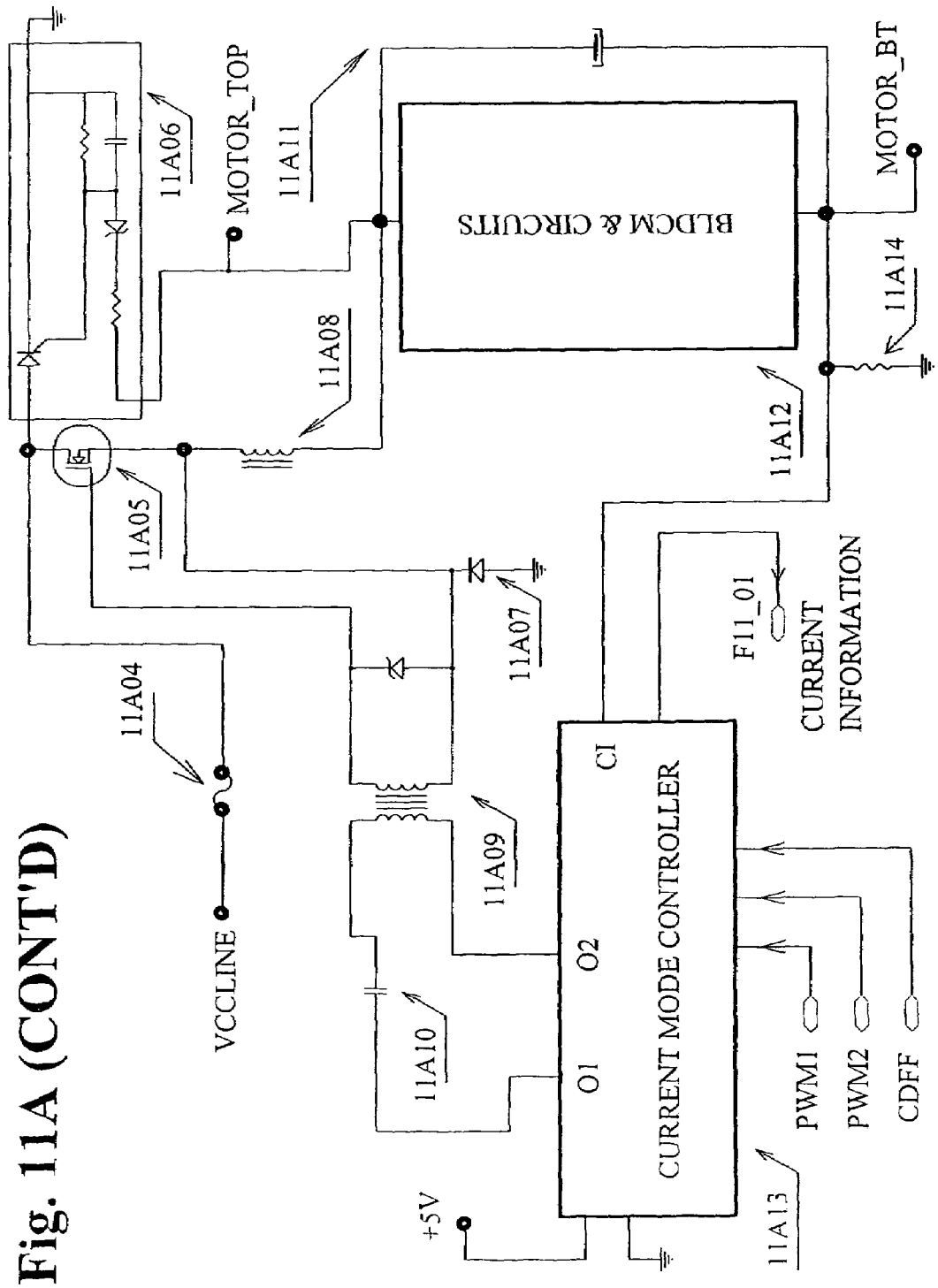
Figure 11B:
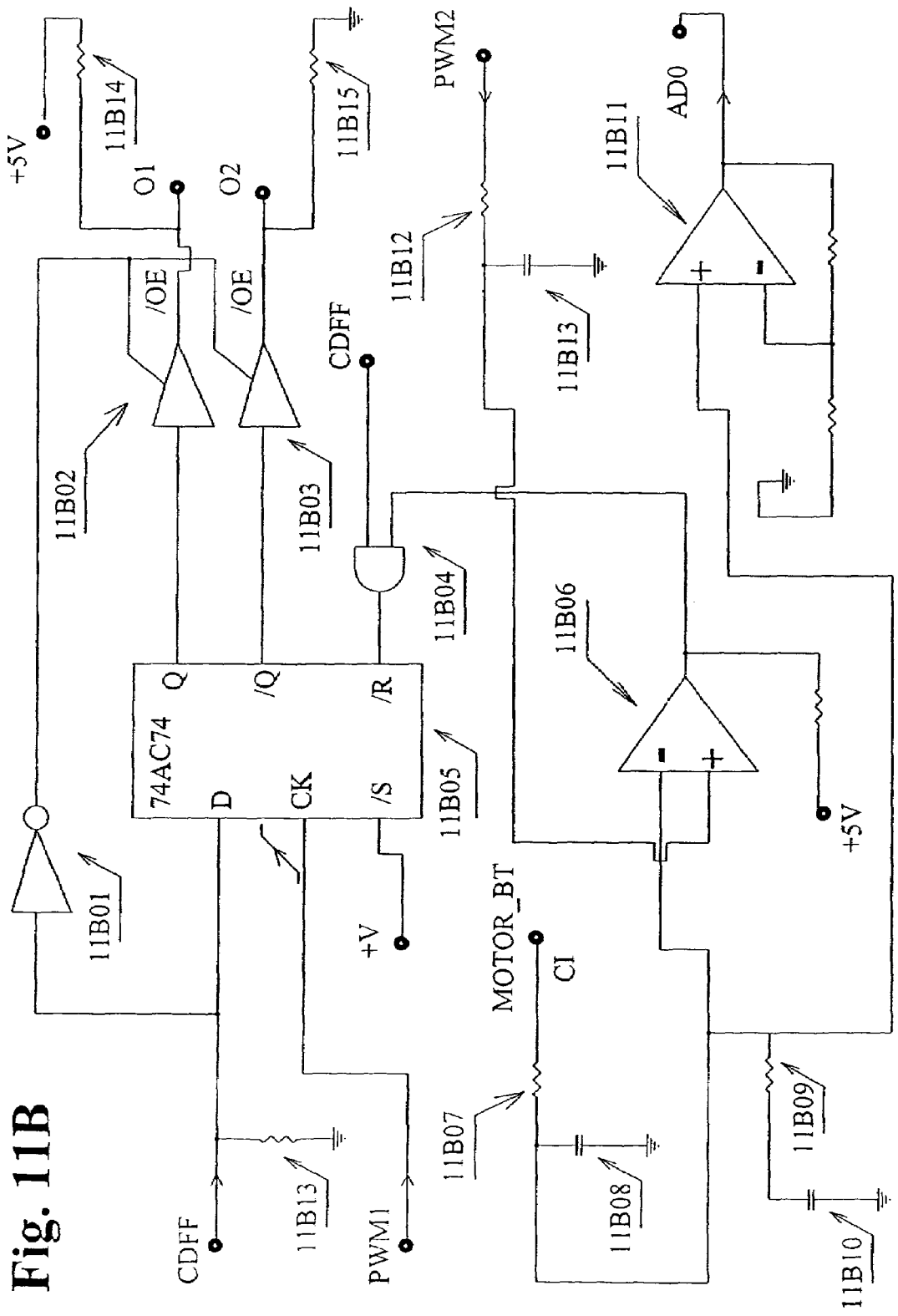

FIG. 11B shows a current mode controller designed to work with the circuit of FIG. 11A. One of the pulse width modulator output lines of the microcontroller clocks the "D" type flip-flop (11B05), setting the output to one. When the current reaches the level set by another pulse width modulator, through a filter formed by (11B12) and (11B13), the comparator (11B06) resets the flip-flop. The output of the flip-flop is connected to buffers that drive the transformer (11A09). Gate (11B04) and inverter (11B01) provide failsafe operation. If the line labelled CDFF from the microcontroller is low, the output buffers are disabled and the flip-flop cannot be set to one.

The current is measured also by the microcontroller by reading the A/D input connected to the operational amplifier (11B11), which is amplifying the voltage sensed by the resistor (11A14). A crowbar circuit is shown in FIG. 11A (11A06) that is connected between MOTOR_TOP and MOTOR_BT as a protection device. The crowbar is a well-known circuit in which an SCR is triggered when the voltage across the terminals of the circuit exceeds a given value, working as a protection against malfunctions. When the crowbar is triggered, the fuse (11A04) is blown to prevent further damage.

I6. Multiple Cooling Fan Controller

Figure 12:
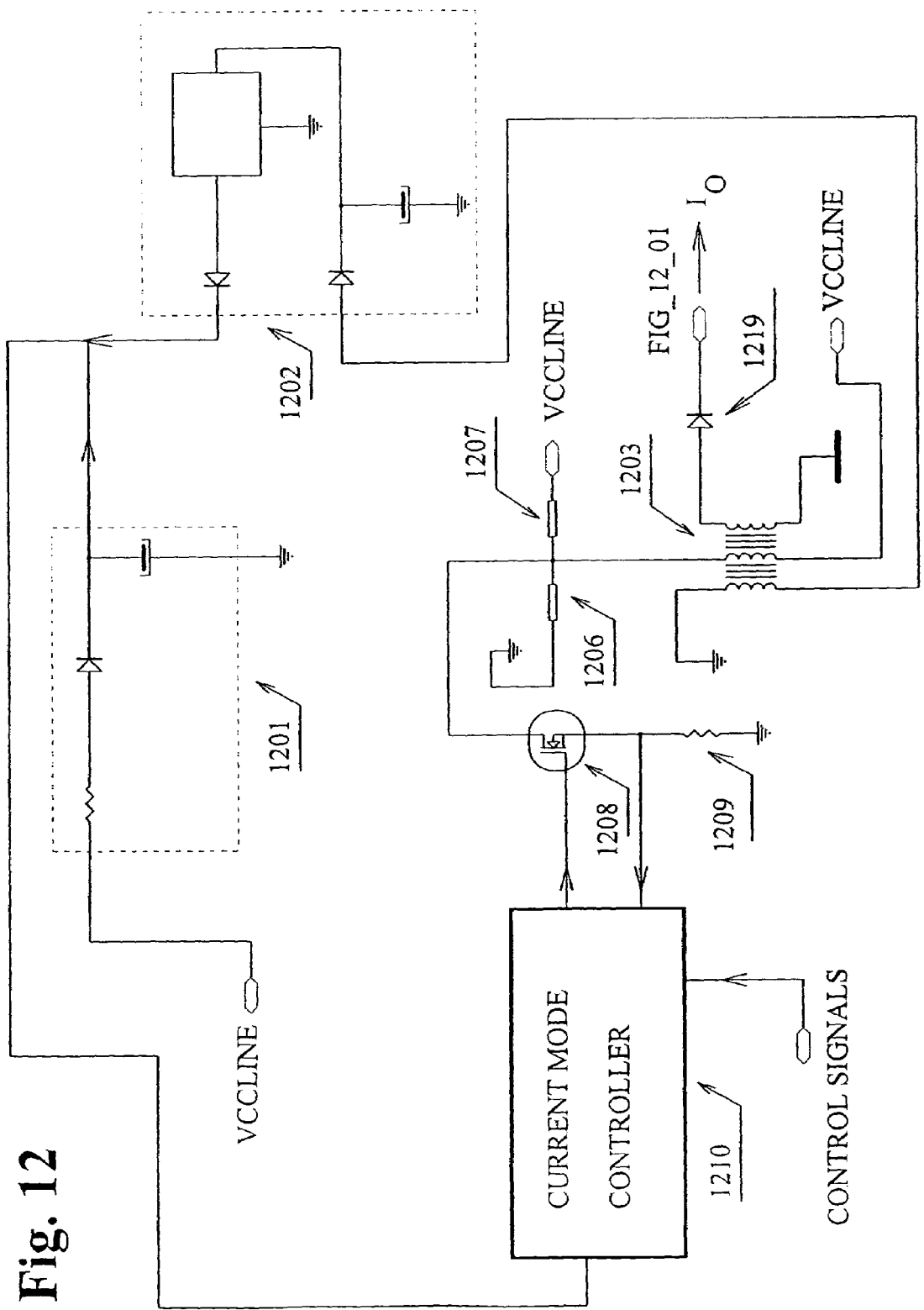
FIG. 12 is the block diagram of a system that shows an embodiment of the invention, in the form of a multiple cooling fan controller.
Figure 12:
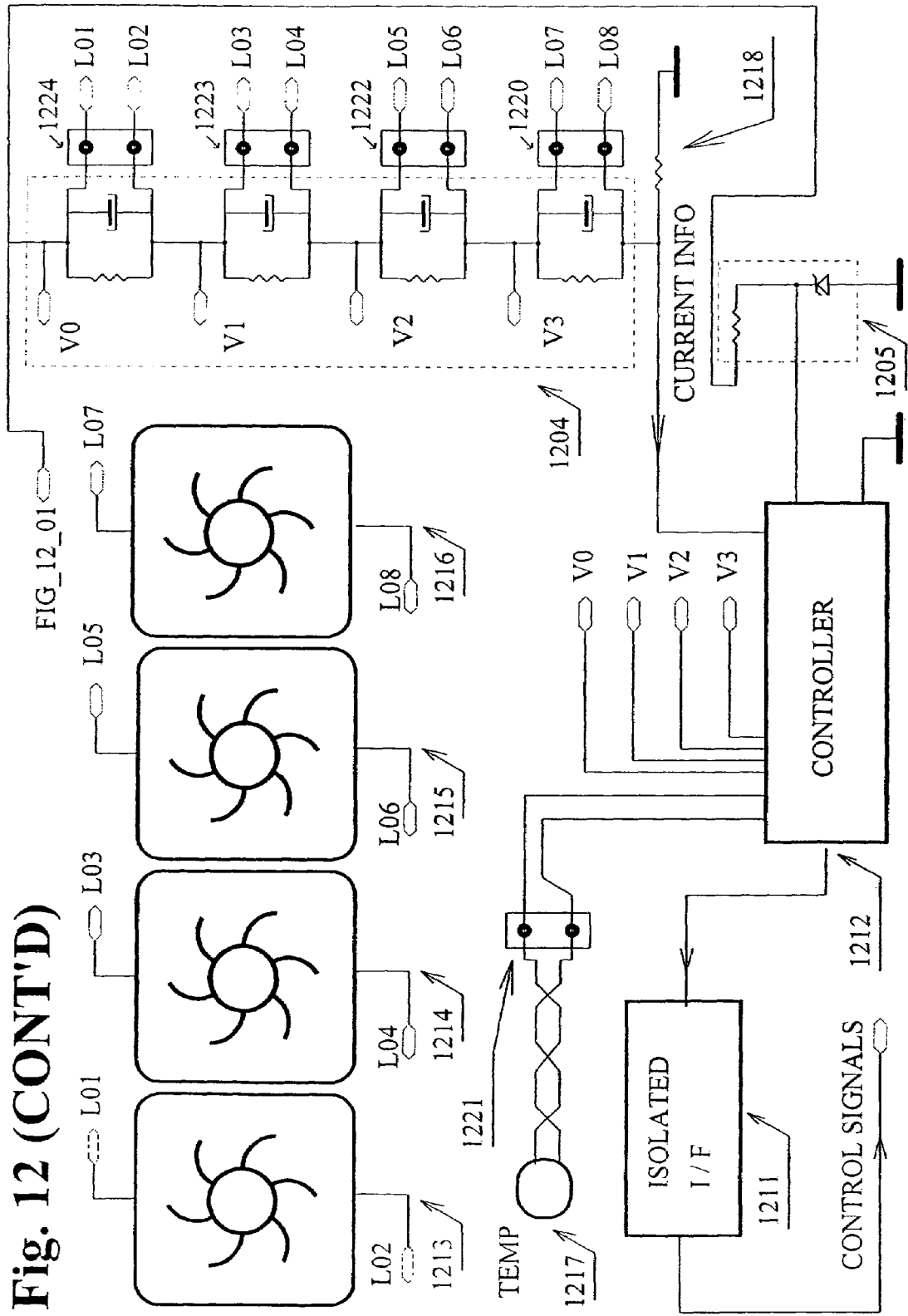

FIG. 12 shows another application of the embodiments of the invention, as disclosed in FIG. 7H. A transformer (1203) connected as in a flyback DC-DC converter is used to provide the inductance and the freewheeling diode. In the circuit of FIG. 12, up to four 12 volt cooling fans can be connected in series. This limit of four is to limit the maximum voltage at the output of the circuit. Each of the cooling fans is connected through a connector and can be replaced by a link when not connected.

A current mode controller (1210) is used to control the MOSFET (1208) while sensing the current with resistor (1205).

The transformer has an additional winding to provide power to the current mode controller through voltage regulator (1202). The circuit block (1201) provides the power for starting the current mode controller.

In the secondary side of the transformer, a microcontroller (1212) is powered from voltage regulator (1205). (1205) takes the power from the voltage resulting from the cooling fans when the set output current (Io) is circulating.

Resistor (1218) is used to sense the output current. The microcontroller (1212) can sense the voltages V0 to V3 in the circuit, corresponding to the voltage across each of the cooling fans, and the top of the stack. Each fan has a capacitor in parallel, as shown in the block (1204). Temperature can be sensed by a sensor (1217) and read by an analog input of the microcontroller. The microcontroller interacts with the current mode controller through an isolated interface, as in FIGS. 9H and 9I, to change the current (Io) and change the frequency of operation of the current mode controller randomly to facilitate EMI compliance.

An isolated mains AC zero crossing circuit may be added to the microcontroller, to allow for the current (Io) to be changed as a full wave rectified AC signal synchronous with the AC main, in order to improve the power factor of the circuit.

(1206) and (1207) are snubbers, which may be necessary in any flyback circuit, depending on the characteristics of the transformer used.

I7. Cooling Fan

Figure 13:
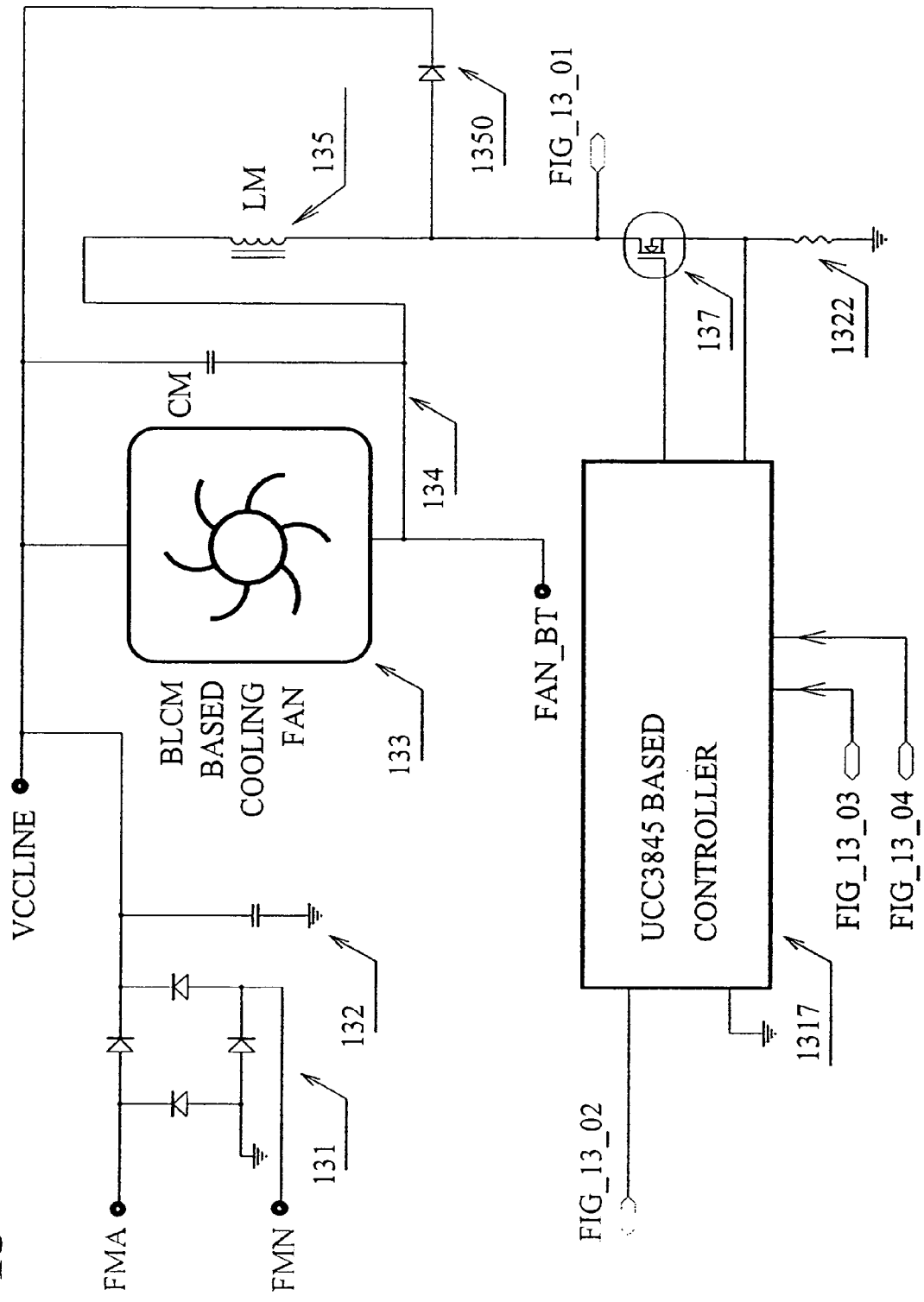
FIG. 13 is a block diagram of a system that shows another embodiment of the invention, in the form of a single cooling fan controller.
Figure 13:
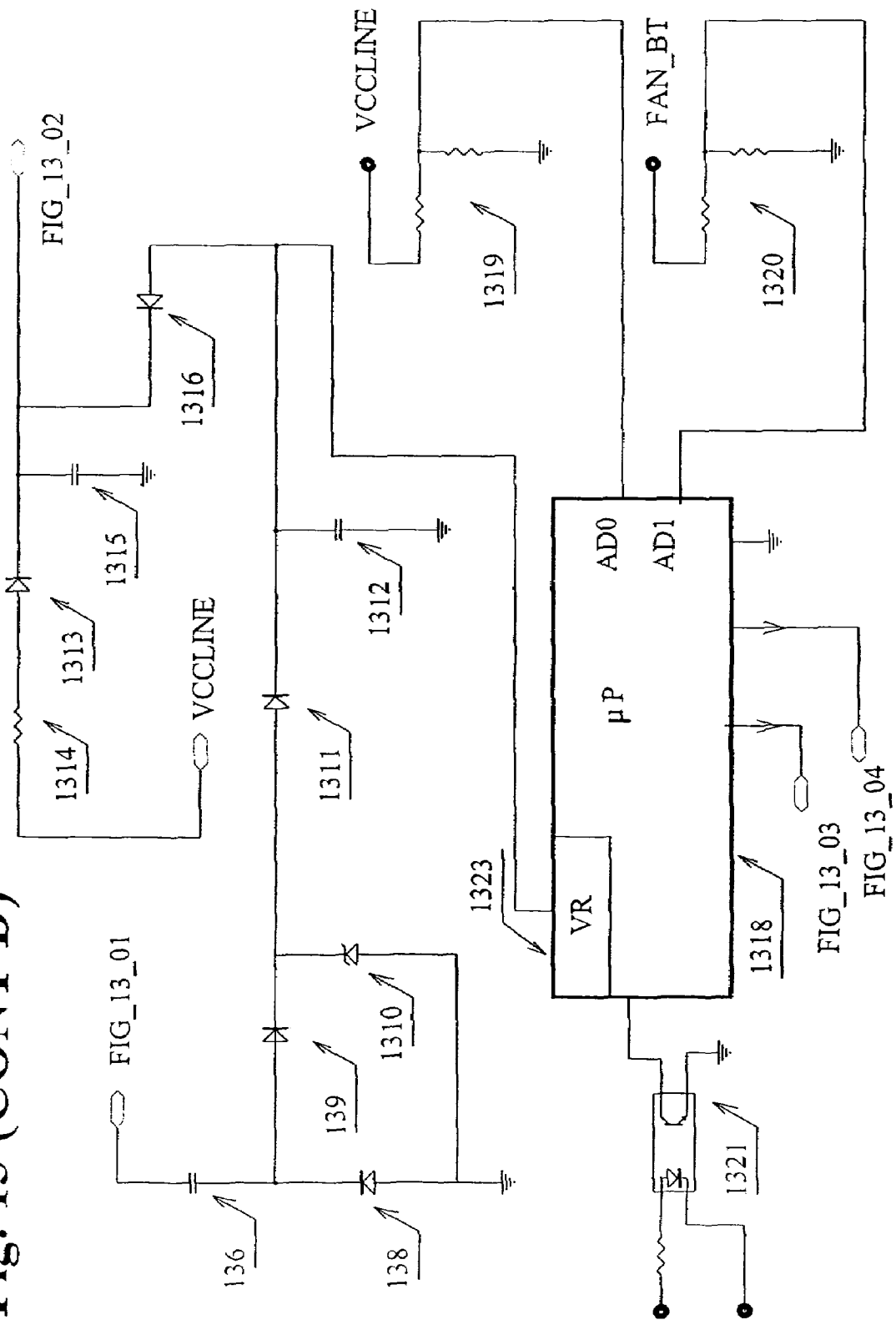

FIG. 13 shows a cooling fan based on a brushless DC motor running from the AC main with the system shown in FIG. 7A. A rectifier bridge (131) rectifies the AC main. The inductance ($L_M$), (135) corresponds with the inductance (7A05) of FIG. 7A, while the capacitor in parallel with the motor CM (134) corresponds with (7A03) of FIG. 7A. The anode of the freewheeling diode (1350) is connected from the drain of power MOSFET (137) and the cathode of the freewheeling diode is connected to VCCLINE.

The network consisting of (1314), (1313) and (1315) provides power to start a UCC3845 based current mode controller. Resistor (1322) senses the current through the switch (137). In operation, charge is "pumped" through the circuit consisting of capacitor (136), diodes (139) and (138) and Zener diode (1310). The voltage over the Zener diode (1310) is connected through diode (1311) to capacitor (1312).

A microcontroller (1318) powered from a low voltage drop regulator (1323) is used to perform the following tasks:

| | |
|---|---|
| Task_Fig13_1 | Measure the voltage across the fan to check its operation and to have an indication of its speed. |
| Task_Fig13_2 | Set the current through the cooling fan by Interfacing to the (1317). It can be modulated to correct power factor by measuring the voltage VCCLINE and making the current through the coil to be a full wave AC rectified waveform synchronous with the voltage in VCCLINE. If this is done, capacitor (132) is a small capacitor, allowing the voltage at the output of the rectifier to track the AC line full wave rectified voltage. |

-continued

| | |
|---|---|
| Task_Fig13_3 | Change the frequency of operation of (1317) following spread spectrum techniques to facilitate EMI regulatory compliance. (reference 8). |
| Task_Fig13_4 | Control the speed of the fan. |
| Task_Fig13_5 | Interface through optocoupler (1321) to a temperature to frequency converter, to set the speed of the fan in response to changes in ambient temperature. |

The circuit of (1317) can be taken from FIGS. 9H and 9I, with the power taken from capacitor (1312), through diode (1316) instead of the 12 volt regulator (9H2) of FIG. 9H.

I8. Bilevel Flow Generator with Power Factor Correction

Figure 14:
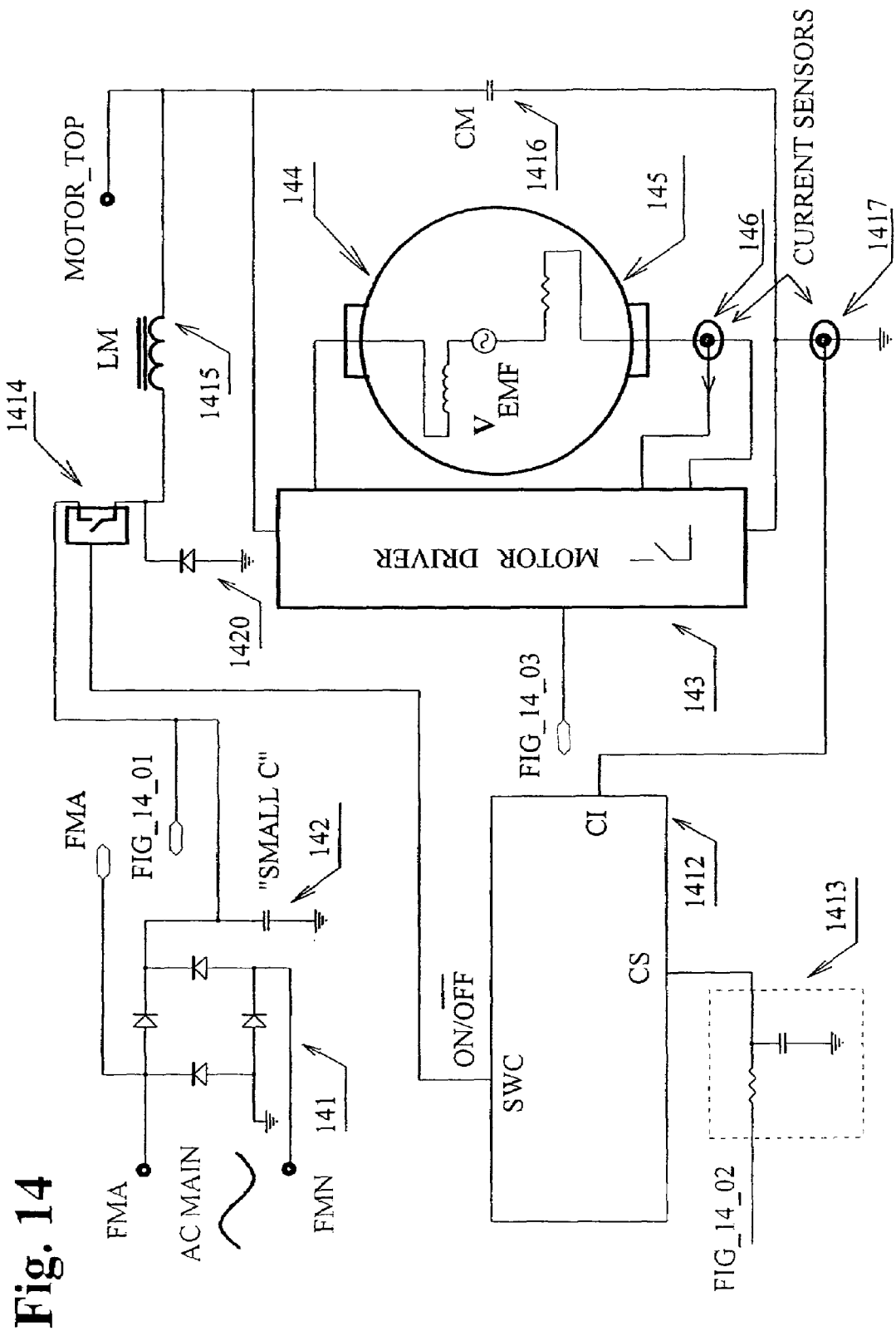
FIG. 14 is a block diagram of another embodiment of the invention.
Figure 14:
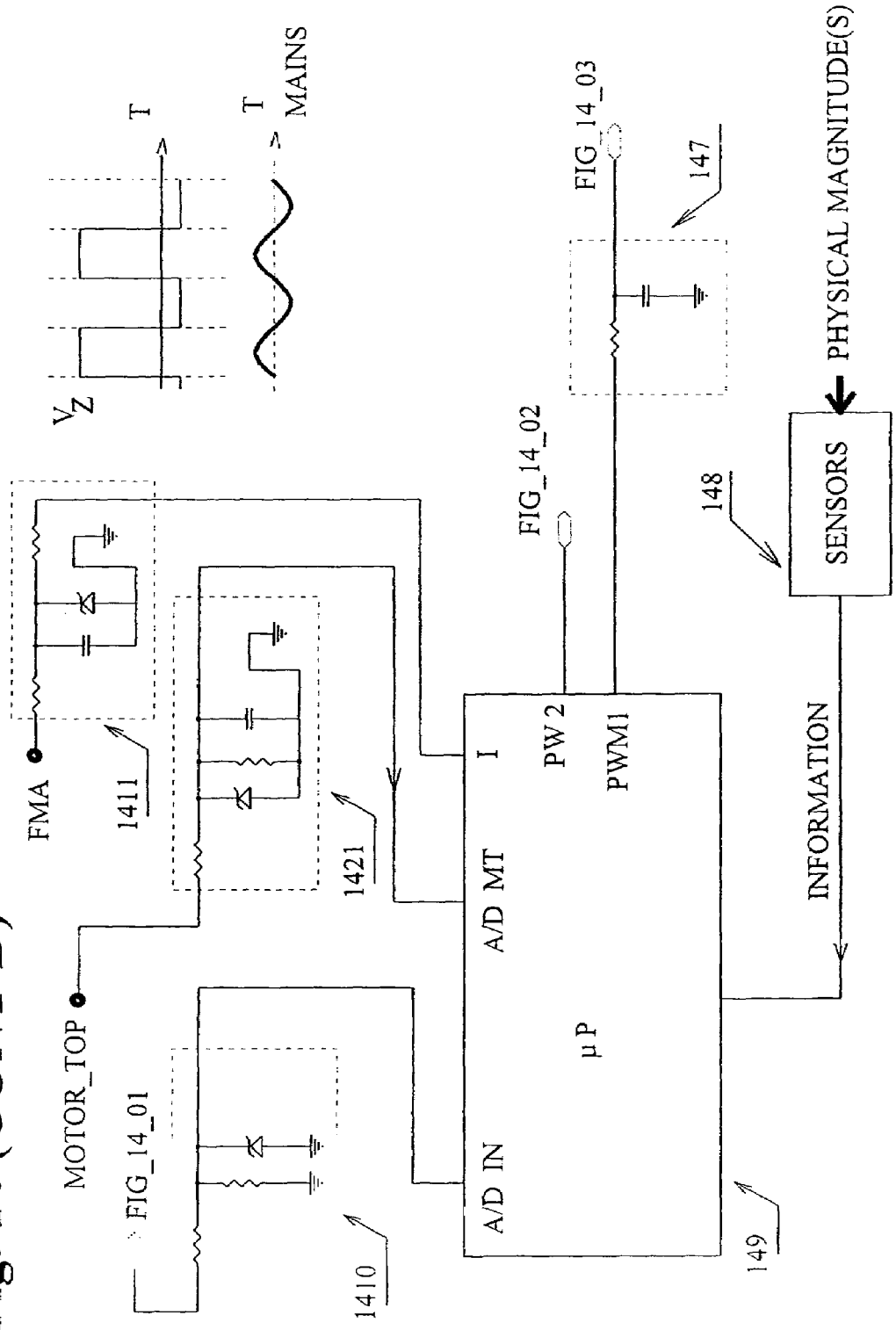

FIG. 14 shows an application of an embodiment of the invention disclosed in FIG. 7I.

The AC main voltage is passed through a circuit similar to the circuit shown in FIG. 9A. The filtered AC mains voltage is rectified by bridge (141). Capacitor (142) is small enough for the voltage across it to track the full wave rectified AC main.

Switch (1414) is a transformer driven power MOSFET, similar to the switch of FIG. 11. Inductance (1415) has a function similar to (715), and a freewheeling diode (1420) is connected as (714) in FIG. 7I.

The motor driver (143) uses the pulse width modulation of the electronic commutator to drive motor (144) in constant current mode, using sensor (146).

Controller (1412) controls the current through the inductance (1415), that is, approximately the current through the sensor (1417).

The current through the motor and the current through the inductance are set by the main controller (149).

Sensors (148) translate physical variables into information that (149) can read.

The system in FIG. 14 can operate in several modes as follows:

The feedback loop controlling the average current through the inductance (1414) has to use the voltage over the motor, to calculate the actual current drawn by the motor itself. This is done by the calculation:

Current_in_or_out_of_CM=CM*Diff_in_voltage/ Time_between_sampling and

I_motor=I_inductance−Current_in_or_out_of_CM where:

| | |
|---|---|
| Diff_in_voltage: | The change in capacitor voltage since the last sample. |
| Current_in_or_out_of_CM: | The net current through the terminal of the capacitor. |
| Time_between_sampling: | The time between the samples made to the voltage over the capacitor. |
| CM: | The value of the capacitor in parallel with the motor. |
| I_motor: | Average current through the motor during sample interval. |
| I_inductance: | Current through the inductance as controlled. It is measured in the sensor (1417). |

Current state of the art feedback loops, to control the voltage of output of a power supply, use an error magnitude that would be the difference between the voltage over the capacitor and the desired voltage. If the difference is large enough, the output of the control loop will saturate.

In this new control scheme, even large voltage differences between the capacitor instantaneous voltage and its average voltage do not necessarily cause a similar response; the response depends on the current requirements.

Table 2 lists pseudo-code following the syntax of the C language detailing the algorithm.

| | |
|---|---|
| F14M_1. | If the microcontroller measures the voltage in the point connecting $C_M$ and $L_M$, and use the measurement as feedback in a control loop that changes the current through the coil (1415) to obtain the desired voltage over the motor, then the system operates as the current state of the art. |
| F14M_2. | If the system operates as described above, but the voltage is changed to assist the action of the motor driver (143), the system is behaving in an innovative way. For instance, the voltage may be raised immediately before the motor needs acceleration. Or the voltage may change to make the action of the pulse width modulation more effective. |
| F14M_3. | The system can work as disclosed in FIG. 7I. The average current that the motor controller (143) uses is allowed to pass through inductance (1415). Charge is accumulated in $C_M$, to be used when peak current is needed. |
| F14M_4. | This mode is similar to the previous mode (3), but the current through inductance (1415), ($L_M$) is shaped as a full wave rectified sinusoidal waveform, synchronous with the waveform in the rectified AC mains, to improve power factor correction. This can be achieved either by multiplying the current output by the value read in the analog to digital converter input through network (1410) or with the method described in with the description of FIG. 7I. The network (1411) connects the microcontroller (149) to the filtered AC mains, for zero crossing detection. The result is shown immediately below (1411) in FIG. 14. |

Current sensor (146) does not need to be used, and the pulse width modulation of the microcontroller (149) can operate directly over the electronic commutator of the BLDCM (144), in response to some physical quantity that is controlled. Still, similar results can be achieved.

If the system also corrects for power factor, the sampling interval is one cycle of the AC main. The sampling interval can be made half the cycle if the extra harmonics introduced by occasionally having different current in both half cycles of the AC mains are acceptable.

TABLE 2

```
// algorithm to determine the value to set the current through the inductance (LM)
// according to the charge stored in the capacitor in parallel with the motor (CM)
VC = reading_capacitor_voltage_from_AD_converter() ;
if ( VC > VCmax ) { I = 0 ; } // check that the voltage is not too high
else
{
    If ( VC = VCmin ) { I = IMAX ; } // check that the voltage is not too low
     else
    {
    V_Diff = VC- Old_VC ; // calculate the voltage difference between samples
    // the two lines bellow are necessary if the average current through the
    // motor is unknown
    I_cap = C * V_Diff / Time_between_samples ;   // calculate the net current
                                                  // into the capacitor
    I_motor = I_inductance – Icap ; // calculate the current though the motor
    If ( VC > V_target )
        {
        // here if there is no need for accumulating additional charge
        I = I_motor ;
        }
    else
        {   // here if the capacitor voltage is less than or equal to the target voltage
        // calculate the current needed to replenish the capacitor
        I_to_charge_C = ( V_target – VC ) * C / Time_between_samples ;
        // add the current needed to replenish to the current needed by the motor
        I = I_motor + I_to_charge_C ;
        }
    }
}
Old_VC= VC ; // save the current value of the capacitor voltage
Return ( I ) ; // return the calculated current
// end of the function
```

Once the average current through the inductance is calculated, it remains constant for the sampling time. If the system is power factor controlled, the average current through the inductance is used to calculate the peak of the full wave rectified sinusoidal current that is applied through the inductance, synchronically with the AC mains as:

$$I(t) = I\_average\ through\_inductance * \pi/2 * |\sin((2*\pi*F)*t)|$$

where:

I(t) is the set current to the current mode controller.
I_average through_inductance is the current requirement keeping the motor running and the capacitor with the target charge.
F is the frequency of the AC main.
t is the time.

The operating frequency of the current mode controller is changed using the algorithm shown in Table 3.

TABLE 3

Algorithm for changing the frequency randomly to improve EMI compliance

```
// Table of frequency data
FT[0]= Data frequency 0;
FT[1]= Data frequency 1;
FT[2]= Data frequency 2;
..............
FT[N–1]= Data frequency N–1 ;
Int Get_new_frequency(Old_frequency)
{
new_number:
R = generate_random_number_between_N–1_and_0 ( );
If ( Old_frequency = 0 ) and ( R=N–1 ) { goto new_number ; }
If ( Old_frequency = N–1 ) and ( R=0 ) { goto new_number ; }
If ( R = Old_frequency ) { goto new_number ; }
If ( R = Old_frequency – 1 ) or ( R= Old_frequency +1 )
 { goto new_number ; }
```

TABLE 3-continued

Algorithm for changing the frequency randomly to improve EMI compliance

```
Return ( R ) ;
}
// note the hardware is programmed with data from the table
using the number as index.
```

Figure 16:
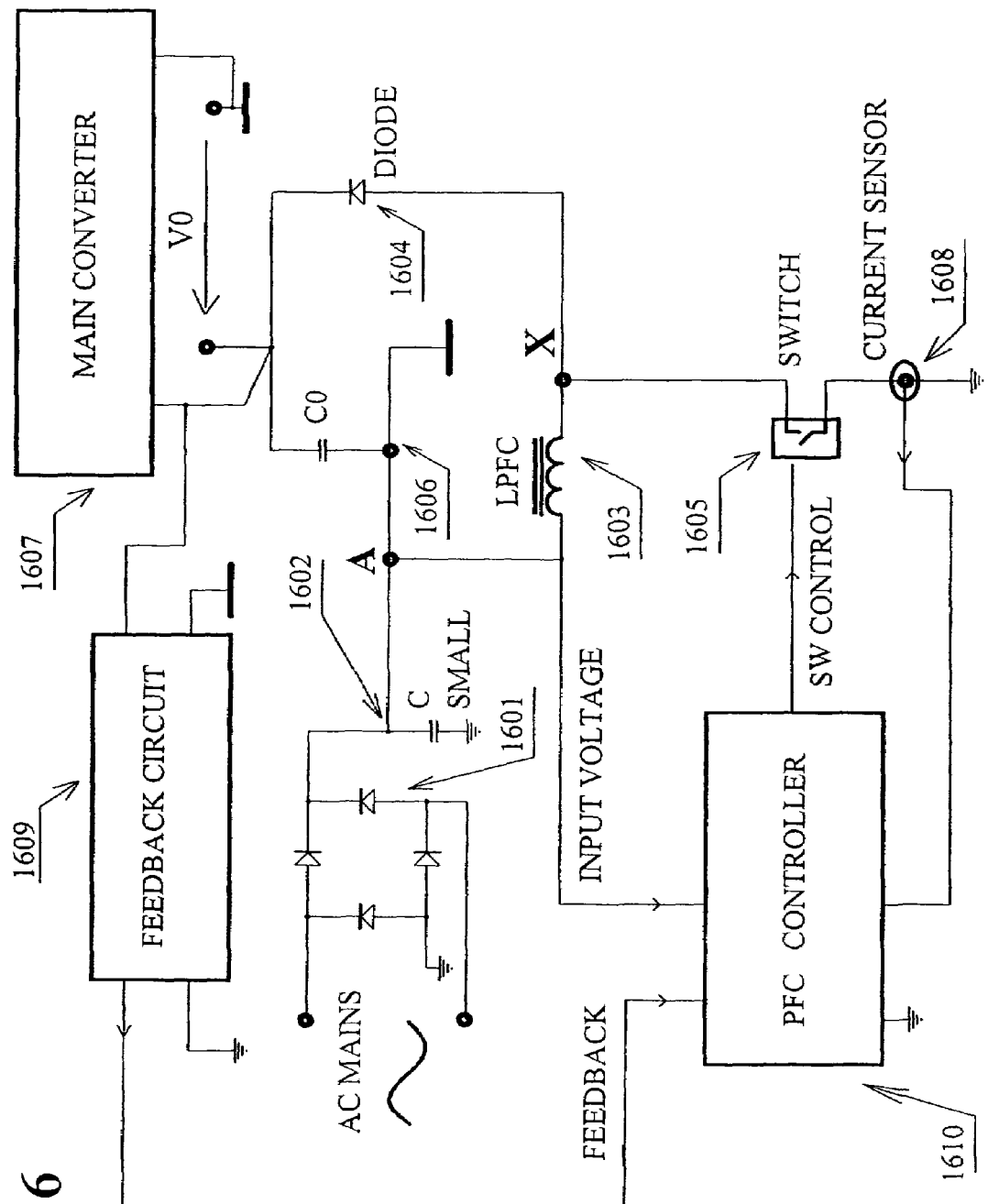
FIG. 16 is a block diagram of a topology for a power factor corrected switch-mode AC-to-DC converter.

FIG. 16—A Topology for an Active Power Factor Correcting Circuit

FIG. 16 shows a topology for an active power factor correcting circuit. Although related to other switch-mode power supply topologies, the circuit is unique in the fact that the output is not referred to the input ground, but rather to the input voltage.

The circuit could be described as "a non-isolated flyback switcher with the output referred to the input", or "a low side switched, buck-boost converter with the output referred to the input". It is also related to the boost converter. The buck-boost converter is the switch-mode power supply topology from which the circuit of FIG. 7L is derived. However, unlike the boost converter, the output voltage can be set higher or lower than the input voltage (the rectified AC mains).

In FIG. 16, a diode bridge (1601) rectifies the AC mains into a full wave rectified AC waveform. The value of capacitor $C_{SMALL}$ (1602) has to be chosen so the voltage in the point "A" of the circuit (the positive output of the diode bridge rectifier (1601)) tracks the voltage produced by the rectifier. The output of the circuit of FIG. 16 is the port from "A" to $V_O$, consequently the point "A" has been made the input common terminal for the main converter (1607) in FIG. 16. The main converter (1607) is what is normally call the "load" of the circuit of FIG. 16.

Capacitor Co (1606) is a storage capacitor. It is in parallel with the output. The switch (1605) in FIG. 16 is typically an N-Channel power MOSFET. When the switch is closed, the inductive element $L_{PFC}$ (1603) is connected across the input voltage and current flows into it, growing linearly during the period of time the switch is conducting ($T_{ON}$). At the frequency of commutation normally used in this type of circuits, the full wave rectified AC mains remains practically constant for the period of commutation. The controller (1610) in FIG. 16 uses the information provided by the current sensor (1608) to decide when to open the switch (1605). When the switch (1605) opens, the diode (1604) takes the current circulating from the inductive element (1603). The current through the inductive element cannot change instantaneously and starts flowing into both the load and the storage capacitor Co (1606) connected in parallel with the load. With the switch (1605) open and the diode (1604) conducting, the inductive element (1603) is just in parallel with the series combination of the diode (1604) itself, in series with the parallel combination of Co (1606) and the load (main converter 1607). If the switch is kept open, current keeps flowing, charging capacitor Co (the portion of the current not taken by the load) until the current though the inductive element reaches zero. At this moment, the diode (1604) becomes reverse-biased by the voltage across the storage capacitor Co.

If the switch closes before the current reaches zero, then the circuit is said to operate in the continuous current mode. The process starts again in the next cycle. By the way the Power Factor Controller (PFC) (1610) controls the maximum value of the current through the inductive element (1603), and the conduction time of the switch (1605), the filtered waveform of the train of triangular (or trapezoidal for the case of continuous current mode) current pulses taken from capacitor (1602) is filtered by the action of the capacitor into a normally good approximation of full wave rectified AC mains current waveform synchronous with the AC mains, which yields close to unity power factor when "seen" from the AC mains side. The feedback circuit (1609) is needed to provide the controller (1610) with the information of the voltage across the storage capacitor Co (1606).

This topology can be seen as related to the system of FIG. 7J, which has been analyzed in FIG. 15.

The analysis of the system in steady state is similar to the analysis made in FIG. 15. The "load" of the system is the block (1607). Any type of DC-to-DC or DC-to-AC converter could be used in block (1607). Although FIG. 16 shows a converter, it will be obvious for those skilled in the art that any load suitable to be connected to a power supply could be used in place of block (1607).

Consequently with the results of FIG. 15, it can be said that from a dynamic point of view, the circuit can be designed using the well-known equations of the buck-boost converter (also known as positive to negative converter). However, it must be kept in mind that the output refers to the input voltage and not to ground, that the polarity of the output is not negative, and that the switch must be rated as the sum of the input voltage plus the output voltage.

The advantages of this topology are:
Low side switch (unlike the buck-boost or positive to negative converter and the buck converter topology).
No in-rush current problem (unlike the boost converter).
High power factor correction (unlike the buck converter topology).
Freedom to choose the output voltage. Normally it will be lower than the output voltage to be able to simplify the converters following the circuit. However the output voltage could be made variable.

In the classical non-power-factor-corrected topology for an off the mains switch-mode power supply implemented as a buck converter followed by a DC-DC converter operating from the lower voltage created by the buck converter, it would be an advantage to replace the buck converter by the circuit of FIG. 16 to give power factor correction. However, as it would be clear for a designer skilled in the art, it must be noted that for optimum performance the DC-DC converter following the circuit of FIG. 16 must be itself controlled with its own feedback loop from the output of the power supply.

The advantages of lowering the voltage obtained from the power factor controller are:
P type MOSFETs are rarely manufactured for drain to source breakdown voltages over 200 volts. P channel MOSFETs permit more flexible designs, with simple drivers.
MOSFETs with lower drain to source breakdown voltages may be faster.
MOSFETs with lower drain to source breakdown voltages have lower ON resistance.
Logic level MOSFETs are rarely manufactured for drain to source breakdown voltages over 60 volts.
Working with lower voltages makes design and prototyping easier.
The voltages of many electronic circuits are very low. Hence, it is an advantage to drive a high performance DC-DC converter from a lower voltage.

For switched mode power supplies (DC-to-DC converter following the circuit of FIG. 16) or other devices like fluorescent tubes drivers (DC-to-AC converter following the circuit of FIG. 16) the main converter following the power factor corrector stage is isolated. Hence the fact that the output of the circuit of FIG. 16 is not referred to ground is a problem only from the point of view of noise and for the complexity of the feedback circuit. Both problems can be overcome.

The disadvantage of not having the output referred to ground can be easily overcome by decoupling carefully with capacitors with good high frequency characteristics to form a ground plane at the frequency of the commutation of the converter.

The feedback from the output of the controller has to be done by either an isolated link or using a differential amplifier. The most inexpensive technique would typically be to use an optocoupler. However, all the techniques currently used for providing feedback though an isolating barrier can be used. Alternatively, a differential amplifier can be used taking the input from the two output terminals of the circuit of FIG. 16. This eliminates the input voltage from the mains. This voltage appears as common mode voltage between the output terminals of the circuit.

A topology based on a buck-boost converter may use a simple voltage divider for the feedback circuit, and the output voltage can be lower than the input voltage. However, the requirement of a high side drive for the switch far out-weighs the advantage of the simpler feedback circuit.

Any of the current state of the art techniques or algorithms for power factor correction can be used in the controller (1610) (see Ref. 10, page 222 or Ref. 25, chapter 1):
Fix-on time, Discontinuous Current Control (DCC), with or without fixed output voltage (for the boost topology is called a "boost follower").
Critical Conduction Mode (CRM) also known as Transitional Mode Controllers (Ref. 25, page 8).
Continuous Conduction Mode (CCM) Control (see Refs. 20, 21 and 25).

In continuous current control, the control loop can use as feedback several alternatives, for instance average current control or peak current control.

From a practical implementation point of view, most if not all the current integrated circuits controllers designed for boost-converter-based power-factor-correction circuits can be used with little modification for the block (1610) of FIG. 16.

If the power factor correction controller is based on a microcomputer with analog to digital converter the technique disclosed in the description of the controller of FIGS. 7I and 9 can be used. Alternatively, if the factor correction controller is based on a microcomputer without analog to digital converter the algorithm disclosed in TABLE 1 can be used.

If a classical controller with fix oscillation frequency, set by external components, is used along with a microcomputer, the technique shown in FIGS. 9H and 9I and FIG. 17F in combination with the algorithm of TABLE 3 can be used to change randomly the frequency of oscillation of the controller, improving on the EMI characteristics of the system.

FIG. 17—Application of Topology for Power Factor Corrected AC-to-DC Converter of FIG. 16

FIG. 17 shows a practical example of one possible implementation of the topology shown in FIG. 16. The NCP1650 power factor controller integrated circuit, from On Semiconductors (see Ref. 26), has been chosen for the example. The NCP1651 (see Ref. 27), from the same manufacturer, is a more suitable device since it does not require the external start-up circuitry and the feedback input is specifically designed to work with the optically coupled circuit used in this type of application. However, the NCP1650 has been selected instead of the NCP1651 to show that most if not all power factor correction integrated circuits can be adapted to work with the topology of FIG. 16.

As with all the integrated circuits, its application must comply with the design parameters defined by the manufacturer. The example of FIG. 17 is a variation of the following application note from On semiconductor: AND8106/D, 100 Watt, Universal Input, PFC Converter. It can be found on page 67 of Reference 25. The differences with the original application note are:

The topology of the circuit conforms to the topology of FIG. 16. The original design in the application note is for a boost converter. In the design of FIG. 17, the output voltage can be lower than the peak voltage of the rectified AC mains or higher. In contrast, the boost converter of the application note can produce only a voltage higher than the rectified AC mains peak voltage.

The design of FIG. 17 does not need in-rush current protection. In contrast, a boost converter must charge the storage capacitor to the peak of the rectified AC mains on power up and typically needs in-rush current protection.

The output of the power factor controller in FIG. 16 does not share the same common terminal with the rectified AC mains or the integrated circuit NCP1650. In FIG. 17F there is a reference list of the four different common terminals used in the circuit of FIG. 17.

The start-up circuit (FIG. 17B) has been modified because the output voltage is not referred to the ground of the integrated circuit.

The feedback circuit (FIG. 17C) has been modified because the output voltage is not referred to the ground of the integrated circuit.

The circuit in FIG. 17F is optional. If the circuit is added, a microcontroller can produce pseudo-random variations in the frequency of the oscillator of the NCP1650 integrated circuit. This is another example of the idea disclosed in FIG. 91.

A generic DC-DC converter is added in FIG. 17E. This is an example of the block (1607) in FIG. 16.

In FIG. 17A, a diode bridge (1701) rectifies the AC mains into a full wave rectified AC waveform. The value of capacitor C1 (1702) has been chosen so the voltage in the point $V_1$ of the circuit (the positive output of the diode bridge rectifier (1701)) tracks the voltage produced by the rectifier. The circuit also includes capacitor (1711) that has been placed in another side of the picture to show the fact that capacitor (1602) in FIG. 16 can be made of a number of capacitors in parallel. The position of the capacitors has to be considered with attention to EMI compatibility of the final product. All the capacitors in parallel with C1 (1702) (or (1602) in FIG. 16) must have good high frequency characteristics. It must be noted that the output of the circuit of FIG. 17A is the port from $V_I$ to $V_{OP}$. Consequently the point $V_I$ has been made the common for the DC-DC converter circuit in FIG. 17E.

Capacitor C3 (1707) is the storage capacitor of the power factor controller. It is in parallel with the output. The MOSFET MF1 (1709) in FIG. 17A is the switch (1605) of FIG. 16. When the MOSFET is conducting, the inductance L1 (1703) is connected across the input voltage and current flows into it, growing linearly during the period of time the MOSFET is conducting ($T_{ON}$). At the frequency of commutation of the circuit, the full wave rectified AC mains remains practically constant for the period of commutation. The IC controller in FIG. 17, the NCP1650 of FIG. 17D, is not referenced to the negative terminal of the diode bridge. Instead it is referred to the mid-point between the MOSFET (1709) and the current sensing resistor R2 (1708) in FIG. 17A. The chip uses the negative voltage with respect to the common node of the chip's circuit (pin 15 in FIG. 17D) as current information to decide when to turn off the MOSFET MF1 (1709).

When the MOSFET (1709) is off, diode D2 (1706) takes the current circulating from the inductance (1703). The current through the inductance cannot change instantaneously and starts flowing into both the load and the storage capacitor C3 (1707) connected in parallel with the load, with the MOSFET MF1 non-conducting and the diode D2 conducting. The inductance is just in parallel with the series combination of the diode D2, itself in series with the parallel combination of the capacitor C3 (1707) and the load (converter of FIG. 17E). If the MOSFET is kept non-conducting, current keeps flowing, charging capacitor C3 (the portion not taken by the load) until it reaches zero and the diode D2 becomes reverse-biased from the voltage across the storage capacitor C3.

If the MOSFET conducts before the current reaches zero, then the circuit is said to operate in the continuous current mode. The process starts again in the next cycle. By the way the integrated circuit NCP1650 (1733) controls the maximum value of the current through the inductance, and the conduction time of the MOSFET, the filtered waveform of the train of triangular current pulses (or trapezoidal, in continuous current mode) taken from capacitor C1 (1702) is filtered by the action of the capacitor into a normally good approximation of full wave rectified AC mains current waveform synchronous with the AC mains, which yields close to unity power factor when "seen" from the AC mains side.

The inductance L1 has an additional winding that provides power for the chip itself. The inductance L1 works as the primary of a transformer. The diode D1 (1704) and the capacitor C2 (1705) provide rectification and filtering of the wave in the secondary side of the arrangement.

FIG. 17B is the start-up sub-circuit. The circuit is similar to the application note referenced above. The changes reflect the fact that the output cannot bias the MOSFET to turn it off. Hence capacitors (1719) and (1720) have been added. Also added are resistor (1715) discharge capacitors (1719) and (1720) when the system is not powered. MOSFET MF2 (1717) is made to conduct because of the voltage difference between $V_{BIAS}$ (that is low, at the start-up) and the voltage over the zener diode Z1 (1718). As $V_{BIAS}$ approaches the working voltage the difference with the zener value is smaller and the MOSFET (1717) stops conducting. As the input of the start-up circuit is the full wave rectified AC mains (and not the output storage capacitor as in the original application note), without the capacitors (1719) and (1720) the voltage over the zener diode is pulsating (when the input voltage of the full wave rectified AC mains is lower than the zener value) and the MOSFET is periodically turned on. Hence without the capacitors (1719) and (1720), the start-up circuit overheats.

FIG. 17C is the feedback path. Those skilled in the art of switched mode power supplies will recognize the standard optically coupled feedback network formed with IC2 (1730), typically a TL431 programmable zener diode IC. Resistors network (1731) formed by R15, RV1 and R14 sets the value of the output voltage. When the output voltage grows, the voltage drop across resistor R13 (1732) also grows. If this happens, the current through the diode of the optocoupler IC3 (1729) grows too. The output transistor of the optocoupler conducts more and the voltage over resistor R11 (1728) grows. This voltage is directly fed to the input of the error comparator of the NCP1650 control loop (pin 6 of (1733)). The network formed by resistors R8 (1725), R9 (1726) and diode (1727) has been added because the feedback network is not taken from a ground referenced storage capacitor as in the original application not boost converter. The network formed by resistor R8 (1725), R9 (1726) and diode (1727) guarantees that there is a minimum voltage in the input of the error comparator of the NCP1650 control loop (pin 6 of (1733)) when the reference voltage of the device is enabled after the power-up sequence finishes. The network (1724) is for compensating the feedback loop. The values depend on the type of load and the specifications of the converter.

FIG. 17D is the controller IC itself, the NCP1650 (1733). All the components in the circuit are mandatory as per the manufacturer specifications. Refer to the data sheet of the device (Ref. 26) and its application notes (page 67 of Ref. 25).

FIG. 17D shows an example, in block diagram of the block (1607) in FIG. 16. A classical push-pull converter has been chosen as an example only. Any type of DC-DC or DC-to-AC converter could be used in block (1607). Detailed operation and design methodologies of controller (17E02), MOSFETs (17E03) and (17E04), all components coupled with transformer (17E05), the output filtering network (7E06 to 17E10) and the transformer (17E05) itself, can be found in the following references:

Reference 3, page 220.
Reference 7, pages 116 and 153.
Reference 9, page 37.
Reference 10, pages 2.147 to 2.151 and 2.153 to 2.159.
Reference 11, pages 34-38.

The feedback network for the converter in FIG. 17E is based on the same components and operating principle as the feedback network used in FIG. 17C. However, components R04, C03 and C02 (network 17E16) have been added for completeness. The network (17E16) is used for dynamic compensation of the feedback loop. In most of the circuits of this type, compensation is added around IC5 (17E13) (unlike however the NCP1650 that is designed so the compensation is added to a pin 7 of the chip (1724) in FIG. 17C). The graphic in FIG. 17E shows the full wave rectified AC mains in the common point of the circuit in the primary side of transformer (17E05). The reference point of the secondary side can be chosen independently of any other point in the circuit (provide that the isolation given by the specifications of the transformer is adequate). In FIG. 17E, earth has been chosen for the common point (or "ground terminal") of the output of converter (1607).

FIG. 17F shows a list of the four different common terminals symbols used in the circuit. FIG. 17F also shows an example of how the oscillator of NCP1650 can be frequency modulated by an external circuit. A microcontroller producing a pulse width modulated waveform in the diode terminals of the optocoupler IC06 (17F08) can produce pseudo-random variations in the frequency of the oscillator of the NCP1650 integrated circuit. This is another example of the idea disclosed in FIG. 91.

When current flows though the LED of the optocoupler IC06 (17F08) the output transistor conducts and the pulse width modulated waveform is reproduced over the resistor R105 (17F10). Resistor R104 (17F09) is used to drop the voltage of the VREF supply by forming a resistive divider with resistor R105 (17F10). Resistor R103 (17F07) and capacitor C100 (17F06) filter the pulse width modulated signal and its low frequency content is available in the non-inverting input of the operational amplifier IC5 (17F04). The operational amplifier IC5 (17F04), its feedback network (R101 (17F03), R100 (17F01)) and the P channel MOSFET MF5 (17F02) form a regulated current source in parallel with the current source of 200 micro-amperes provided by pin 14 of the CP1650 IC, to charge the timing capacitor CT (1738). Resistor R102 (17F05) is included for stability. If R101 is made equal to several hundred times the value of R100, the current out of the drain terminal of the P channel MOSFET MF5 (17F02) will be the voltage difference between $V_{REF}$ and the voltage at the non-inverting input of the op-amp IC5 (17F04) divided by the value of resistance R100 (17F01). In this way, the additional current charging the timing capacitor CT (1738) will be varied with the low frequency content of the pulse width modulated signal at the input of the optocoupler.

While only a limited number of embodiments have been disclosed, numerous modifications and substitutions can be made without departing from the scope and spirit of the invention.

REFERENCES

1. Brush-less Permanent Magnet Motor Design
   Duane C. Hanselman
   McGraw Hill Inc 1994
   ISBN 0-07-026025-7
2. A 250 Watt Current—Controlled SMPS with Synchronous Rectification
   By R. Pearce and D. Grant
   Application note 960A. International Rectifier
   Page 137 of
   HEXFET Designer's Manual Volume I,
   HDM-1 first printing, International rectifier 1993
3. Power Electronics
   Converters, Applications, and Design
   N. Mohan, T. M. Undeland and W. P. Robbins
   John Wiley & Sons 1989
   ISBN 0-471-61342-8
4. Motorola Application Note AN-876
   Using Power MOSFETs in Stepping Motor Control Published in the proceedings of Powercon 9, 1982
5. UC1637/2637/3637 Switched Mode Controller for DC Motor Drive data sheet
  Unitrode Integrated Circuits Corp. (Texas Instruments Incorporated)
6. UC1637/2637/3637 Switched Mode Controller for DC Motor Drive
  Application note U-102
  Unitrode Integrated Circuits Corp. (Texas Instruments Incorporated)
7. Design of Solid States Power Supplies
  Third Edition
  Hnatek, E. R.
  Van Nostrand Reinhold Co. 1989
  ISBN 0-442-20768-9
8. EMC for Product Designers
  Meeting the European EMC Directive
  Tim Williams
  Butterworth Heinemann 1992
  ISBN 0-7506-1264-9
9. Switching Power Supply Design
  Abraham I. Pressman
  McGraw-Hill, Inc 1991
  ISBN 0-07-050806-2
10. Switch Mode Power Supply Handbook
  Keith Billings
  McGraw-Hill, Inc 1989
  ISBN 0-07-005330-8
11. Practical Switching Power Supply Design
  Marty Brown
  Academic Press Inc 1990
  ISBN 0-12-137030-5
12. Power Supply Cookbook (second edition)
  Marty Brown
  Butterworth Heinemann 2001
  ISBN 0-7506-7329-X
13. An Economic Motor Drive With Very Few Components
  SGS-Thomson Microelectronics Application Note
  AN282/0589
  Page 305, Designer's Guide to Power Products Application Manual
  $2^{nd}$ Edition, June 1992
  SGS-Thomson Microelectronics
14. Designing With The L296 Monolithic Power Switching Regulator
  Page 29/42, FIG. 36 (use as a motor speed controller)
  SGS-Thomson Microelectronics Application Note
  AN244/1288
  Page 463 of Designer's Guide to Power Products Application Manual
  SGS-Thomson Microelectronics $2^{nd}$ Edition, June 1992
15. How to Drive DC Motors With Smart Power IC's
  By Herbert Sax
  SGS-Thomson Microelectronics Application Note
  AN 380/0591
  Page 215 of Designer's Guide to Power Products Application Manual
  SGS-Thomson Microelectronics $2^{nd}$ Edition, June 1992
16. Load Current Sensing in Switch-mode Bridge Motor Driving Circuits
  By Herbert Sax
  SGS-Thomson Microelectronics Application Note
  AN 452/0392
  Page 231 of Designer's Guide to Power Products Application Manual
  SGS-Thomson Microelectronics $2^{nd}$ Edition, June 1992
17. Driving DC Motors
  By Maiocchi
  SGS-Thomson Microelectronics Application Note
  AN 281/0189
  Page 255 of Designer's Guide to Power Products Application Manual SGS-Thomson Microelectronics $2^{nd}$ Edition, June 1992
18. Switched-mode Drives for DC Motors
  By Lester J. Hadley, Jr.
  Philips Semiconductors Corporation, Application note AN1221, December 1988
19. L292 Switch-mode Driver for DC motors
  L292 Integrated circuit data sheet
  SGS-Thomson Microelectronics, March 1993
20. LT1248 Power Factor Controller
  LT1248 data sheet
  Page 4/194 of 1994 Linear Data Book Volume III
  Linear Technology Corporation
21. Unity Power Factor Power Supply
  By B. Wilkinson and J. Mandelcorn
  U.S. Pat. No. 4,677,366
  Jun. 30, 1987
22. MC33035 Brushless DC Motor Controller (MC33035 data sheet)
  Publication Order Number: MC33035/D, April 2001-Rev. 4
  Page 3050 in:
  Analog Integrated Circuits, DL128/D
  Power Management, Signal Conditioning and ASSP Devices
  Rev. 7, March-2002 On Semiconductor
23. UC2845A Current Mode PWM controller
  Data sheet
  Unitrode Integrated Circuits Corp. (Texas Instruments Incorporated)
24. Power Semiconductor Applications
  Philips Components
  Multiple authors,
  SCD2, date of release 4/1991 document number 9398 651 40011
25. Power Factor Correction Handbook
  On Semiconductor
  Multiple authors,
  Document Number HBD853/D Rev. 1, June 2004
26. Data Sheet NCP1650 Power Factor Controller
  On Semiconductor
  Document Number NCP1650/D Rev. 8, August 2003
27. Data Sheet NCP1651 Single Stage Power Factor Controller
  On Semiconductor
  Document Number NCP1651/D Rev. 5, October 2003

The invention claimed is:

1. A system for driving a direct-current (DC) motor under conditions of controlled DC current, from a DC voltage source of a value larger than sad a motor operating voltage, independently of the operating voltage of said motor, said system comprising:
  a pair of nodes for connection of said DC motor, said nodes to be referred to herein as the first node and the second node, said second node being connected to a common electrical terminal of the system through an electrical path with low impedance, including low impedance to DC current, said DC motor being connected between said first node and said second node;
  an inductive element to store energy and to act as a current source for said DC motor, said inductive element being external to said DC motor, and not part of a main magnetic circuit of said DC motor, said inductive element being connected to said first node, in series with said DC motor, said inductive element being capable of operating in a buck converter at the power level required to operate said DC motor and at the frequency of commutation of a first switch, the terminal of said inductive element not connected to said first node being connected to a third node;

said first switch being connected to said inductive element at the third node, the terminal of said inductive element remote from said DC motor, said first switch for connecting and disconnecting said inductive element to a direct current (DC) voltage source, a terminal of said DC voltage source not connected to said first switch, being connected to said common electrical terminal of the system; said first switch being a controlled switch capable of being turned off and on by control signals from a control system, said control system operating based on an error signal and a value of the desired operating current for said DC motor set externally to the system, said control system turning said first switch off and on to minimize said error signal and to keep the operating current of said DC motor at said desired value, said first switch being a single pole switch;

a second switch connected between said third node and said common electrical terminal of the system, parallel with a combination of said inductive element and said DC motor arranged in series, said second switch being controlled so that a current circulating through said inductive element circulates through said second switch if said first switch is turned off and disconnects said inductive element from said DC voltage source, said second switch being a single pole switch;

a capacitor arranged for connection in parallel with said DC motor to limit a resulting voltage over said DC motor, said capacitor being capable of operating in a buck converter at a power level required to operate said DC motor and at the frequency of commutation of said first switch, said capacitor being connected between said first node and a low impedance path to said common electrical terminal of the circuit;

a current sensor for measuring a current through said DC motor, the output of said current sensor being connected to said control system of said first switch to generate said error signal for the operation of said control system controlling the operation of said first switch; and means for controlling operation of said second switch dependent upon the state of the first switch.

2. The system according to claim 1, wherein the voltage of said DC voltage source is larger than the nominal rated voltage of said DC motor.

3. The system according to claim 1, wherein said second switch is a diode connected with appropriate polarity so that current circulating through said inductive element circulates through said diode and if said first switch is open, disconnecting said inductive element.

4. The system according to claim 1, wherein said second switch is an electronic switch for synchronous rectification connected with appropriate polarity so that current circulating through said inductive element circulates through said electronic switch and if said first switch is open, disconnecting said inductive element.

5. The system according to claim 1, wherein said first switch is an electronic switch.

6. The system according to claim 1, wherein said inductive element is an inductor, or a winding of a transformer.

7. The system according to claim 1, wherein a current through the inductive element is controlled independently from a current through the motor, the balance of electrical charge being accumulated or taken from the capacitor in parallel with the motor.

8. The system according to claim 7, wherein the current through the motor is calculated from the variation of the voltage across the capacitor in parallel with the motor.

9. The system according to claim 7, wherein said DC motor is an electronically driven motor, including a brushless motor, said motor being braked electronically so that a current produced during the braking process further charges said capacitor in parallel with said motor.

10. The system according to claim 1, wherein a current through the inductive element is modulated as a full wave rectified sinusoid synchronous with the AC main voltage so that the power factor of the system, as a load to the AC main is improved.

11. The system according to claim 10, wherein the instant in which the sinusoidal waveform of the AC main crosses zero is sensed to synchronize the modulation performed to the current through the inductive element with the waveform in the AC main.

12. The system according to claim 1, wherein said DC motor includes a brushless DC motor.

13. The system according to claim 12, wherein said DC motor includes an electronic commutator for said brush less brushless DC motor.

14. The system according to claim 1, further comprising means for calculating said current through the motor dependent upon current measured in another part of said system.

15. The system according to claim 1, wherein a frequency of a pulse width modulated waveform, resulting from operation of said switches, is randomized to facilitate EMI compliance.

16. The system according to claim 1, wherein the voltage over the DC motor is used to estimate the speed of the motor.

17. The system according to claim 1, wherein said first switch and said direct current (DC) voltage source are implemented by an electronic system that connects said inductive element either to a given voltage or to a high impedance for a period of time determined by said control system controlling said first switch, said high impedance being measured with respect to said common electrical terminal of said system, said given voltage being set externally to said system, said electronic system being connected to said common electrical terminal of the system, said electronic system being controlled by said control system controlling said first switch.

18. A system for driving a direct-current (DC) motor under conditions of controlled DC current, independently of the operating voltage of said motor, said system comprising:

a pair of nodes for connection of said DC motor, said nodes to be referred to herein as the first node and the second node, said second node being connected to a common electrical terminal of the system through an electrical path with low impedance, including low impedance of DC current, said DC motor is being connected between said first node and said second node;

a capacitor arranged for connection in parallel with said motor to limit a resulting voltage over said motor, one terminal of said capacitor being connected to said first node, the other terminal of said capacitor to be connected through a low impedance to said common terminal of the system, said capacitor being capable of operating in a buck converter at the power level required to operate said DC motor and at the frequency of commutation of a first switch;

an inductive element with one terminal being connected to said common terminal of the system through a low impedance path, the other terminal of said inductive element, referred to herein as the third node, being connected to said first switch, said inductive element being used to act as a current source for said DC motor, said inductive element being external to said DC motor and not part of a main magnetic circuit of said DC motor, said inductive element being capable of operating in a buck converter at the power level required to operate said DC motor and at the frequency of commutation of said first switch;

said first switch being connected to said inductive element in the third node, said first switch for connecting and disconnecting said third node to a DC voltage source, a terminal of said DC voltage source not connected to said first switch, being connected to said common electrical terminal of the system, said first switch being a controlled switch capable of being turned off and on by control signals from a control system, said control system operating based on an error signal and a value of a desired operating current for said DC motor, set externally to the system, said control system for turning said first switch off and on to minimize said error signal and to keep the operating current of said DC motor at said desired value, said first switch being a single pole switch;

a second switch being connected between said first node and said third node, in series with the parallel combination of said motor and said capacitor, and being connected to the common node between the first switch and said inductive element, said second switch being controlled so that a current circulating through said inductive element circulates through said second switch if the first switch is turned off and disconnects the third node from said DC voltage source, said second switch being a single pole switch;

a current sensor for measuring a current through said DC motor, the output of said current sensor being connected to said control system of said first switch to generate said error signal for the operation of said control system, controlling the operation of said first switch; and means for controlling operation of said second switch dependent upon the state of the first switch.

19. The system according to claim 18, wherein said first switch is an electronic switch, and said second switch is a diode connected with appropriate polarity so that current circulating through said inductive element circulates through said diode and if said first switch is open, disconnecting said inductive element.

20. The system according to claim 18, wherein said inductive element is an inductor, or a winding of a transformer.

21. The system according to claim 18, wherein a current through the inductive element is controlled independently from a current through the motor, the balance of electrical charge being accumulated or taken from the capacitor in parallel with the motor.

22. The system according to claim 21, wherein said DC motor is an electronically driven motor, including a brushless motor, said motor being braked electronically so that a current produced during the braking process further charges said capacitor in parallel with said motor.

23. The system according to claim 18, wherein a current through the inductive element is modulated as a full wave rectified sinusoid synchronous with the AC mains voltage so that the power factor of the system, as a load to the AC main is improved.

24. The system according to claim 18, wherein said first switch and said direct current (DC) voltage source are implemented by an electronic system that connects said inductive element either to a given voltage or to a high impedance for a period of time determined by said control system controlling said first switch, said high impedance being measured with respect to said common electrical terminal of said system, said given voltage being set externally to said system, said electronic system being connected to said common electrical terminal of the system, said electronic system being controlled by said control system controlling said first switch.

25. The system according to claim 18, wherein said inductive element is an inductor and said second switch is connected to a terminal of said inductor that is not connected to said third node or to said common electrical terminal of the system.

26. A system for driving a direct-current (DC) motor under conditions of controlled DC current, independently of the operating voltage of said motor, said system comprising:

a pair of nodes for connection of said DC motor, said nodes to be referred to herein as the first node and the second node, said DC motor being connected between said first and said second node;

a capacitor arranged for connection in parallel with said motor, between said first node and said second node, to limit a resulting voltage over said motor, said first node, connected to a terminal of said capacitor and said motor, being also connected to a DC voltage source, said capacitor being capable of operating in a buck converter at the power level required to operate said DC motor and at the frequency of commutation of a first switch, the other terminal of said DC voltage source being connected to a common electrical terminal of the system;

an inductive element with one terminal connected to said first node, a common node of said DC voltage source, said capacitor and said DC motor, the other terminal of said inductive element, referred to herein as the third node and being connected to said first switch, said inductive element being used to store energy and to act as a current source for said DC motor, said inductive element being external to said DC motor, and not part of a main magnetic circuit of said DC motor, said inductive element being capable of operating in a buck converter at the power level required to operate said DC motor and at the frequency of commutation of said first switch;

said first switch being connected to said inductive element in the third node, the other terminal of said first switch, not connected to the third node being connected to said common electrical terminal of the system through an electrical path with low impedance, including low impedance to DC current, said first switch for connecting and disconnecting the third node to said common electrical terminal of the system, said first switch being a controlled switch capable of being turned off and on by control signals from a control system, said control system operating based on an error signal and a value of a desired operating current for said DC motor set externally to the system, said control system for turning said first switch off and on to minimize said error signal and to keep the operating current of said DC motor at said desired value, said first switch being a single pole switch;

a second switch being connected between said second and said third node, said second switch being controlled so that a current circulating through said inductive element circulates through said second switch if the first switch is turned off and disconnects the third node from said common electrical terminal of the system, said second switch being a single pole switch;

a current sensor for measuring a current through said DC motor, the output of said current sensor being connected to said control system of said first switch to generate said error signal for the operation of said control system, controlling the operation of said first switch; and means for controlling operation of said second switch dependent upon the state of the first switch.

27. The system according to claim 26, wherein said first switch is an electronic switch, and said second switch is a diode connected with appropriate polarity so that current circulating through said inductive element circulates through said diode and if said first switch is open, disconnecting said inductive element.

28. The system according to claim 26, wherein said inductive element is an inductor, or a winding of a transformer.

29. The system according to claim 26, wherein a current through the inductive element is controlled independently from a current through the motor, the balance of electrical charge being accumulated or taken from the capacitor in parallel with the motor.

30. The system according to claim 29, wherein said DC motor is an electronically driven motor, including a brushless motor, said motor being braked electronically so that a current produced during the braking process further charges said capacitor in parallel with said motor.

31. The system according to claim 26, wherein a current through the inductive element is modulated as a full wave rectified sinusoid synchronous with the AC mains voltage so that the power factor of the system, as a load to the AC main is improved.

32. The system according to claim 26, wherein said first switch and said direct current (DC) voltage source are implemented by an electronic system that connects said inductive element either to a given voltage or to a high impedance for a period of time being measured with respect to said common electrical terminal of said system, said given voltage being set externally to said system, said electronic system being connected to said common electrical terminal of the system, said electronic system being controlled by said control system controlling said first switch.

33. The system according to claim 26, wherein said inductive element is an inductor and said second switch is connected to a terminal of said inductor that is not connected to said third node or to said direct current (DC) voltage source.

34. A system for driving a direct-current (DC) motor under conditions of controlled DC current, from a DC voltage source of a value larger than a motor operating voltage, independently of the operating voltage of said motor, said system comprising:

a pair of nodes for connection of said DC motor, said nodes referred to as the first node and the second node, said second node being connected to a direct current (DC) voltage source, a terminal of said DC voltage source not connected to said second node being connected to a common electrical terminal of the system through an electrical path with low impedance, including low impedance to DC current, said DC motor being connected between said first node and said second node;

an inductive element to store energy and to act as a current source for said DC motor, said inductive element being external to said DC motor and not part of a main magnetic circuit of said DC motor, said inductive element being connected to said first node in series with said DC motor, said inductive element being capable of operating in a buck converter at the power level required to operate said DC motor and at the frequency of commutation of a first switch, the terminal of said inductive element not connected to said first node being connected to a third node;

said first switch being connected to said inductive element at said third node, the terminal of said inductive element remote from said DC motor, said first switch for connecting and disconnecting said inductive element to said common electrical terminal of the system, a terminal of said first switch not connected to said third node being connected to said common electrical terminal of the system, said first switch being a controlled switch capable of being turned off and on by control signals from a control system, said control system operating based on an error signal and a value of the desired operating current for said DC motor set externally to the system, said control system turning said first switch off and on to minimize said error signal and to keep the operating current of said DC motor at said desired value, said first switch being a single pole switch;

a second switch connected between said third node and said second node, parallel with a combination of said inductive element and said DC motor arranged in series, said second switch being controlled so that a current circulating through said inductive element circulates through said second switch if said first switch is turned off and disconnects said inductive element from said common electrical terminal of the system, said second switch being a single pole switch;

a capacitor arranged for connection in parallel with said DC motor to limit a resulting voltage over said DC motor, said capacitor being capable of operating in a buck converter at a power level required to operate said DC motor and at the frequency of commutation of said first switch, said capacitor being connected between said first node and said second node;

a current sensor for measuring a current through said DC motor, the output of said current sensor being connected to said control system of said first switch to generate said error signal for the operation of said control system controlling the operation of said first switch; and means for controlling operation of said second switch dependent upon the state of the first switch.

35. The system according to claim 34, wherein said first switch is an electronic switch, and said second switch is a diode connected with appropriate polarity so that current circulating through said inductive element circulates through said diode and if said first switch is open, disconnecting said inductive element.

36. The system according to claim 34, wherein said inductive element is an inductor, or a winding of a transformer.

37. The system according to claim 34, wherein a current through the inductive element is controlled independently from a current through the motor, the balance of electrical charge being accumulated or taken from the capacitor in parallel with the motor.

38. The system according to claim 37, wherein said DC motor is an electronically driven motor, including a brushless motor, said motor being braked electronically so that a current produced during the braking process further charges said capacitor in parallel with said motor.

39. The system according to claim 34, wherein a current through the inductive element is modulated as a full wave rectified sinusoid synchronous with the AC mains voltage so that the power factor of the system, as a load to the AC main is improved.

40. The system according to claim 34, wherein said first switch and said direct current (DC) voltage source are implemented by an electronic system that connects said inductive element either to a given voltage or to a high impedance for a period of time being measured with respect to said common electrical terminal of said system, said given voltage is being set externally to said system, said electronic system being connected to said common electrical terminal of the system, said electronic system is being controlled by said control system controlling said first switch.

41. A system for driving a direct-current (DC) motor under conditions of controlled DC current, from a DC voltage source of a value smaller than a motor operating voltage, independently of the operating voltage of said motor, said system comprising:

a pair of nodes for connection of said DC motor, said nodes to be referred to herein as the first node and the second node, said DC motor being connected between said first and said second node;

a capacitor arranged for connection in parallel with said motor, between said first node and said second node, to limit a resulting voltage over said motor, said first node being connected to a common electrical terminal of the system through an electrical path with low impedance, including low impedance to DC current, said capacitor being capable of operating in a buck converter at the power level required to operate said DC motor and at the frequency of commutation of a first switch;

wherein said direct current (DC) voltage source has one terminal of said being connected to an inductive element, the other terminal of said DC voltage source being connected to said common electrical terminal of the system;

said inductive element with one terminal connected to said DC voltage source, the other terminal of said inductive element, referred to herein as the third node, being connected to said first switch, said inductive element being used to store energy and to act as a current source for said DC motor, said inductive element being external to said DC motor, and not part of a main magnetic circuit of said DC motor, said inductive element being capable of operating in a buck converter at the power level required to operate said DC motor and at the frequency of commutation of said first switch;

said first switch being connected to said inductive element in the third node, the other terminal of said first switch, not connected to the third node being connected to said common electrical terminal of the system through an electrical path with low impedance, including low impedance to DC current, said first switch for connecting and disconnecting the third node to said common electrical terminal of the system, said first switch being a controlled switch capable of being turned off and on by control signals from a control system, said control system operating based on an error signal and a value of a desired operating current for said DC motor set externally to the system, said control system for turning said first switch off and on to minimize said error signal and to keep the operating current of said DC motor at said desired value, said first switch being a single pole switch;

a second switch connected between said second and said third node, said second switch being controlled so that a current circulating through said inductive element circulates through said second switch if the first switch is turned off and disconnects the third node from said common electrical terminal of the system, said second switch being a single pole switch;

a current sensor for measuring a current through said DC motor, the output of said current sensor being connected to said control system of said first switch to generate said error signal for the operation of said control system, controlling the operation of said first switch; and means for controlling operation of said second switch dependent upon the state of the first switch.

42. The system according to claim 41, wherein said first switch is an electronic switch, and said second switch is a diode connected with appropriate polarity so that current circulating through said inductive element circulates through said diode and if said first switch is open, disconnecting said inductive element.

43. The system according to claim 41, wherein said inductive element is an inductor, or a winding of a transformer.

44. The system according to claim 41, wherein a current through the inductive element is controlled independently from a current through the motor, the balance of electrical charge being accumulated or taken from the capacitor in parallel with the motor.

45. The system according to claim 44, wherein said DC motor is an electronically driven motor, including a brushless motor, said motor being braked electronically so that a current produced during the braking process further charges said capacitor in parallel with said motor.

46. The system according to claim 41, wherein a current through the inductive element is modulated as a full wave rectified sinusoid synchronous with the AC mains voltage so that the power factor of the system, as a load to the AC main is improved.

47. The system according to claim 41, wherein said first switch and said direct current (DC) voltage source are implemented by an electronic system that connects said inductive element either to a given voltage or to a high impedance for a period of time determined by said control system controlling said first switch, said high impedance being measured with respect to said common electrical terminal of said system, said given voltage being set externally to said system, said electronic system being connected to said common electrical terminal of the system, said electronic system being controlled by said control system controlling said first switch.

48. The system according to claim 41, wherein said inductive element is an inductor and said second switch is connected to a terminal of said inductor that is not connected to said third node or to said direct current (DC) voltage source.

* * * * *